US012762876B2

(12) United States Patent
Ogasawara et al.

(10) Patent No.: US 12,762,876 B2
(45) Date of Patent: Oct. 13, 2026

(54) IDENTIFICATION DEVICE, IDENTIFICATION METHOD, AND IDENTIFICATION PROGRAM

(71) Applicant: NTT, Inc.

(72) Inventors: Shiro Ogasawara, Tokyo (JP); Hajime Nakajima, Tokyo (JP); Fumihiro Yokose, Tokyo (JP); Hidetaka Koya, Tokyo (JP)

(73) Assignee: NTT, Inc., Tokyo (JP)

( * ) Notice: Subject to any disclaimer, the term of this patent is extended or adjusted under 35 U.S.C. 154(b) by 354 days.

(21) Appl. No.: 18/568,400

(22) PCT Filed: Jun. 11, 2021

(86) PCT No.: PCT/JP2021/022420

§ 371 (c)(1),
(2) Date: Dec. 8, 2023

(87) PCT Pub. No.: WO2022/259561

PCT Pub. Date: Dec. 15, 2022

(65) Prior Publication Data

US 2024/0273931 A1 Aug. 15, 2024

(51) Int. Cl.
*G06V 30/148* (2022.01)
*G06V 30/14* (2022.01)

(52) U.S. Cl.
CPC ........ *G06V 30/153* (2022.01); *G06V 30/1456* (2022.01)

(58) Field of Classification Search
CPC ... G06V 30/153; G06V 30/1456; G06V 30/10
See application file for complete search history.

(56) References Cited

U.S. PATENT DOCUMENTS

| | | | | |
|---|---|---|---|---|
| 11,232,170 | B1 * | 1/2022 | Dines | G06F 16/9574 |
| 2008/0195958 | A1 * | 8/2008 | Detiege | G06V 30/412 715/765 |
| 2014/0253559 | A1 * | 9/2014 | Li | G06F 8/38 345/467 |
| 2019/0250891 | A1 * | 8/2019 | Kumar | G06F 8/38 |

FOREIGN PATENT DOCUMENTS

JP 2015005245 A 1/2015

OTHER PUBLICATIONS

System for screening objectionable images (Year: 1998).*

* cited by examiner

*Primary Examiner* — Cao H Nguyen

(57) ABSTRACT

An identification device (10) includes a first identification unit (151*a*) that identifies first screen data including an image of a screen of an application and information regarding a screen component object that is an object of an element included in the screen, and outputs a first identification result associated with sample screen data that is screen data to be referred to, a derivation unit (152*a*) that derives a sample screen model used for identification in a virtualization environment on the basis of the sample screen data and the first identification result, and a second identification unit (153*a*) that identifies second screen data including an image of the screen and not including information regarding the screen component object, and outputs a second identification result associated with a sample screen model.

17 Claims, 25 Drawing Sheets

Fig. 3

〈SCREEN DATA ID〉
20200204203243
〈SCREEN COMPONENT OBJECT INFORMATION〉
《ATTRIBUTES OF SCREEN COMPONENT OBJECTS》

| SCREEN COMPONENT ID AT TIME OF EXECUTION | TYPE | DISPLAY/ NON-DISPLAY STATE | DISPLAY CHARACTER STRING | SELECTION STATE | PRESENCE OR ABSENCE OF OPERATION BY WORKER | DRAWING AREA OF SCREEN COMPONENT |
|---|---|---|---|---|---|---|
| 1 | WINDOW | DISPLAY | ORDER CONTENT REFERENCE | | | [xxx, yyy, zzz, www] |
| 2 | LABEL | DISPLAY | ORDER CONTENT | | | [xxx, yyy, zzz, www] |
| 3 | PANE | DISPLAY | | | | [xxx, yyy, zzz, www] |
| 4 | LABEL | DISPLAY | ERROR. NAME OF PERSON IN CHARGE OF ORDERING IS NOT INPUT. | | | [xxx, yyy, zzz, www] |
| 5 | LABEL | DISPLAY | SLIP NUMBER | | | [xxx, yyy, zzz, www] |
| 6 | TEXT BOX | DISPLAY | P202002041054 | | | [xxx, yyy, zzz, www] |
| ... | ... | ... | ... | ... | ... | ... |
| 9 | LABEL | DISPLAY | CONTRACT TYPE | | | [xxx, yyy, zzz, www] |
| 10 | TEXT BOX | DISPLAY | CONVEY | | | [xxx, yyy, zzz, www] |
| ... | ... | ... | ... | ... | | ... |
| 15 | LABEL | DISPLAY | [ACCOUNT OF PAYMENTS] | | | [xxx, yyy, zzz, www] |
| 16 | BUTTON | DISPLAY | COLLECTIVELY SELECT | | | [xxx, yyy, zzz, www] |
| ... | ... | ... | ... | ... | ... | ... |
| 19 | BUTTON | DISPLAY | DELETE | | | [xxx, yyy, zzz, www] |
| 20 | TABLE | DISPLAY | | | | [xxx, yyy, zzz, www] |
| 21 | ROW ELEMENT | DISPLAY | | | | [xxx, yyy, zzz, www] |
| 22 | LABEL | DISPLAY | ITEM NAME | | | [xxx, yyy, zzz, www] |
| 23 | LABEL | DISPLAY | PRICE (YEN) | | | [xxx, yyy, zzz, www] |
| 24 | ROW ELEMENT | DISPLAY | | | | [xxx, yyy, zzz, www] |
| 25 | CHECK BOX | DISPLAY | | | | [xxx, yyy, zzz, www] |
| 26 | LABEL | DISPLAY | CARRYING OUT WORK | | | [xxx, yyy, zzz, www] |
| 27 | LABEL | DISPLAY | 20,000 | | | [xxx, yyy, zzz, www] |
| 28 | BUTTON | DISPLAY | DISPLAY DETAILS | | | [xxx, yyy, zzz, www] |
| 29 | ROW ELEMENT | DISPLAY | | | | [xxx, yyy, zzz, www] |
| 30 | CHECK BOX | DISPLAY | | ○ | | [xxx, yyy, zzz, www] |
| 31 | LABEL | DISPLAY | TRANSPORT | | | [xxx, yyy, zzz, www] |
| 32 | LABEL | DISPLAY | 50,000 | | | [xxx, yyy, zzz, www] |
| 33 | BUTTON | DISPLAY | DISPLAY DETAILS | | ○ | [xxx, yyy, zzz, www] |
| ... | ... | ... | ... | ... | ... | ... |
| 43 | BUTTON | DISPLAY | DISPLAY DETAILS | | | [xxx, yyy, zzz, www] |
| 44 | BUTTON | DISPLAY | CLOSE | | | [xxx, yyy, zzz, www] |

《SCREEN STRUCTURE》

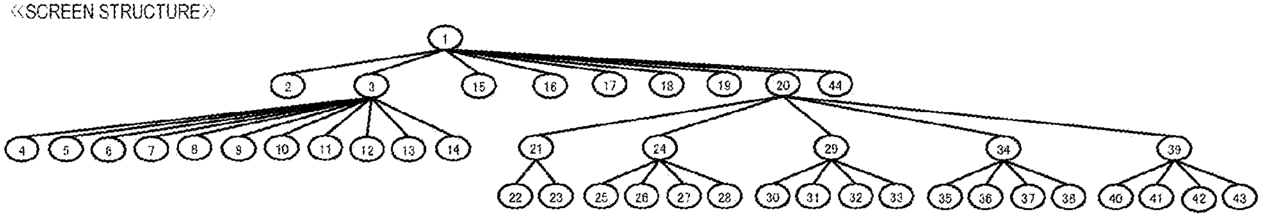

〈SCREEN IMAGE〉

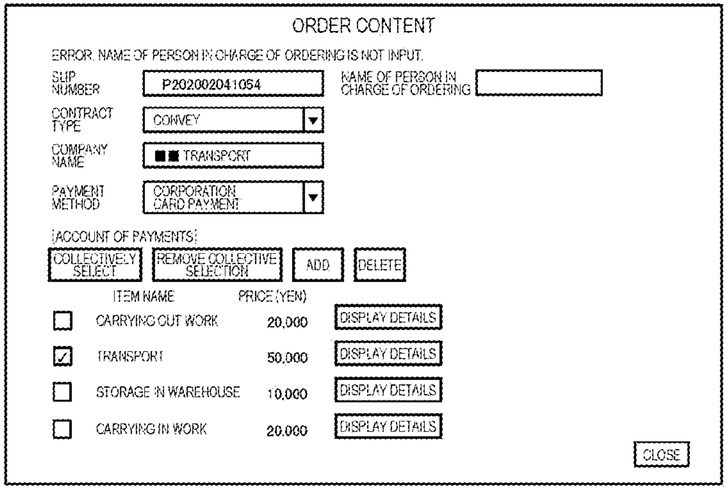

〈SCREEN ATTRIBUTES〉

| ATTRIBUTE NAME | ATTRIBUTE VALUE |
|---|---|
| TITLE | ORDER CONTENT REFERENCE [P202002041054] |
| CLASS NAME | OrderWnd |
| COORDINATE VALUE OF DISPLAY AREA | [30, 20, 390, 500] |
| PROGRAM NAME | OrderManager.exe |

Fig. 4

<PROCESSING TARGET SCREEN DATA ID>
20200204203243

<SAMPLE SCREEN MODEL ID>
0001

EXAMPLE IN WHICH IDENTIFICATION DEVICE IS USED IN OBJECT INFORMATION USING MODE AND PROCESSING TARGET SCREEN DATA INCLUDES INFORMATION OF OBJECTS.

<RESULTS (1) OF ASSOCIATION OF CONTROL TARGET SCREEN COMPONENTS/DISPLAY CHARACTER STRING ACQUISITION>

| SAMPLE SCREEN MODEL | | | PROCESSING TARGET SCREEN DATA | | |
|---|---|---|---|---|---|
| SCREEN COMPONENT ID AT TIME OF EXECUTION | CONTROL TARGET | DISPLAY CHARACTER STRING ACQUISITION TARGET | SCREEN COMPONENT ID AT TIME OF EXECUTION | CHARACTER STRING DRAWING AREA | DISPLAY CHARACTER STRING |
| 5 | ○ | ○ | 6 | | P202002041054 |
| 7 | ○ | ○ | 8 | | |
| 9 | ○ | ○ | 10 | | CONVEY |
| 16 | ○ | ○ | 12 | | ■■ TRANSPORT |
| 18 | ○ | ○ | 14 | | CORPORATION CARD PAYMENT |
| 51 | ○ | | 44 | | |

EXAMPLE IN WHICH IDENTIFICATION DEVICE IS USED IN OBJECT INFORMATION NON-USING MODE OR PROCESSING TARGET SCREEN DATA DOES NOT INCLUDE INFORMATION OF OBJECTS.

<RESULTS (2) OF ASSOCIATION OF CONTROL TARGET SCREEN COMPONENTS/DISPLAY CHARACTER STRING ACQUISITION>

| SAMPLE SCREEN MODEL | | | PROCESSING TARGET SCREEN DATA | | |
|---|---|---|---|---|---|
| SCREEN COMPONENT ID AT TIME OF EXECUTION | CONTROL TARGET | DISPLAY CHARACTER STRING ACQUISITION TARGET | SCREEN COMPONENT ID AT TIME OF EXECUTION | CHARACTER STRING DRAWING AREA | DISPLAY CHARACTER STRING |
| 5 | ○ | ○ | | [xxx,yyy,zzz,www] | P202002041054 |
| 7 | ○ | ○ | | UNKNOWN | |
| 9 | ○ | ○ | | [xxx,yyy,zzz,www] | CONVEY |
| 16 | ○ | ○ | | [xxx,yyy,zzz,www] | ■■ TRANSPORT |
| 18 | ○ | ○ | | [xxx,yyy,zzz,www] | CORPORATION CARD PAYMENT |
| 51 | ○ | | | [xxx,yyy,zzz,www] | CLOSE |

Fig. 5

<SAMPLE SCREEN DATA ID>
0001
<SCREEN COMPONENT OBJECT INFORMATION>
<<ATTRIBUTES OF SCREEN COMPONENT OBJECTS>>

| SCREEN COMPONENT ID AT TIME OF EXECUTION | TYPE | DISPLAY/ NON-DISPLAY STATE | DISPLAY CHARACTER STRING | SELECTION STATE | CONTROL TARGET | DISPLAY CHARACTER STRING ACQUISITION TARGET | DRAWING AREA OF SCREEN COMPONENT |
|---|---|---|---|---|---|---|---|
| 1 | WINDOW | DISPLAY | ORDER CONTENT REFERENCE | | | | [xxx, yyy, zzz, www] |
| 2 | LABEL | DISPLAY | ORDER CONTENT | | | | [xxx, yyy, zzz, www] |
| 3 | PANE | DISPLAY | | | | | [xxx, yyy, zzz, www] |
| 4 | LABEL | DISPLAY | SLIP NUMBER | | | | [xxx, yyy, zzz, www] |
| 5 | TEXT BOX | DISPLAY | P202002032213 | | ○ | ○ | [xxx, yyy, zzz, www] |
| ... | ... | ... | ... | ... | ... | ... | ... |
| 8 | LABEL | DISPLAY | CONTRACT TYPE | | | | [xxx, yyy, zzz, www] |
| 9 | TEXT BOX | DISPLAY | ARTICLE PURCHASE | | ○ | ○ | [xxx, yyy, zzz, www] |
| ... | ... | ... | ... | ... | ... | ... | ... |
| 12 | RADIO BUTTON | DISPLAY | PERMANENT ASSET | | | | [xxx, yyy, zzz, www] |
| 13 | RADIO BUTTON | DISPLAY | LUMP-SUM DEPRECIABLE ASSET | | | | [xxx, yyy, zzz, www] |
| 14 | RADIO BUTTON | DISPLAY | EQUIPMENT | ○ | | | [xxx, yyy, zzz, www] |
| ... | | | ... | ... | ... | ... | ... |
| 30 | LABEL | DISPLAY | [ACCOUNT OF PAYMENTS] | | | | [xxx, yyy, zzz, www] |
| 31 | BUTTON | DISPLAY | COLLECTIVELY SELECT | | | | [xxx, yyy, zzz, www] |
| ... | ... | ... | ... | ... | ... | ... | ... |
| 34 | BUTTON | DISPLAY | DELETE | | | | [xxx, yyy, zzz, www] |
| 35 | TABLE | DISPLAY | | | | | [xxx, yyy, zzz, www] |
| 36 | ROW ELEMENT | DISPLAY | | | | | [xxx, yyy, zzz, www] |
| 37 | LABEL | DISPLAY | ITEM NAME | | | | [xxx, yyy, zzz, www] |
| 38 | LABEL | DISPLAY | PRICE (YEN) | | | | [xxx, yyy, zzz, www] |
| 39 | ROW ELEMENT | DISPLAY | | | | | [xxx, yyy, zzz, www] |
| 40 | CHECK BOX | DISPLAY | | ○ | | | [xxx, yyy, zzz, www] |
| 41 | LABEL | DISPLAY | ○○ CABLE | | | | [xxx, yyy, zzz, www] |
| 42 | IMAGE | DISPLAY | | | | | [xxx, yyy, zzz, www] |
| 43 | LINK | NON-DISPLAY | http://xxxx.yyy.com | | | | [xxx, yyy, zzz, www] |
| 44 | LABEL | DISPLAY | 2,300 | | | | [xxx, yyy, zzz, www] |
| 45 | BUTTON | DISPLAY | DISPLAY DETAILS | | | | [xxx, yyy, zzz, www] |
| 46 | ROW ELEMENT | DISPLAY | | | | | [xxx, yyy, zzz, www] |
| ... | ... | ... | ... | ... | ... | ... | ... |
| 50 | BUTTON | DISPLAY | DISPLAY DETAILS | | | | [xxx, yyy, zzz, www] |
| 51 | BUTTON | DISPLAY | CLOSE | | ○ | | [xxx, yyy, zzz, www] |

<<SCREEN STRUCTURE>>

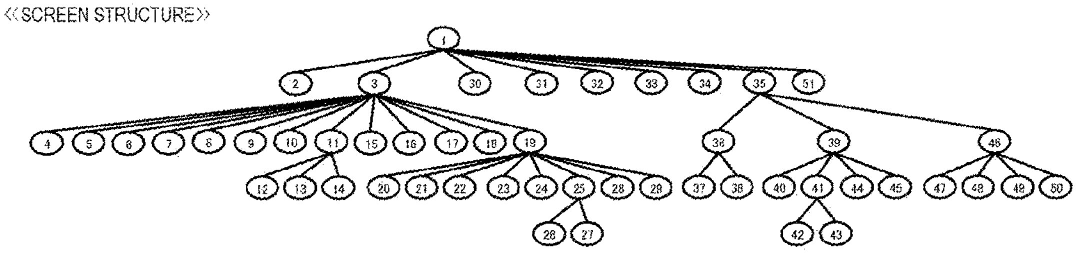

<SCREEN IMAGE>

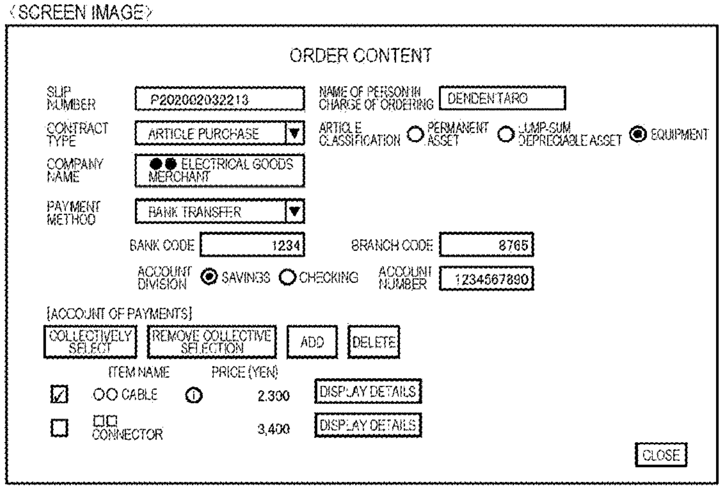

<SCREEN ATTRIBUTES>

| ATTRIBUTE NAME | ATTRIBUTE VALUE |
|---|---|
| TITLE | ORDER CONTENT REFERENCE [P202002032213] |
| CLASS NAME | OrderWind |
| COORDINATE VALUE OF DISPLAY AREA | [10, 15, 370, 495] |
| PROGRAM NAME | OrderManager.exe |

| SCREEN COMPONENT ID AT TIME OF EXECUTION (SAMPLE) | SCREEN COMPONENT ID AT TIME OF EXECUTION (PROCESSING TARGET) |
|---|---|
| 1 | 1 |
| 2 | 2 |
| 3 | 3 |
| 4 | 5 |
| 5 | 6 |
| 6 | 7 |
| 7 | 8 |
| 8 | 9 |
| 9 | 10 |
| 10 | (NONE) |
| ... | ... |
| 14 | (NONE) |
| 15 | 11 |
| 16 | 12 |
| 17 | 13 |
| 18 | 14 |
| 19 | (NONE) |
| ... | ... |
| 29 | (NONE) |
| 30 | 15 |
| 31 | 16 |
| 32 | 17 |
| 33 | 18 |
| 34 | 19 |
| 35 | 20 |
| 36 | 21 |
| 37 | 22 |
| 38 | 23 |
| 39 | 29 |
| 40 | 30 |
| 41 | 31 |
| 42 | (NONE) |
| 43 | (NONE) |
| 44 | 32 |
| 45 | 33 |
| 46 | 34 |
| 47 | 35 |
| 48 | 36 |
| 49 | 37 |
| 50 | 38 |
| 51 | 44 |

Fig. 8

〈SAMPLE SCREEN DATA ID〉

0001

〈TARGET IDENTIFICATION CASE SCREEN DATA ID SET〉

{20200204203243, …}

〈SCREEN COMPONENT MODEL INFORMATION〉

〈〈ATTRIBUTES OF SCREEN COMPONENT MODELS〉〉

RATE IN WHICH THERE IS ONE OR MORE OBJECTS IN WHICH ASSOCIATED "DISPLAY/NON-DISPLAY STATE" IS "DISPLAY" IN SAMPLE SCREEN DATA AND IDENTIFICATION CASE SCREEN DATA DETERMINED TO BE EQUIVALENT THERETO.

| SCREEN COMPONENT ID AT TIME OF EXECUTION | TYPE | CONTROL TARGET | DISPLAY CHARACTER STRING ACQUISITION TARGET | NUMBER OF APPEARANCES | APPEARANCE RATE | NUMBER OF TIMES OF EMPTY CHARACTER STRINGS | DISPLAY CHARACTER STRING SET | TYPE OF VARIATION IN DISPLAY CHARACTER STRING | NUMBER OF CHARACTERS OF DISPLAY CHARACTER STRING | TYPE OF CHARACTER OF DISPLAY CHARACTER STRING | FONT TYPE | FONT SIZE |
|---|---|---|---|---|---|---|---|---|---|---|---|---|
| 1 | WINDOW | | | 0 | 0 | 0 | {ORDER CONTENT REFERENCE} | | | | | |
| 2 | LABEL | | | 10 | 1.0 | 0 | {ORDER CONTENT} | FIXED VALUE | | | MS P GOTHIC | 20 |
| 3 | PANE | | | 0 | 0 | 10 | {} | | | | | |
| 4 | LABEL | | | 10 | 1.0 | 0 | {SLIP NUMBER} | FIXED VALUE | | | MS P GOTHIC | 12 |
| 5 | TEXT BOX | ○ | ○ | 10 | 1.0 | 0 | {P202002032213, …} | ANY VALUE | 13 | ALPHABET UPPER CASE (P), NUMBER | MS P GOTHIC | 14 |
| … | … | … | … | … | … | | … | … | … | … | … | … |
| 8 | LABEL | | | 10 | 1.0 | 0 | CONTRACT TYPE | FIXED VALUE | | | MS P GOTHIC | 12 |
| 9 | TEXT BOX | ○ | ○ | 10 | 1.0 | 0 | {ARTICLE PURCHASE, …} | CATEGORY VALUE | | | MS P GOTHIC | 14 |
| … | … | … | … | … | … | | … | … | … | … | … | … |
| 12 | RADIO BUTTON | | | 3 | 0.3 | 0 | {PERMANENT ASSET} | | | | | |
| 13 | RADIO BUTTON | | | 3 | 0.3 | 0 | {LUMP-SUM DEPRECIABLE ASSET} | | | | | |
| 14 | RADIO BUTTON | | | 3 | 0.3 | | {EQUIPMENT} | | | | | |
| … | … | … | … | … | … | | … | … | … | … | … | … |
| 30 | LABEL | | | 10 | 1.0 | 0 | {[ACCOUNT OF PAYMENTS]} | FIXED VALUE | | | MS P GOTHIC | 12 |
| 31 | BUTTON | | | 10 | 1.0 | 0 | {COLLECTIVELY SELECT} | FIXED VALUE | | | MS P GOTHIC | 12 |
| … | … | … | … | … | … | … | … | … | … | … | … | … |
| 34 | BUTTON | | | 10 | 1.0 | 0 | {DELETE} | FIXED VALUE | | | MS P GOTHIC | 12 |
| 35 | TABLE | | | 0 | 0 | 10 | {} | | | | | |
| 36 | ROW ELEMENT | | | 0 | 0 | 10 | {} | | | | | |
| 37 | LABEL | | | 10 | 1.0 | 0 | ITEM NAME | FIXED VALUE | | | | |
| 38 | LABEL | | | 10 | 1.0 | 0 | PRICE (YEN) | FIXED VALUE | | | MS P GOTHIC | 12 |
| 39 | ROW ELEMENT | | | 0 | 0 | 10 | {} | | | | | |
| 40 | CHECK BOX | | | 0 | 0 | 10 | {} | | | | | |
| 41 | LABEL | | | 10 | 1.0 | 2 | {○○ CABLE, …} | ANY VALUE | (UNDETERMINED) | (UNDETERMINED) | MS P GOTHIC | 14 |
| 42 | IMAGE | | | 0 | 0 | 10 | {} | | | | | |
| 43 | LINK | | | 0 | 0 | 0 | {http://xxxx.yyy.com, …} | | | | | |
| 44 | LABEL | | | 10 | 1.0 | 1 | {2,300, …} | ANY VALUE | (UNDETERMINED) | NUMBER, SYMBOL (,) | MS P GOTHIC | 14 |
| 45 | BUTTON | | | 10 | 1.0 | 0 | {DISPLAY DETAILS} | FIXED VALUE | | | MS P GOTHIC | 12 |
| 46 | ROW ELEMENT | | | 0 | 0 | 10 | {} | | | | | |
| … | … | … | … | … | … | … | … | … | … | … | … | … |
| 50 | BUTTON | | | 3 | 0.3 | 0 | {DISPLAY DETAILS} | | | | MS P GOTHIC | 12 |
| 51 | BUTTON | ○ | | 10 | 1.0 | 0 | {CLOSE} | FIXED VALUE | | | MS P GOTHIC | 12 |

Fig. 9

«RELATIVE ARRANGEMENT RELATIONSHIP (HORIZONTAL DIRECTION) OF SCREEN COMPONENT MODELS»

$r_l(i, j)$
i: ROW NUMBER
j: COLUMN NUMBER

| | 1 | 2 | 3 | 4 | 5 | … | 8 | 9 | … | 12 | 13 | 14 | … | … | 30 | 31 | … | 34 | … | 51 |
|---|---|---|---|---|---|---|---|---|---|---|---|---|---|---|---|---|---|---|---|---|
| 1 | | | | | | | | | | | | | | | | | | | | |
| 2 | | 0 | | −1 | 0 | … | −1 | 0 | … | 1 | 1 | 1 | … | … | −1 | −1 | … | 0 | … | 1 |
| 3 | | | | | | | | | | | | | | | | | | | | |
| 4 | | 1 | | 0 | 1 | … | 0 | 1 | … | 1 | 1 | 1 | … | … | 0 | 0 | … | 1 | … | 1 |
| 5 | | 0 | | −1 | 0 | … | −1 | 0 | … | 1 | 1 | 1 | … | … | −1 | −1 | … | 0 | … | 1 |
| … | | … | | … | … | … | … | … | … | … | … | … | … | … | … | … | … | … | … | … |
| 8 | | 1 | | 0 | 1 | … | 0 | 1 | … | 1 | 1 | 1 | … | … | 0 | 0 | … | 1 | … | 1 |
| 9 | | 0 | | −1 | 0 | … | −1 | 0 | … | 1 | 1 | 1 | … | … | −1 | −1 | … | 0 | … | 1 |
| … | | … | | … | … | … | … | … | … | … | … | … | … | … | … | … | … | … | … | … |
| 12 | | −1 | | −1 | −1 | … | −1 | −1 | … | 0 | 1 | 1 | … | … | −1 | −1 | … | −1 | … | 1 |
| 13 | | −1 | | −1 | −1 | … | −1 | −1 | … | −1 | 0 | 1 | … | … | −1 | −1 | … | −1 | … | 0 |
| 14 | | −1 | | −1 | −1 | … | −1 | −1 | … | −1 | −1 | 0 | … | … | −1 | −1 | … | −1 | … | 0 |
| … | | … | | … | … | … | … | … | … | … | … | … | … | … | … | … | … | … | … | … |
| 30 | | 1 | | 0 | 1 | … | 0 | 1 | … | 1 | 1 | 1 | … | … | 0 | 0 | … | 1 | … | 1 |
| 31 | | 1 | | 0 | 1 | … | 0 | 1 | … | 1 | 1 | 1 | … | … | 0 | 0 | … | 1 | … | 1 |
| … | | … | | … | … | … | … | … | … | … | … | … | … | … | … | … | … | … | … | … |
| 34 | | 0 | | −1 | 0 | … | −1 | 0 | … | 1 | 1 | 1 | … | … | −1 | −1 | … | 0 | … | 1 |
| … | | … | | … | … | … | … | … | … | … | … | … | … | … | … | … | … | … | … | … |
| 51 | | −1 | | −1 | −1 | … | −1 | −1 | … | −1 | 0 | 0 | … | … | −1 | −1 | … | −1 | … | 0 |

«RELATIVE ARRANGEMENT RELATIONSHIP (VERTICAL DIRECTION) OF SCREEN COMPONENT MODELS»

$r_h(i, j)$
i: ROW NUMBER
j: COLUMN NUMBER

| | 1 | 2 | 3 | 4 | 5 | … | 8 | 9 | … | 12 | 13 | 14 | … | … | 30 | 31 | … | 34 | … | 51 |
|---|---|---|---|---|---|---|---|---|---|---|---|---|---|---|---|---|---|---|---|---|
| 1 | | | | | | | | | | | | | | | | | | | | |
| 2 | | 0 | | 1 | 1 | … | 1 | 1 | … | 1 | 1 | 1 | … | … | 1 | 1 | … | 1 | … | 1 |
| 3 | | | | | | | | | | | | | | | | | | | | |
| 4 | | −1 | | 0 | 0 | … | 1 | 1 | … | 1 | 1 | 1 | … | … | 1 | 1 | … | 1 | … | 1 |
| 5 | | −1 | | 0 | 0 | … | 1 | 1 | … | 1 | 1 | 1 | … | … | 1 | 1 | … | 1 | … | 1 |
| … | | … | | … | … | … | … | … | … | … | … | … | … | … | … | … | … | … | … | … |
| 8 | | 1 | | −1 | −1 | … | 0 | 0 | … | 0 | 0 | 0 | … | … | 1 | 1 | … | 1 | … | 1 |
| 9 | | 0 | | −1 | −1 | … | 0 | 0 | … | 0 | 0 | 0 | … | … | 1 | 1 | … | 1 | … | 1 |
| … | | … | | … | … | … | … | … | … | … | … | … | … | … | … | … | … | … | … | … |
| 12 | | −1 | | −1 | −1 | … | 0 | 0 | … | 0 | 0 | 0 | … | … | 1 | 1 | … | 1 | … | 1 |
| 13 | | −1 | | −1 | −1 | … | 0 | 0 | … | 0 | 0 | 0 | … | … | 1 | 1 | … | 1 | … | 0 |
| 14 | | −1 | | −1 | −1 | … | 0 | 0 | … | 0 | 0 | 0 | … | … | 1 | 1 | … | 1 | … | 0 |
| … | | … | | … | … | … | … | … | … | … | … | … | … | … | … | … | … | … | … | … |
| 30 | | 1 | | −1 | −1 | … | −1 | 1 | … | −1 | −1 | −1 | … | … | 0 | 1 | … | 1 | … | 1 |
| 31 | | 1 | | −1 | −1 | … | −1 | 1 | … | −1 | −1 | −1 | … | … | −1 | 0 | … | 0 | … | 1 |
| … | | … | | … | … | … | … | … | … | … | … | … | … | … | … | … | … | … | … | … |
| 34 | | −1 | | −1 | 0 | … | −1 | −1 | … | −1 | −1 | −1 | … | … | −1 | 0 | … | 0 | … | 1 |
| … | | … | | … | … | … | … | … | … | … | … | … | … | … | … | … | … | … | … | … |
| 51 | | −1 | | −1 | −1 | … | −1 | −1 | … | −1 | −1 | −1 | … | … | −1 | −1 | … | −1 | … | 0 |

Fig. 10

| CHARACTER STRING DRAWING AREA ID | READ CHARACTER STRING | CHARACTER STRING DRAWING AREA | FIXED-VALUE MATCHING FLAG |
|---|---|---|---|
| 1 | ORDER CONTENT | [xxx, yyy, zzz, www] | ○ |
| 2 | ERROR: NAME OF PERSON IN CHARGE OF ORDERING IS NOT INPUT | [xxx, yyy, zzz, www] | |
| ~~3~~ | ~~SLIP NUMBER~~ | ~~[xxx, yyy, zzz, www]~~ | |
| 4 | P2○2○○204lo54 | [xxx, yyy, zzz, www] | |
| ~~5~~ | ~~NAME OF PERSON IN CHARGE OF ORDERING~~ | ~~[xxx, yyy, zzz, www]~~ | |
| ~~6~~ | ~~CONTRACT TYPE~~ | ~~[xxx, yyy, zzz, www]~~ | |
| 7 | CONVEY | [xxx, yyy, zzz, www] | |
| 8 | COMPANY NAME | [xxx, yyy, zzz, www] | ○ |
| 9 | ■■ TRANSPORT | [xxx, yyy, zzz, www] | |
| 10 | PAYMENT METHOD | [xxx, yyy, zzz, www] | ○ |
| 11 | CORPORATION CARD PAYMENT | [xxx, yyy, zzz, www] | |
| ... | ... | ... | ... |
| 31 | CLOSE | [xxx, yyy, zzz, www] | ○ |
| 103 | SLIP NUMBER | [xxx, yyy, zzz, www] | ○ |
| 105 | NAME OF PERSON IN CHARGE OF ORDERING | [xxx, yyy, zzz, www] | ○ |
| 106 | CONTRACT TYPE | [xxx, yyy, zzz, www] | ○ |
| ... | ... | ... | ... |

Fig. 11

«RELATIVE ARRANGEMENT RELATIONSHIP (HORIZONTAL DIRECTION) OF CHARACTER STRING DRAWING AREAS»

| | 1 | 2 | 4 | 7 | 8 | 9 | 10 | 11 | ... | 31 | 103 | 105 | 106 | ... |
|---|---|---|---|---|---|---|---|---|---|---|---|---|---|---|
| 1 | 0 | −1 | −1 | −1 | −1 | −1 | −1 | −1 | ... | 1 | −1 | −1 | −1 | ... |
| 2 | 1 | 0 | 0 | 0 | 0 | 0 | 0 | 0 | ... | 1 | 0 | 1 | 0 | ... |
| 3 | 1 | 0 | 0 | 0 | −1 | 0 | −1 | 0 | ... | 1 | −1 | 1 | −1 | ... |
| 7 | 1 | 0 | 0 | 0 | −1 | 0 | −1 | 0 | ... | 1 | −1 | 1 | −1 | ... |
| 8 | 1 | 0 | 1 | 1 | 0 | 1 | 0 | 1 | ... | 1 | 0 | 1 | 0 | ... |
| 9 | 1 | 0 | 0 | 0 | −1 | 0 | −1 | 0 | ... | 1 | −1 | 1 | −1 | ... |
| 10 | 1 | 0 | 1 | 1 | 0 | 1 | 0 | 1 | ... | 1 | 0 | 1 | 0 | ... |
| 11 | 1 | 0 | 0 | 0 | −1 | 0 | −1 | 0 | ... | 1 | −1 | 1 | −1 | ... |
| ... | ... | ... | ... | ... | ... | ... | ... | ... | ... | ... | ... | ... | ... | ... |
| 31 | −1 | −1 | −1 | −1 | −1 | −1 | −1 | −1 | ... | 0 | −1 | −1 | −1 | ... |
| 103 | 1 | 0 | 1 | 1 | 0 | 1 | 0 | 1 | ... | 1 | 0 | 1 | 0 | ... |
| 105 | 1 | 0 | 1 | 1 | 0 | 1 | 0 | 1 | ... | 1 | −1 | 0 | −1 | ... |
| 106 | 1 | 0 | 1 | 1 | 0 | 1 | 0 | 1 | ... | 1 | 0 | 1 | 0 | ... |
| ... | ... | ... | ... | ... | ... | ... | ... | ... | ... | ... | ... | ... | ... | ... |

$s_l(i,j)$
$i$: ROW NUMBER
$j$: COLUMN NUMBER

«RELATIVE ARRANGEMENT RELATIONSHIP (HORIZONTAL DIRECTION) OF CHARACTER STRING DRAWING AREAS»

| | 1 | 2 | 4 | 7 | 8 | 9 | 10 | 11 | ... | 31 | 103 | 105 | 106 | ... |
|---|---|---|---|---|---|---|---|---|---|---|---|---|---|---|
| 1 | 0 | 1 | 1 | 1 | 1 | 1 | 1 | 1 | ... | 1 | 1 | 1 | 1 | ... |
| 2 | −1 | 0 | 1 | 1 | 1 | 1 | 1 | 1 | ... | 1 | 1 | 1 | 1 | ... |
| 3 | −1 | −1 | 0 | 1 | 1 | 1 | 1 | 1 | ... | 1 | 0 | 0 | 1 | ... |
| 7 | −1 | −1 | −1 | 0 | 1 | 1 | 1 | 1 | ... | 1 | −1 | −1 | 0 | ... |
| 8 | −1 | −1 | −1 | −1 | 0 | 0 | 1 | 1 | ... | 1 | −1 | −1 | −1 | ... |
| 9 | −1 | −1 | −1 | −1 | 0 | 0 | 1 | 1 | ... | 1 | −1 | −1 | −1 | ... |
| 10 | −1 | −1 | −1 | −1 | −1 | −1 | 0 | 0 | ... | 1 | −1 | −1 | −1 | ... |
| 11 | −1 | −1 | −1 | −1 | −1 | −1 | 0 | 0 | ... | 1 | −1 | −1 | −1 | ... |
| ... | ... | ... | ... | ... | ... | ... | ... | ... | ... | ... | ... | ... | ... | ... |
| 31 | −1 | −1 | −1 | −1 | −1 | −1 | −1 | −1 | ... | 0 | −1 | −1 | −1 | ... |
| 103 | −1 | −1 | 0 | 1 | 1 | 1 | 1 | 1 | ... | 1 | 0 | 0 | 1 | ... |
| 105 | −1 | −1 | 0 | 1 | 1 | 1 | 1 | 1 | ... | 1 | 0 | 0 | 1 | ... |
| 106 | −1 | −1 | −1 | 0 | 1 | 1 | 1 | 1 | ... | 1 | −1 | −1 | 0 | ... |
| ... | ... | ... | ... | ... | ... | ... | ... | ... | ... | ... | ... | ... | ... | ... |

$s_h(i,j)$
$i$: ROW NUMBER
$j$: COLUMN NUMBER

Fig. 12

<SAMPLE SCREEN DATA ID>
0001

<ASSOCIATION METHOD>

| SCREEN COMPONENT ID AT TIME OF EXECUTION (SAMPLE) | CHARACTER STRING DRAWING AREA ID AT TIME OF EXECUTION (PROCESSING TARGET) |
|---|---|
| 2 | 1 |
| (NONE) | 2 |
| 4 | 103 |
| 5 | 4 |
| 6 | 105 |
| 7 | (NONE) |
| 8 | 106 |
| 9 | 7 |
| 15 | 8 |
| 16 | 9 |
| 17 | 10 |
| 18 | 11 |
| 30 | 12 |
| 31 | 13 |
| 32 | 14 |
| 33 | 15 |
| 34 | 16 |
| 37 | 17 |
| 38 | 18 |
| 41 | 19 |
| 44 | 20 |
| 45 | 21 |
| (NONE) | 22 |
| (NONE) | 23 |
| (NONE) | 24 |
| (NONE) | 25 |
| (NONE) | 26 |
| (NONE) | 27 |
| (NONE) | 28 |
| (NONE) | 29 |
| (NONE) | 30 |
| 51 | 31 |

Fig. 24

(1) <SCREEN IMAGE>

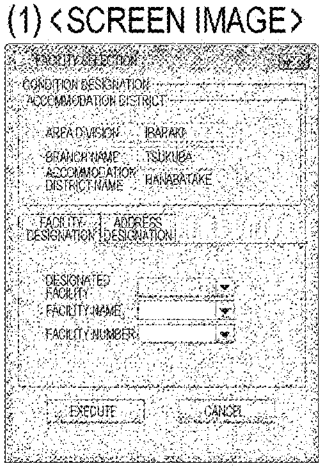

(2) <SCREEN ATTRIBUTES>

| ATTRIBUTE NAME | ATTRIBUTE VALUE |
|---|---|
| TITLE | FACILITY SELECTION |
| CLASS NAME | MngAppDialogWnd |
| COORDINATE VALUE OF DISPLAY AREA | [10, 15, 370, 495] |
| PROGRAM NAME | FacilityManager.exe |

(3) <SCREEN COMPONENT OBJECT INFORMATION>

(3-1) <<ATTRIBUTES OF SCREEN COMPONENT OBJECTS>>

| SCREEN COMPONENT ID AT TIME OF EXECUTION | TYPE | DISPLAY/ NON-DISPLAY STATE | DISPLAY CHARACTER STRING | DRAWING AREA OF SCREEN COMPONENT |
|---|---|---|---|---|
| 1 | WINDOW | DISPLAY | FACILITY SELECTION | [0, 0, 360, 480] |
| 2 | PANE | DISPLAY | CONDITION DESIGNATION | [16, 48, 344, 396] |
| 3 | PANE | DISPLAY | ACCOMMODATION DISTRICT | [20, 64, 340, 186] |
| 4 | LABEL | DISPLAY | AREA DIVISION | [86, 94, 154, 110] |
| 5 | TEXT BOX | DISPLAY | IBARAKI | [160, 92, 270, 112] |
| ... | ... | ... | ... | ... |
| 11 | TAB PANE | DISPLAY | FACILITY DESIGNATION | [18, 196, 342, 394] |
| 12 | LABEL | DISPLAY | DESIGNATED FACILITY | [92, 270, 150, 286] |
| 13 | LIST BOX | DISPLAY | | [154, 268, 262, 288] |
| ... | ... | ... | ... | ... |
| 18 | TAB PANE | DISPLAY | ADDRESS DESIGNATION | [18, 196, 342, 394] |
| 19 | LABEL | NON-DISPLAY | PREFECTURES | [92, 270, 150, 286] |
| ... | ... | ... | ... | ... |
| 27 | BUTTON | DISPLAY | EXECUTE | [48, 408, 160, 432] |
| 28 | BUTTON | DISPLAY | CANCEL | [200, 408, 312, 432] |

(3-2) <<SCREEN STRUCTURE>>

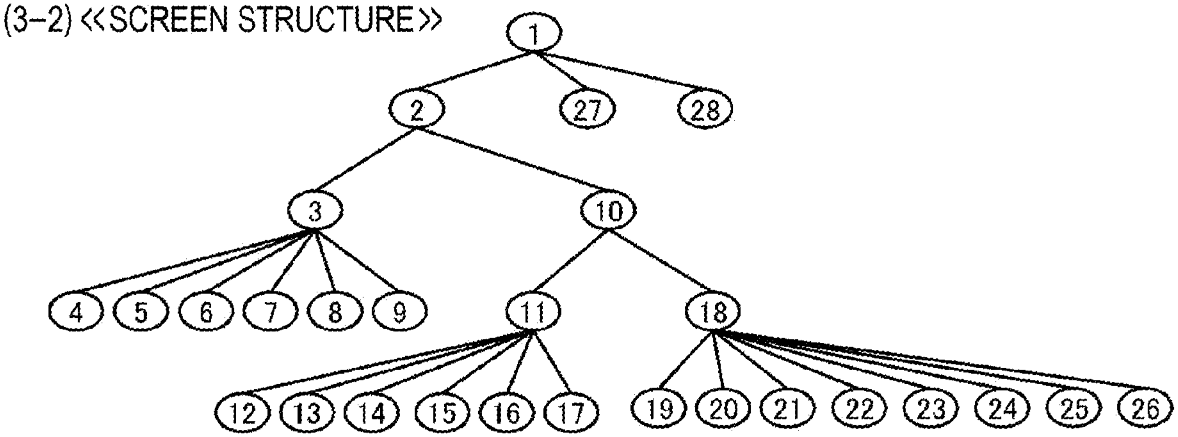

IDENTIFICATION DEVICE, IDENTIFICATION METHOD, AND IDENTIFICATION PROGRAM

CROSS-REFERENCE TO RELATED APPLICATIONS

This application is a U.S. 371 Application of International Patent Application No. PCT/JP2021/022420, filed on 11 Jun. 2021, the disclosure of which is hereby incorporated herein by reference in its entirety.

TECHNICAL FIELD

The present invention relates to an identification device, an identification method, and an identification program.

BACKGROUND ART (1. Screen Data of Operation Target Application)

Conventionally, in terminal work, a worker (hereinafter, also referred to as a "user") refers to a value displayed in a text box, a list box, a button, a label, or the like (hereinafter, referred to as a "screen component") included in a screen of an operation target application operating in a terminal, and performs an operation such as input or selection of a value on a screen component. Therefore, in a part of a program for the purpose of automation and support of the terminal work (hereinafter, referred to as an "automatic operation agent") and a program for the purpose of grasping and analyzing a work actual state (hereinafter, referred to as a "work analysis tool"), the following "screen data" or a part thereof is acquired and used.

Here, as illustrated in FIG. 24, the "screen data" includes a "screen image" (refer to FIG. 24 (1)), "screen attributes (title, class name, coordinate value of drawing area, name of displayed operation target application, and the like)" (refer to FIG. 24 (2)), and "screen component object information" (refer to FIG. 24 (3)).

Note that the automatic operation agent is a program that records and saves, as a scenario, additional information desired to be referred to together with operation content of a worker on a terminal and screen display content of an operation target application, and opens and reproduces the scenario to repeatedly perform the same operation content many times thereafter or display the additional information according to the display screen. Hereinafter, the automatic operation agent and the work analysis tool are collectively referred to as an "automatic operation agent and the like".

The screen image and the screen attributes can be acquired by an interface provided by an operating system (OS). Furthermore, screen component objects (hereinafter, also simply referred to as "objects") are data obtained by preparing the display content, the state, and the like of each screen component on a memory of a computer as a variable value of the operation target application so that the OS or the operation target application easily controls behavior of the screen component at the time of operation, draws a screen image, and the like, and the information can be acquired by User Interface Automation (hereinafter, referred to as "UIA"), Microsoft Active Accessibility (Hereinafter, referred to as "MSAA"), or an interface uniquely provided by the operation target application. The information of objects includes not only information that can be used by each of the objects alone (hereinafter, referred to as "attributes"), such as a type of a screen component, a display/non-display state, a display character string, and a coordinate value of a drawing area, but also information indicating relationship such as inclusion relationship or ownership relationship between the objects (hereinafter, the information is referred to as a "screen structure") held inside the operation target application (see FIG. 24 (3-1) (3-2)).

Even if functions provided to workers are the same (hereinafter, described as "equivalent") in screens displayed on different terminals at different time points, values of attributes of some objects may be different or the presence or absence of the objects may be different depending on the displayed case or work performance status. For example, in a case where the number of items included in the case is different, the number of rows in a list on which the items are displayed may be different, or display/non-display of an error message may be different depending on the work performance status, and the screen structure also varies. Furthermore, there is also a case where information of objects including a screen structure varies (hereinafter, referred to as a "difference in screen mounting content") due to a difference in, in addition to the OS, a platform of a graphical user interface (GUI) used by the operation target application for screen display (for example, the platform is Microsoft Foundation Class, .NET Framework, Java (registered trademark) swing, and the like) or a version thereof (hereinafter, the difference is referred to as a "difference in screen implementation method") even if the functions are equivalent.

The screen image reflects the presence or absence of objects and the information. The values of attributes of some objects are different or the presence or absence of the objects is different depending on the displayed case or the work performance status, and when the screen structure varies, the screen image also varies. Furthermore, as compared with the information of the objects, the screen image is susceptible to a difference in setting of a customization function of the OS or the operation target application, a difference in the number of colors depending on the display environment, a difference in options depending on the communication conditions at the time of remote login of a remote desktop, and the like (hereinafter, the differences are referred to as a "difference in look and feel"). These variations in the screen image include variations in the position, size, hue, and font type and size of a character string displayed on a screen component in an area occupied by each screen component in the screen image.

(2. Identification of Screen and Screen Components)

In the automatic operation agent, screen data used as a sample is acquired in a specific terminal at the time of an operation setting, and screen components that are targets of acquisition of display values and operations (hereinafter, referred to as "control targets") are designated using the acquired screen data. At the time of execution of processing of automation or support, screen data (hereinafter, referred to as "processing target screen data") is acquired from a screen displayed on any terminal including a terminal other than the specific terminal that has performed the operation setting at that time, and is collated with sample screen data or determination conditions of equivalence of a screen or screen components obtained by processing of the sample screen data or created with reference to the sample screen data by a person. As a result, screen components equivalent to the screen components that are the control targets in the sample screen data are identified from the screen data at that time, and are set as targets of acquisition of display values and operations.

Furthermore, the work analysis tool acquires screen data and information regarding an operation at timing when a worker performs the operation on a screen component in each terminal, and collects the information as an operation log. In order to enable grasping and analyzing patterns and tendencies by a person for a large number of collected operation logs, screen data acquired by different terminals at different time points is classified such that screens and screen components that are operation targets that are equivalent to each other are in the same groups, and is used for deriving a screen operation flow, counting the number of times of operation performance, operation time, and the like. As a method of performing this classification, a method of sampling some screen data from a large number of operation logs to obtain sample screen data, collating screen data of remaining operation logs with the sample screen data, and determining classification categories is conceivable.

Alternatively, masking of a portion where confidential information is displayed may be necessary for screen data in operation logs acquired by the work analysis tool. As a method of performing this masking, first, a sample of screen data on which confidential information is displayed is set as sample screen data, and a screen component that is a masking target is designated in the sample screen data. A method of collating screen data of remaining operation logs with the sample screen data, identifying a screen component equivalent to the screen component that is a masking target in the sample screen data, and performing masking is conceivable.

Hereinafter, for sample screen data and processing target screen data acquired by different terminals at different time points, determining whether the screen or the screen components are equivalents that provide the same function to workers, and identifying equivalents of the screen components of the sample screen data from the screen components of the processing target screen data are described as "identification" (see FIG. 25). Note that broken line arrows illustrated in FIG. 25 indicate association of the screen components between the sample and the processing target in the identification. The arrows do not represent all association relationship, but are extracted partially.

Furthermore, a process of, prior to the identification, preparing various types of data other than the processing target screen data used for the identification in addition to the sample screen data will be described as an "identification operation setting". In the use of the automatic operation agent, the setting corresponds to a process of acquiring screen data used as a sample in a specific terminal and designating screen components that are control targets using the acquired screen data. In the use of the work analysis tool, the setting corresponds to a process of preparing sample screen data by sampling some screen data from a large number of acquired operation logs.

Note that identification of a screen based on screen attributes and identification of screen components based on information of the screen components are in complementary relationship. For example, even if the titles of the screens are the same, screen components included therein may be completely different, and thus whether the screens are equivalent cannot be determined in a case where only the screen attributes are compared. Whether screen components equivalent to the screen components that are control targets in the sample screen data are included in the processing target screen data is checked by the identification of the screen components, and on the basis of the result, whether the screen data is equivalent can be determined. Conversely, if the titles of the screens are different, the screens can be determined not to be equivalent without identification of a plurality of screen components, which helps reduce a calculation amount.

(3. Technology Related to Identification of Screen Components)

(3-1. Object Access Method)

An object access method is a method in which screen component object information is used as sample screen data and processing target screen data instead of a screen image. Note that a terminal that cannot access objects of screen components of a desktop or an operation target application itself such as a remote desktop is referred to as a "virtualization environment", and a terminal that can access the objects is referred to as a "non-virtualization environment".

(3-2. Image Recognition Method)

An image recognition method is a method in which screen images are used as sample screen data and processing target screen data instead of screen component object information.

(3-3. Object Access/Image Recognition Combined Use Method)

An object access/image recognition combined use method is a method of simultaneously performing or switching and performing both the object access method and the screen recognition method (see, for example, Patent Literature 1).

(3-4. Equivalence Determination Condition Method)

An equivalence determination condition method is a method in which determination conditions of equivalence of screen components are used instead of sample screen data. The method is further divided depending on whether screen component object information is used or a screen image is used as processing target screen data.

(4. Technology Related to Acquisition of Display Character Strings)

(4-1. Object Access Method)

The object access method is a method in which a screen image is not used but screen component object information is used as processing target screen data, and display character strings can be easily acquired using the UIA, the MSAA, or an interface uniquely provided by an operation target application.

(4-2. Optical Character Recognition Method)

An optical character recognition method is a method in which a screen image is used but screen component object information is not used as processing target screen data, and use of optical character recognition (OCR) technology is conceivable.

CITATION LIST

Patent Literature

Patent Literature 1: JP 2015-005245 A

SUMMARY OF INVENTION

Technical Problem

However, in the above-described conventional technology, identification of a screen and screen components of an application and acquisition of display character strings cannot be performed accurately without time and effort being taken for an operation setting of identification and a reading setting of the display character strings in a virtualization environment. This is because the above-described conventional technology has the following issues.

(1. Issues Related to Identification of Screen Components)

(1-1. Issue Related to Object Access Method)

In the object access method, only a screen image is transferred in a virtualization environment, and an automatic operation agent or the like cannot access objects, and thus screen components cannot be identified.

(1-2. Issue Related to Image Recognition Method)

In the image recognition method, a screen image is more susceptible to a difference in look and feel than in the object access method, and a variation occurs, and thus screen components cannot be correctly identified. Furthermore, in the image recognition method, a screen image is greatly affected by the display magnification of the screen, and a variation occurs, and thus screen components cannot be correctly identified.

(1-3. Issue Related to Object Access/Image Recognition Combined Use Method)

In the object access/image recognition combined use method, both methods can be used complementarily with each other, and can be used adaptively on the assumption that both methods can be used only in a case where not only a screen image but also objects can be accessed, and in use of a virtualization environment that does not satisfy the condition, screen components cannot be correctly identified.

(1-4. Issue Related to Equivalence Determination Condition Method)

In the equivalence determination condition method, in a case where screen component object information is used, an "arrangement pattern" representing conditions of relative arrangement relationship in a sample screen (two-dimensional plane) between screen components is used as determination conditions of equivalence of screen components that are control targets, however, it is assumed that the screen component object information is used as processing target screen data, and screen components cannot be identified in a virtualization environment. Furthermore, in the above method, currently, a person needs to create an arrangement pattern for each screen or each screen component while assuming a variation that may occur in a processing target screen.

Furthermore, in the equivalence determination condition method, in a case of using a screen image, a "screen model" is prepared as a graph in which fragments of the screen image corresponding to screen components, display character strings, or regular expressions thereof are nodes, and adjacency relationship therebetween in a sample screen (two-dimensional plane) is links, and matching is performed with a processing target screen image or character strings acquired from a partial area of the image using the OCR technology, however, similarly to the above arrangement pattern, currently, a person needs to create a screen model for each screen or screen component while assuming a variation that may occur in the processing target screen.

(2. Issues Related to Acquisition of Display Character Strings)

(2-1. Issue Related to Object Access Method)

In the object access method, display character strings can be easily acquired using the UIA, the MSAA, or an interface uniquely provided by an operation target application, but display character strings cannot be acquired in a virtualization environment because screen component object information is used.

(2-2. Issue Related to Optical Character Recognition Method)

In the optical character recognition method, many display character strings including errors are acquired because display character strings of a plurality of screen components drawn on a screen image are recognized without preconditions regarding the font type and size after reflection of the display magnification.

Solution to Problem

In order to solve the above-described issues and achieve the object, an identification device according to the present invention includes a first identification unit that identifies first screen data including an image of a screen of an application and information regarding a screen component object that is an object of an element included in the screen, and outputs a first identification result associated with sample screen data that is screen data to be referred to, and a second identification unit that identifies second screen data including an image of the screen and not including information regarding the screen component object, and outputs a second identification result associated with the sample screen data.

Furthermore, an identification method according to the present invention is an identification method performed by an identification device, the identification method including a process of identifying first screen data including an image of a screen of an application and information regarding a screen component object that is an object of an element included in the screen, and outputting a first identification result associated with sample screen data that is screen data to be referred to, and a process of identifying second screen data including an image of the screen and not including information regarding the screen component object, and outputting a second identification result associated with the sample screen data.

Furthermore, an identification program according to the present invention is an identification program causing a computer to perform a step of identifying first screen data including an image of a screen of an application and information regarding a screen component object that is an object of an element included in the screen, and outputting a first identification result associated with sample screen data that is screen data to be referred to, and a step of identifying second screen data including an image of the screen and not including information regarding the screen component object, and outputting a second identification result associated with the sample screen data.

Advantageous Effects of Invention

According to the present invention, identification of a screen and screen components of an application and acquisition of display character strings can be performed accurately without time and effort being taken for an operation setting of identification and a reading setting of the display character strings in a virtualization environment.

BRIEF DESCRIPTION OF DRAWINGS

FIG. 3 is a diagram illustrating an example of data stored in a screen data storage unit according to the first embodiment.

FIG. 4 is a diagram illustrating an example of data stored in a processing result storage unit according to the first embodiment.

FIG. 5 is a diagram illustrating an example of data stored in an identification information storage unit according to the first embodiment.

FIG. 8 is a diagram illustrating an example of data stored in a screen model storage unit according to the first embodiment.

FIG. 9 is a diagram illustrating an example of data stored in the screen model storage unit according to the first embodiment.

FIG. 10 is a diagram illustrating an example of data stored in a drawing area storage unit according to the first embodiment.

FIG. 11 is a diagram illustrating an example of data stored in an arrangement relationship storage unit according to the first embodiment.

FIG. 12 is a diagram illustrating an example of data stored in a second identification result storage unit according to the first embodiment.

FIG. 24 is a diagram illustrating an example of screen data.

DESCRIPTION OF EMBODIMENTS

Hereinafter, an embodiment of an identification device, an identification method, and an identification program according to the present invention will be described in detail with reference to the drawings. Note that the present invention is not limited to the embodiment described below.

First Embodiment

Hereinafter, a configuration of an identification system 100 according to a first embodiment (as appropriate, the present embodiment), comparison between the conventional art and the present embodiment, a configuration of an identification device 10 and the like, details of each type of processing, and a flow of each type of processing will be sequentially described, and finally, effects of the present embodiment will be described.

[Configuration of Identification System 100]

Figure 1:
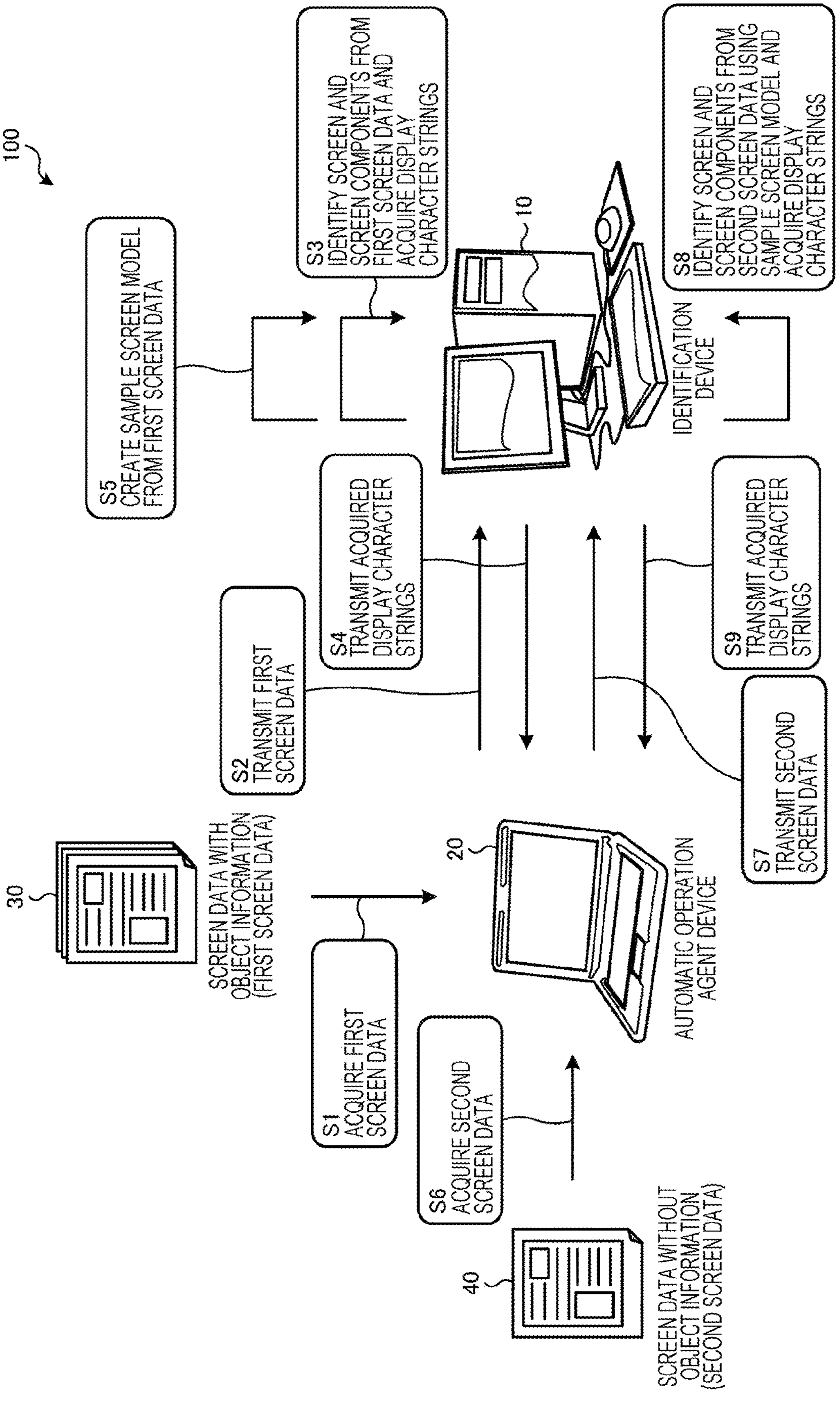
FIG. 1 is a diagram illustrating a configuration example of an identification system according to a first embodiment.

The configuration of the identification system (as appropriate, the present system) 100 according to the present embodiment will be described in detail with reference to FIG. 1. FIG. 1 is a diagram illustrating a configuration example of the identification system according to the first embodiment. Hereinafter, processing of the present system 100 will be described after the configuration example of the entire present system 100 is described.

(1. Configuration Example of Entire System)

The present system 100 includes the identification device 10 and an automatic operation agent device 20 that performs functions of an automatic operation agent and the like. The identification device 10 and the automatic operation agent device 20 are disposed in the same terminal, and are communicably connected by an application programming interface (API) between the devices, an interprocess communication means provided by an OS of the terminal, or the like, or are communicably connected by wire or wirelessly via a predetermined communication network (not illustrated). Note that the identification system 100 illustrated in FIG. 1 may include a plurality of identification devices 10 and a plurality of automatic operation agent devices 20.

Here, in FIG. 1, the automatic operation agent device 20 is formed independently of the identification device 10, but may be formed to be integrated with the identification device 10. That is, the identification device 10 may be another device that operates in cooperation with the automatic operation agent device 20, or may be implemented as a part of the automatic operation agent device 20.

Furthermore, in the present system 100, screen data with object information (hereinafter, also referred to as "first screen data") 30 and screen data without object information (hereinafter, also referred to as "second screen data") 40 are involved as data acquired by the automatic operation agent device 20. Here, the first screen data 30 is screen data including information of screen component objects that are attributes of the objects or a screen structure (hereinafter, also referred to as "information regarding screen component objects") in addition to a screen image. The second screen data 40 is screen data including the screen image but not including the information of the screen component objects.

(2. Processing of Entire System)

In the system as described above, an example will be described in which screen/screen components are identified in a non-virtualization environment, display character strings are acquired, screen data used at that time is recorded, the recorded screen data is referred to in a virtualization environment, thereby screen/screen components are identified, and display character strings are acquired.

First, the automatic operation agent device 20 acquires the first screen data 30 in the non-virtualization environment (step S1), and transmits the acquired first screen data 30 to the identification device 10 (step S2). Next, the identification device 10 identifies a screen and screen components from the first screen data 30 transmitted by the automatic operation agent device 20, acquires display character strings (step S3), and transmits the acquired display character strings and information necessary for identification of screen components that are control targets to the automatic operation agent device 20 (step S4). Hereinafter, processing performed in steps S1 to S4 described above is also referred to as an "object information using mode".

Furthermore, the identification device 10 creates a sample screen model used in the non-virtualization environment from the first screen data 30 (step S5). Hereinafter, processing performed in step S5 is also referred to as a "sample screen modeling mode".

On the other hand, the automatic operation agent device 20 acquires the second screen data 40 in the non-virtualization environment (step S6), and transmits the acquired second screen data 40 to the identification device 10 (step S7). Then, the identification device 10 identifies a screen and screen components from the second screen data 40 transmitted by the automatic operation agent device 20 using the sample screen model created in processing in step S5 described above, acquires display character strings (step S8), and transmits the acquired display character strings and information necessary for identification of screen components that are control targets to the automatic operation agent device 20 (step S9). Hereinafter, processing performed in steps S6 to S9 described above is also referred to as an "object information non-using mode".

The identification system 100 according to the present embodiment performs an operation setting of identification similar to the object access method described above and checks the same using an actual screen of an operation target application in the non-virtualization environment. At that time, sample screen data used for the operation setting of identification and identification case screen data determined to have equivalence with the sample screen data at the time of checking the operation setting of identification are acquired and accumulated including screen component object information. The information of the objects is used for identification of screen components and reading of display character strings in the virtualization environment. Therefore, the present system 100 enables correct identification processing without being affected by an execution environment and operation limitations even in the virtualization environment.

[Comparison Between Conventional Identification Processing And Identification Processing According to Present Embodiment]

Here, conventional identification processing generally performed will be described as a reference technology. Hereinafter, conventional screen component identification processing and conventional display character string acquisition processing will be described, and then screen component identification processing and display character string acquisition processing according to the present embodiment will be described.

(1. Conventional Screen Component Identification Processing)

(1-1. Object Access Method)

As described above, the object access method is a method in which screen component object information is used as sample screen data and processing target screen data instead of screen images. For example, there is known a method (conventional identification method A) of determining equivalence of screens and screen components by comparing screen structures of a sample and a processing target on the assumption that screen component objects are accessed. In the conventional identification method A, a person does not always need to create determination conditions of equivalence of screen components.

In a case where a virtualization desktop such as a remote desktop or an application is an operation target, normally, only a screen image is transferred to a terminal directly operated by a worker, and an automatic operation agent or the like operating in the terminal directly operated by the worker cannot access objects of screen components of the operation target application. On the other hand, there is known a method (conventional identification method B) of, by installing a plug-in in a server in which the operation target application itself is operating (hereinafter, the server is referred to as a "thin client server") and a terminal to which only a screen image is transferred (hereinafter, the terminal is referred to as a "thin client client"), enabling an automatic operation agent or the like operating in the thin client client to access objects of screen components of the operation target application itself operating in the server.

However, in the object access method, only a screen image is normally transferred in the virtualization environment, and an automatic operation agent or the like cannot access objects. Therefore, screen components cannot be identified only by the object access method including the conventional identification method A (issue a).

Furthermore, it can be said that the conventional identification method B solves the issue a by enabling an automatic operation agent or the like operating in a client to transparently access objects of screen components of the operation target application itself operating in a thin client server. However, a change in the environment of a server is involved, that is, for example, a plug-in needs to be installed not only in a thin client client but also in the server. This means that the behavior, including performance aspects, of an operation target application operating on a server may be affected. Furthermore, the influence is constant throughout the entire time zone in which terminal work is performed. Therefore, measures including investigation of the presence or absence of the influence and enhancement of server resources by an organization responsible for providing and operating an operation target application are required. This is a major barrier when an automatic operation agent or the like is used as a work efficiency improving means that can be promoted on the initiative of an organization responsible for terminal work (issue b).

Furthermore, since object access is assumed in both the conventional identification methods A and B, correctly identifying screen components is difficult due to a difference in screen mounting content of an operation target application (issue c).

(1-2. Image Recognition Method)

As described above, the image recognition method is a method in which screen images are used as sample screen data and processing target screen data instead of screen component object information. Note that, a method of dividing an entire screen image into areas and using the divided areas instead of using the entire screen image as it is as a screen image used as sample screen data is also included. For example, as "image area identifying processing" in an "adaptive operator emulation method", there is known a method (conventional identification method C) of determining equivalence of screen components by matching template images of screen components, that is, fragments of a sample screen image, and a screen image that is a processing target.

It can be said that the conventional identification method C solves the issues a to c by using screen images for both sample screen data and processing target screen data. However, a screen image is more susceptible to a difference in look and feel than in the object access method, and a variation occurs accordingly, and thus screen components cannot be correctly identified (issue d).

Furthermore, a screen image is greatly affected by the display magnification of the screen, and a variation occurs, and thus screen components cannot be correctly identified (issue e). Specifically, first, the size of an area of the image corresponding to the same portion of the screen changes. Furthermore, even if either an acquired sample screen image or a processing target screen image is enlarged such that the size of an area of the image corresponding to the same portion of the screen is the same, the resolution of the image is finite, and thus images are not the same. This is not only that the smoothness of lines is different, but also that some lines are omitted depending on the displayed characters and are different as a topology. In the conventional identification method C, not displayed character strings but screen images as a result of drawing the character strings are compared with each other, and thus even if a scale-invariant feature transform (SIFT) feature amount or the like that is not affected by the display magnification is used, failure in identification of screen components due to a variation of an image as described above cannot be avoided in principle. Furthermore, as a result of the issues d and e, re-performing of a part of the operation setting of identification such as re-acquiring template images occurs as an operational issue of an automatic operation agent or the like.

Furthermore, in the conventional identification method C, a person needs to distinguish and designate "what type of feature displayed on the screen is used as a mark to identify screen components that are control targets" while assuming a variation that may occur in a processing target screen using a sample screen as a clue in the operation setting of identification. In particular, in a case where screen components themselves that are control targets do not have a feature serving as a mark, one or more surrounding screen components that can serve as marks need to be detected, and determination conditions of equivalence of screen components needs to be prepared as conditions of relative arrangement relationship with the one or more screen components, and thus the difficulty level is high (issue f).

(1-3. Object Access/Image Recognition Combined Use Method)

As described above, the object access/image recognition combined use method is a method of simultaneously performing or switching and performing both the object access method and the screen recognition method. For example, there is known a method (conventional identification method D) of representing a screen as a tree structure in which screen components are nodes and their inclusion relationship is parent-child relationship using at least one or more information resources among screen component objects obtained through a hyper text markup language (HTML) file, the UIA, images, and the like, and identifying screen components that are control targets.

Furthermore, as a method of solving an issue in a case where an automatic operation agent is performed in a plurality of terminals or GUI platforms having different settings and a case where the automatic operation agent is applied to an operation target application partially changed by version upgrade, a method of simultaneously performing both identification processing by the object access method and identification processing by the screen recognition method and verifying validity by comparison of results is known. Furthermore, there is known a method (conventional identification method E) of recording template images of screen components necessary for identification by the image recognition method while performing identification by the object access method and automatic operation by the object access method, or conversely, recording screen component object information necessary for identification by the object access method while performing identification by the image recognition method and automatic operation by the image recognition method.

It can be said that the conventional identification method D is a method in which information resources such as screen component objects and images are abstracted and handled, and identification of screen components is implemented as a unified method. However, in a case where a screen image or a fragment thereof is used as sample screen data, a screen image is also compared as processing target screen data, and in a case where screen component object information is used as sample screen data, screen component object information is compared as processing target screen data, thereby identifying screen components, and thus the issues a to e of the object access method and the image recognition method are not solved by this method. Furthermore, in a case where images are used as information resources, how an "information resource acquisition program" creates a tree structure in which images of screen components are nodes and inclusion relationship therebetween is parent-child relationship from the screen image is unclear, and it cannot be said that the issue f has been solved.

In the conventional identification method E, identification by the object access method and identification by the image recognition method are used together for the same screen, and a scenario (including information necessary for identification) corresponding to both methods is recorded by an example operation in a terminal in which an operation target application is not virtualized, and only identification by the image recognition method is performed in a terminal in which the operation target application or the desktop is virtualized, so that the scenario can be used without being changed, and it can be said that the issues a to b are solved.

Furthermore, by using identification by the object access method and identification by the image recognition method in a mutually complementary manner, even in a case where screen components cannot be identified by the object access method due to a difference in screen mounting content between sample screen data and processing target screen data, the screen components can be identified by the image recognition method if a difference in look and feel and the display magnification of the screen is sufficiently small. Conversely, even in a case where a screen configuration cannot be identified by the image recognition method due to a difference in look and feel and the display magnification of the screen, the screen components can be identified by the object access method if there is no difference in screen mounting content.

Furthermore, as described above, adaptive evolutionary use is possible in which, when screen components are identified by one method, template images of the screen components or information of objects that is necessary for identification of the screen components by the other method is recorded in parallel and can be used in subsequent identification. As a result, in a case where a change in screen mounting content and a change in look and feel and display magnification of the screen sequentially occur at intervals in long-term operation of an automatic operation agent and a work analysis tool, a cycle in which information necessary for identification by a method affected by the change is updated to conform to the changed screen is established. Thus, it can be said that the issues c to e are also solved under certain conditions.

However, both methods can be used complementarily with each other, and can be used adaptively on the assumption that both methods can be used only in a case where not only a screen image but also objects can be accessed, and in use of a virtualization environment that does not satisfy the conditions, the issues d and e are not solved. This is described in a little more detail below.

In a case where identification processing is performed in a virtualization environment, objects cannot be accessed, and thus, complementation cannot be performed by the object access method. Furthermore, there may be an operational restriction that a virtualization environment is used for regular work by a worker, and use of a non-virtualization environment can be used only in a case where permission of an organization responsible for providing and operating an operation target application can be obtained for a temporary use such as verification of the operation target application. In a case where an automatic operation agent or the like is used as an operation efficiency improving means that can be promoted on the initiative of an organization responsible for terminal work, under such an operation condition, using a non-virtualization environment in which both methods can be used each time a difference in look and feel or display magnification mainly caused by a difference in environment on a terminal side, such as a difference in the number of colors depending on the display environment or a difference in options depending on the communication conditions at the time of remote login by a remote desktop, occurs is difficult. As a result, information necessary for identification cannot be updated.

Furthermore, in a case where a difference in look and feel is derived from a difference in options depending on the communication conditions at the time of remote login by a remote desktop, reproducing the same look and feel of a virtualization environment is difficult even if a non-virtualization environment can be used, and both methods cannot be used in an adaptive evolution manner.

As a result, it is substantially equivalent to using the screen recognition method alone, and re-performing of a part of the operation setting of identification such as re-acquisition of template images occurs as an operational issue of an automatic operation agent or the like as in a method of the image recognition method alone. Furthermore, even in a case where the use is limited to the non-virtualization environment, in a case where a difference in screen mounting content and a difference in at least one of look and feel or display magnification of the screen occurs at the same time, screen components cannot be correctly identified by either method, and the issues c to e are not solved. Furthermore, in the operation setting of identification, the issue f regarding designation of determination conditions of equivalence of screen components, such as areas in a sample screen image used as template images and conditions of relative arrangement relationship with the areas, which are necessary for the image recognition method, is not solved.

(1-4. Equivalence Determination Condition Method)

As described above, the equivalence determination condition method is a method in which determination conditions of equivalence of screen components are used instead of sample screen data. The method is further divided depending on whether screen component object information is used or a screen image is used as processing handling screen data. For example, there is known a method (conventional identification method F) of identifying screen components by preparing an "arrangement pattern" representing conditions of relative arrangement relationship in a sample screen (two-dimensional plane) between screen components as determination conditions of equivalence of screen components that are control targets on the premise that screen component object information is used as processing target screen data, and searching the processing target screen for screen components satisfying the arrangement pattern.

Furthermore, there is known a method (conventional identification method G) of identifying a state of a screen by preparing a "screen model" as a graph in which fragments of a screen image corresponding to screen components or regular expressions of display character strings are nodes and adjacency relationship therebetween in a sample screen (two-dimensional plane) is links on the premise that the screen image is used as processing target screen data, and performing matching with the screen image that is a processing target or character strings acquired from a partial area of the screen image using the optical character recognition (OCR) technology.

It can be said that the conventional identification method F solves the issues c to e by using an "arrangement pattern" representing conditions of relative arrangement relationship between screen components in a sample screen (two-dimensional plane) as determination conditions of equivalence of screen components that are control targets. However, it is assumed screen component object information is used as processing target screen data, and the issues a and b are not solved.

Furthermore, a method of automatically creating an arrangement pattern used for identification of a processing target screen from relative arrangement relationship between screen components designated at the time of the operation setting of identification in a sample screen (two-dimensional plane), particularly, a method of determining whether to reflect the relative arrangement relationship in conditions of the relative arrangement relationship, assuming that the relative arrangement relationship in the sample screen should be reproduced in the processing target screen to what extent, is unknown. Therefore, currently, a person needs to perform creation for each screen or each screen component while assuming a variation that may occur in a processing target screen, and the issue f is not solved.

In the conventional identification method G, it can be said that the issues a to c are solved by preparing a "screen model" as a graph in which fragments of a screen image corresponding to screen components, display character strings, or regular expressions thereof are nodes and adjacency relationship therebetween in a sample screen (two-dimensional plane) is links, and performing matching with a processing target screen image or character strings acquired from a partial area of the processing target screen image using the OCR technology. However, similarly to an arrangement pattern in the conventional identification method F, currently, a person needs to create a screen model for each screen or each screen component while assuming a variation that may occur in a processing target screen, and the issue f is not solved.

Furthermore, character strings acquired from a partial area of a processing target screen image using the OCR technology include errors derived from the current OCR technology, and, although the influence of a difference in look and feel and display magnification is expected to be reduced, this leads to a failure in matching with the display character strings in the screen model or regular expressions thereof. Therefore, it cannot be said that the issues d to e have been sufficiently solved. There is a possibility that a matching failure can be reduced by assuming that regular expressions of display character strings in a screen model take errors of character strings acquired using the OCR technology into consideration, however, the difficulty of creating a screen model is further increased, which is an adverse effect from the viewpoint of the issue e.

(1-5. Identification Processing of Screen Components According to Present Embodiment)

Hereinafter, identification processing of screen components according to the present embodiment will be described. Firstly, the identification processing of screen components according to the present embodiment enables identification of screen components in a virtualization environment, and contributes to solving the issue a. Secondly, the identification processing of screen components according to the present embodiment does not require an environment change on a thin client server side, thereby contributing to solving the issue b. Thirdly, the identification processing of screen components according to the present embodiment can correctly identify screen components even in a virtualization environment in which objects cannot be accessed or in a non-virtualization environment in which objects can be accessed, or in a case where there is a difference in screen mounting content occurs and also a variation in screen images between a sample and a processing target due to a difference in look and feel or display magnification, and thus contributes to expansion of conditions for solving the issues c to e. Fourthly, in the identification processing of screen components according to the present embodiment, manually creating determination conditions of equivalence of screen components that are control targets for each screen or screen component is not always necessary. Even when the operation setting of identification created in a non-virtualization environment is used for identification of screen components in a virtualization environment, manually changing the operation setting is not necessary, which contributes to solving the issue f.

Furthermore, in the identification processing of screen components according to the present embodiment, as compared with a case where relative arrangement relationship between areas in which character strings are drawn (hereinafter, the areas are referred to as "character string drawing areas") in screen images of sample screen data and identification case screen data is used as a comparison target of relative arrangement relationship between character string drawing areas in a processing target screen image, relative arrangement relationship between areas in which display character strings can be drawn can be more accurately obtained even with a smaller amount of identification case screen data in a case of using relative relationship between screen components, and screen components can be more accurately identified.

(2. Conventional Display Character String Acquisition Processing)

(2-1. Object Access Method)

As described above, the object access method is a method in which screen component object information is used as processing target screen data instead of a screen image. In the above method, since character strings displayed on screen components are often held as the attributes of the objects, the character strings can be easily acquired using the UIA, the MSAA, or an interface uniquely provided by an operation target application (conventional character string acquisition method A). However, the object access method has the same issues as the issues a and b regarding identification of screen components.

(2-2. Optical Character Recognition Method)

The optical character recognition method is a method in which a screen image is used as processing target screen data instead of screen component object information. In this manner, character strings displayed on screen components are also acquired from the screen image. As a method therefor, use of the OCR technology is conceivable. Note that OCR technology in a narrow sense refers to reading character strings from images obtained by cutting out only character string drawing areas, but in the following description, OCR technology including an image processing technology such as detection of character string drawing areas performed as preprocessing is also described to as "OCR technology". As a method of using the OCR technology, a method of acquiring all display character strings of a plurality of screen components using the same setting (conventional character string acquisition method B), such as applying the OCR technology to an entire screen image, is conceivable.

Furthermore, a method (conventional character string acquisition method C) is also conceivable in which a screen image is divided into areas of screen components and character strings using the image processing technology, and then display character strings are acquired using a setting reflecting conditions of a character string in each of the areas, for example, the number of characters, a character type, a font type, a font size, and the like.

Since the conventional character string acquisition methods B and C do not require screen component object information of a processing target, it can be said that the conventional character string acquisition methods B and C solve the issues a and b. However, in the OCR technology, in a case where display character strings of a plurality of screen components drawn on a screen image are all acquired using the same setting (conventional character string acquisition method B), many characters are correctly acquired, but errors are also included (issue g). Characters are likely to be mistaken for characters that are different types but similar as figures, for example, a number zero "0", the upper or lower case O "O" and "o" of an alphabet, a mark "o" of a symbol, a number one "1" and the lower case L "l" of an alphabet, kuchi [mouth] "kuchi" of a Chinese character and ro "ro" of a katakana. Furthermore, even if the characters are limited to the printing type, recognition without preconditions regarding the font type and size after reflection of the display magnification is also considered to be a factor of errors.

In the conventional character string acquisition method C, it can be said that the issue g is solved by, in a case where a screen of a business system is set as a recognition target, using the fact that there is a certain degree of conditions in a display character string for each screen component, and designating a setting of the number of characters, the type of characters, and the font type and size (hereinafter, the setting is referred to as a "reading setting") for each area of the recognition target so that the conditions can be used for recognition. However, even if the font type and size in a sample screen image are designated as the reading setting, in a case where there is a difference in look and feel and display magnification between the sample screen and a processing target screen, the font type and size in the image that is a processing target are different from those of the sample, and thus, even if the font is used as it is, the recognition accuracy cannot be improved (issue h). Furthermore, it takes time and effort to manually designate the reading setting for each area of a screen component that is an acquisition target of a display character string (issue i).

(2-3. Acquisition Processing of Display Character Strings According to Present Embodiment)

Hereinafter, acquisition processing of display character strings according to the present embodiment will be described. Firstly, the acquisition processing of display character strings according to the present embodiment enables acquisition of display character strings of screen components in a virtualization environment, and contributes to solving the issue a. Secondly, the acquisition processing of display character strings according to the present embodiment does not require an environment change on a thin client server side, thereby contributing to solving the issue b. Thirdly, in the acquisition processing of display character strings according to the present embodiment, even in a case where the look and feel and the display magnification are different between a sample screen and a processing target screen, the reading setting regarding the font type and size can be used to improve the recognition accuracy of the OCR technology, which contributes to solving the issue h. Fourthly, the acquisition processing of display character strings according to the present embodiment does not necessarily require manual reading setting for each screen component, and thus contributes to solving the issues g and i.

(3. Outline of Identification Processing According to Present Embodiment)

(3-1. Preconditions for Present Embodiment)

Hereinafter, first, preconditions of the present embodiment will be described. Most of screens of an operation target application targeted by an automatic operation agent and the like are information input forms and information reference forms of business systems, and in the equivalent screens, there is a variation in display content of each item and the number of items depending on the business situation and the case, but certain regularity is maintained in the following points.

Firstly, even if there is a difference in screen mounting content, look and feel, or display magnification, there is no difference in relative arrangement relationship between equivalent screen components in equivalent screens. Secondly, some character strings displayed in equivalent screens always have the same character strings regardless of the business situation or the case, such as item names in information input forms or information reference forms. Thirdly, even if there is a difference in screen mounting content, look and feel, and display magnification, there is no difference in display character strings as described above. Fourthly, the font type and size of character strings displayed on screens are not changed by a worker in units of characters and items, and are uniformly changed even in a case where there is a difference in screen mounting content, look and feel, and display magnification. That is, in a case where a difference in screen mounting content, look and feel, and display magnification is generated between screen components having the same font type used for drawing display character strings, the display character strings are drawn in the same font type even if the font is different in type from before the occurrence of the difference. The proportion of font size is also maintained.

Furthermore, even in a case where daily work is performed in a virtualization environment, there is a non-virtualization environment in which the same operation target application can be used, such as a verification environment of a business system. Temporary use of the verification environment is different from an environment change on a commercial server side used via a virtualization environment in daily work, and does not require measures including investigation of the presence or absence of influence by an organization responsible for providing and operating an operation target application, and enhancement of server resources, and has a low implementation barrier. In fact, upon introduction of an automatic operation agent itself or deployment of a scenario to a large number of organizations, operation confirmation in advance in a verification environment for the purpose of preventing occurrence of overload or erroneous operations in a commercial environment of a business system is generally often performed.

(3-2. Basic Concept of Present Embodiment)

Hereinafter, the basic concept of the present embodiment will be described. According to the present embodiment, the operation setting of identification similar to the conventional object access method and checking the same are performed using an actual screen of an operation target application in a non-virtualization environment. At that time, sample screen data used for the operation setting of identification and identification case screen data determined to have equivalence with the sample screen data at the time of checking the operation setting of identification are acquired and accumulated including screen component object information. The information of the objects is used for identification of screen components and reading of display character strings in the virtualization environment.

Specifically, in order to solve the above-described issues a and b, in the present embodiment, screen components are identified using only a screen image as processing target screen data acquired in a virtualization environment. At that time, in order to expand conditions under which the above-described issues c to e can be solved, character strings drawn on the processing target screen image, display character strings acquired as information of objects of sample screen data or identification case screen data, and relative arrangement relationship therebetween are compared. That is, instead of a screen structure affected by a difference in screen mounting content, relative arrangement relationship on the two-dimensional plane not affected by the difference is used. Furthermore, display character strings are used instead of an image affected by a difference in look and feel and display magnification.

Furthermore, in order to solve the above-described issue f, an equivalent to each piece of sample screen data is identified from among identification case screen data, screen component objects that exist in common in equivalent screen data and are displayed (hereinafter, the objects are referred to as "common objects") are identified, relative arrangement relationship that is always established therebetween and objects including display character strings that are always the same are obtained, and used for comparison with character strings drawn on a processing target screen image and relative arrangement relationship therebetween.

Furthermore, in order to solve the above-described issues g and i, regularity including the type of variation in display character string of the common objects, the number of characters, and the type of character is obtained from information of objects of sample screen data and identification case screen data equivalent thereto, and character string drawing areas in the processing target screen associated with the common objects are used as a reading setting at the time of reading the character string drawing areas using the OCR technology.

Furthermore, in order to solve the above-described issue h and more reliably perform reading of drawn character strings and identification of areas in which known character strings such as display character strings of objects including display character strings that are always the same are drawn in a processing target screen image, the font type and size used when the display character strings are drawn in the processing target screen image are estimated.

[Configuration of Identification Device 10 and the Like]

Figure 2:
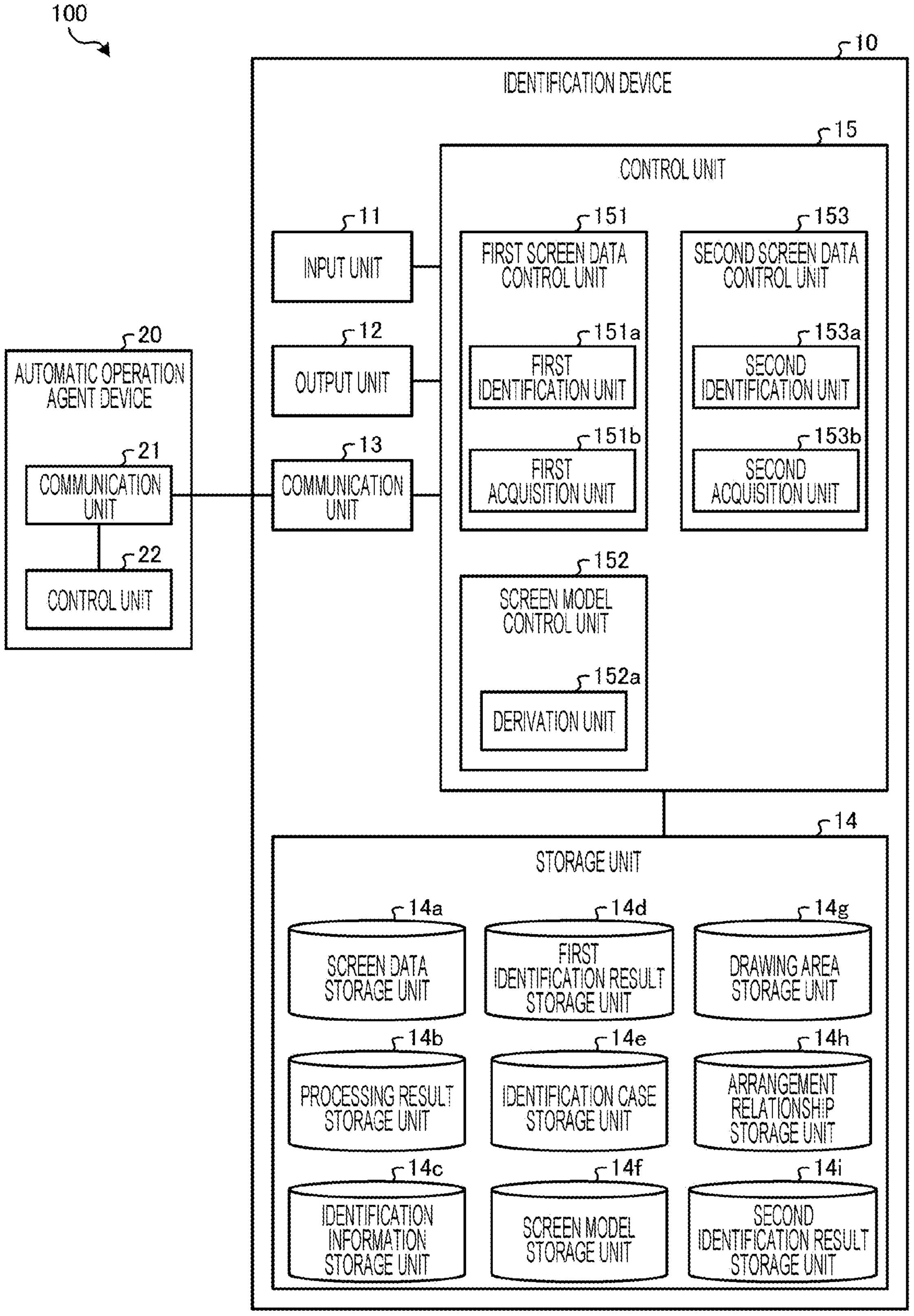
FIG. 2 is a block diagram illustrating a configuration example of an identification device and the like according to the first embodiment.

Next, a functional configuration of each device included in the system 100 illustrated in FIG. 1 will be described. Here, in particular, the configuration of the identification device 10 and the like according to the present embodiment will be described in detail with reference to FIG. 2. FIG. 2 is a block diagram illustrating a configuration example of the identification device and the like according to the present embodiment. Hereinafter, data stored in a storage unit and functional units as the configuration of the identification device 10 will be described, and the configuration of the automatic operation agent device 20 will be described.

(1. Configuration of Identification Device 10)

(1-1. Overall Configuration of Identification Device 10)

The identification device 10 includes an input unit 11, an output unit 12, a communication unit 13, a storage unit 14, and a control unit 15. The input unit 11 is responsible for inputting various types of information to the identification device 10. The input unit 11 is implemented by, for example, a mouse, a keyboard, or the like and receives an input of setting information or the like to the identification device 10. The output unit 12 is also responsible for controlling an output of various types of information from the identification device 10. The output unit 12 is implemented by, for example, a display or the like and outputs setting information or the like stored in the identification device 10.

The communication unit 13 controls data communication with other devices. For example, the communication unit 13 performs data communication with each communication device. Further, the communication unit 13 can perform data communication with a terminal of a worker, which is not illustrated. In the above example, the communication unit 13 receives first screen data 30 and second screen data 40 from the automatic operation agent device 20. The communication unit 13 stores the received first screen data 30 and second screen data 40 in a screen data storage unit 14*a* to be described below.

(1-2. Configuration of Storage Unit 14 of Identification Device 10)

The storage unit 14 stores various types of information referred to when the control unit 15 operates, and stores various types of information created as a result of operation of the control unit 15. Here, the storage unit 14 can be implemented by, for example, a semiconductor memory element such as a random access memory (RAM) or a flash memory, a storage device such as a hard disk or an optical disc, or the like. In the example of FIG. 2, the storage unit 14 is installed inside the identification device 10, but may be installed outside of the identification device 10, or a plurality of storage units may be installed.

The storage unit 14 includes the screen data storage unit 14*a*, a processing result storage unit 14*b*, an identification information storage unit 14*c*, a first identification result storage unit 14*d*, an identification case storage unit 14*e*, a screen model storage unit 14*f*, a drawing area storage unit 14*g*, an arrangement relationship storage unit 14*h*, and a second identification result storage unit 14*i*. Hereinafter, an example of data stored in each storage unit will be described with reference to FIGS. 3 to 12.

(1-2-1. Screen Data Storage Unit 14*a*)

An example of data stored in the screen data storage unit 14*a* will be described with reference to FIG. 3. FIG. 3 is a diagram illustrating an example of data stored in the screen data storage unit according to the first embodiment. The screen data storage unit 14*a* stores "processing target screen data". Here, the processing target screen data is screen data acquired by the automatic operation agent device 20 from a screen displayed on any terminal.

As illustrated in FIG. 3, the processing target screen data includes a "screen data ID", "screen component object information" including "attributes of screen component objects" and a "screen structure", a "screen image", "screen attributes", and the like. Note that, [xxx, yyy, zzz, www] is described as "drawing areas of screen components" that are one of the "attributes of screen component objects" in FIG. 3, however, even if the same characters are used, this does not mean that these portions have the same value as a character expression in mathematics, and each individual has an individual numerical value corresponding to each of the drawing areas as in the example of the screen data in FIG. 24.

(1-2-2. Processing Result Storage Unit 14*b*)

An example of data stored in the processing result storage unit 14*b* will be described with reference to FIG. 4. FIG. 4 is a diagram illustrating an example of data stored in the processing result storage unit according to the first embodiment. The processing result storage unit 14*b* stores "screen data processing results". Here, the screen data processing results are data processed by the control unit 22 of the automatic operation agent device 20, and are data indicating association results with a sample screen model of screen components that are control targets and display character strings acquired from processing target screen data.

As illustrated in FIG. 4, the screen data processing results include a "processing target screen data ID", a "sample screen model ID", "results of association of control target screen components/display character string acquisition", and the like. Here, "results (1) of association of control target screen components/display character string acquisition" are data acquired in the object information using mode, and are an example in which the processing target screen data includes information of objects. On the other hand, "results (2) of association of control target screen components/display character string acquisition" are data acquired in the object information non-using mode, or are an example in which the processing target screen data does not include the information of objects.

Note that, [xxx, yyy, zzz, www] is described as "character string drawing areas" that are a piece of the data in FIG. 4, however, even if the same characters are used, this does not mean that these portions have the same value as a character expression in mathematics, and each individual has an individual numerical value corresponding to each of the drawing areas as in the example of the screen data in FIG. 24.

(1-2-3. Identification Information Storage Unit 14*c*)

An example of data stored in the identification information storage unit 14*c* will be described with reference to FIG. 5. FIG. 5 is a diagram illustrating an example of data stored in the identification information storage unit according to the first embodiment. The identification information storage unit 14*c* stores "identification information". Here, the identification information is a set of pieces of sample screen data referred to in identification processing.

As illustrated in FIG. 5, the identification information includes a "sample screen data ID", "screen component object information" including "attributes of screen component objects" and a "screen structure", a "screen image", "screen attributes", and the like. Furthermore, the identification information includes the screen data for each of a plurality of pieces of sample screen data. Note that, [xxx, yyy, zzz, www] is described as "drawing areas of screen components" that are one of the "attributes of screen component objects" in FIG. 5, however, even if the same characters are used, this does not mean that these portions have the same value as a character expression in mathematics, and each individual has an individual numerical value corresponding to each of the drawing areas as in the example of the screen data in FIG. 24.

(1-2-4. First Identification Result Storage Unit 14*d*)

Figure 6:
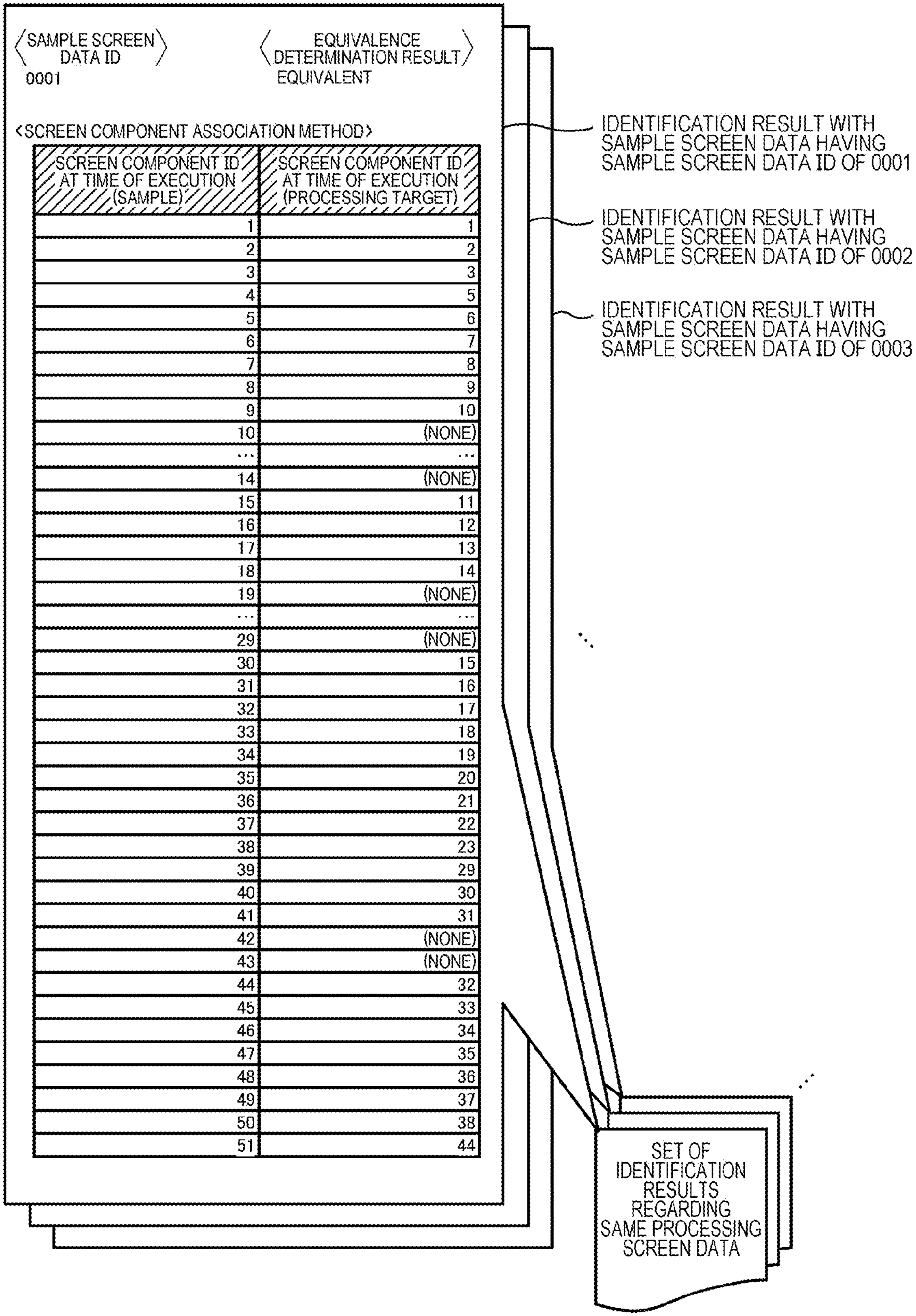
FIG. 6 is a diagram illustrating an example of data stored in a first identification result storage unit according to the first embodiment.

An example of data stored in the first identification result storage unit 14*d* will be described with reference to FIG. 6. FIG. 6 is a diagram illustrating an example of data stored in the first identification result storage unit according to the first embodiment. The first identification result storage unit 14*d* stores "first identification results". Here, the first identification results are data output by a first identification unit 151*a* of the identification device 10 to be described below, and are a set of pieces of data indicating association between screen components of processing target screen data and screen components of sample screen data determined to be equivalent. The first identification results may be data acquired from another device via the communication unit 13.

As illustrated in FIG. 6, a first identification result includes an identification result including a "sample screen data ID", an "equivalence determination result", and a "screen component association method". Here, the "screen component association method" includes screen component IDs of the processing target screen data and associated screen component IDs of the sample screen data. Furthermore, the first identification results include the above identification result for each of a plurality of pieces of the sample screen data. Note that the "results (1) of association of control target screen components/display character string acquisition" stored in the processing result storage unit 14*b* is created on the basis of the first identification results.

(1-2-5. Identification Case Storage Unit 14*e*)

Figure 7:
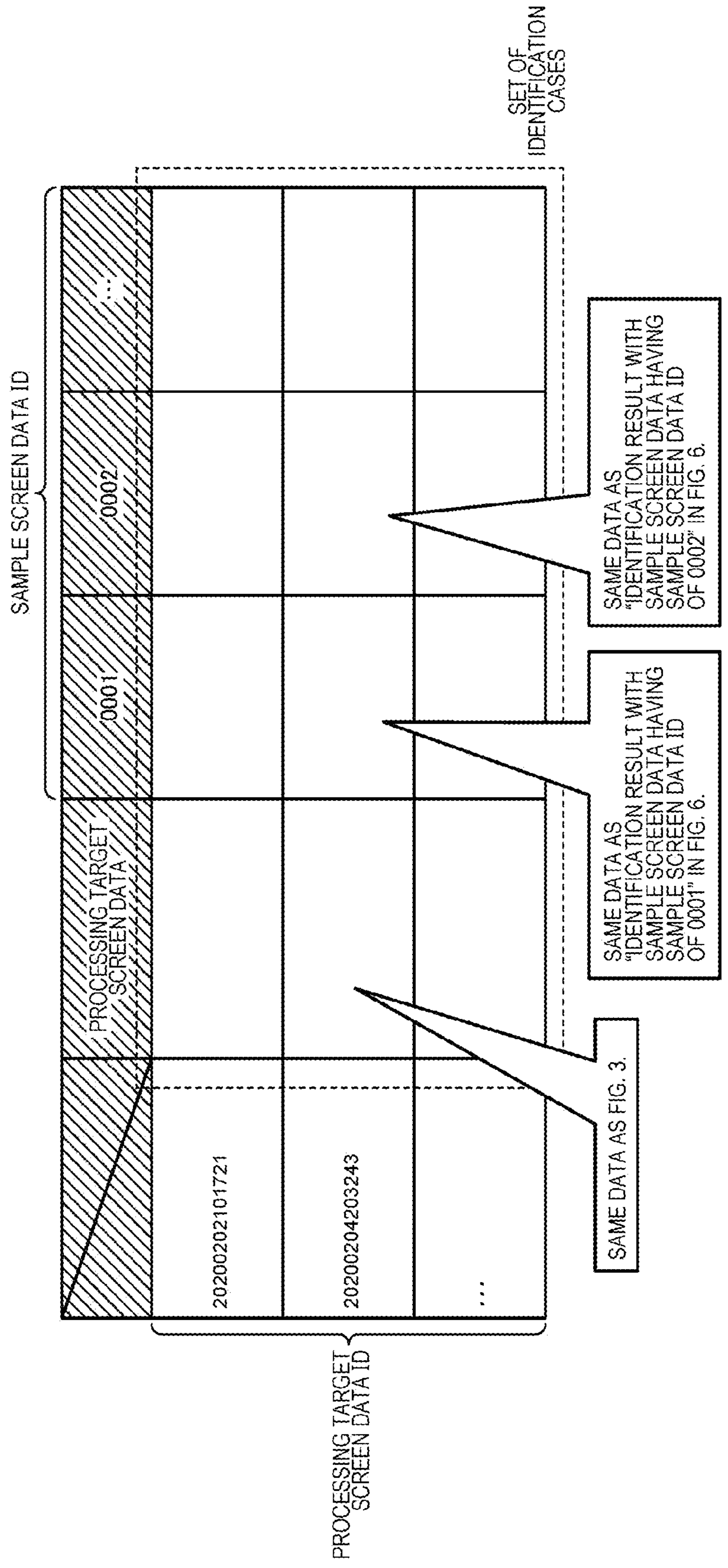
FIG. 7 is a diagram illustrating an example of data stored in an identification case storage unit according to the first embodiment.

An example of data stored in the identification case storage unit 14*e* will be described with reference to FIG. 7. FIG. 7 is a diagram illustrating an example of data stored in the identification case storage unit according to the first embodiment. The identification case storage unit 14*e* stores "identification cases". Here, the identification cases are data output by the first identification unit 151*a* of the identification device 10 to be described below, and are data in which identification results of each piece of processing target screen data subjected to identification processing in the past are accumulated. The identification cases may be data acquired from another device via the communication unit 13.

As illustrated in FIG. 7, the identification cases include "processing target screen data" and "sample screen data IDs" for each "processing target screen data ID". Here, the "sample screen data IDs" included in the identification cases are not limited to those determined to be equivalent, and IDs of all sample screen data stored in the identification information storage unit 14*c* are targeted. Furthermore, the identification cases include identification results including "equivalence determination results", "screen component association methods", and the like. That is, the identification cases include not only processing target screen data obtained by the latest identification processing (for example, processing target screen data ID: 20200204203243) but also processing target screen data obtained by the past identification processing (for example, processing target screen data ID: 20200202101721).

(1-2-6. Screen Model Storage Unit 14*f*)

An example of data stored in the screen model storage unit 14*f* will be described with reference to FIGS. 8 and 9. FIGS. 8 and 9 are diagrams illustrating an example of data stored in the screen model storage unit according to the first embodiment. The screen model storage unit 14*f* stores a "sample screen model". Here, the sample screen model is data derived by a derivation unit 152*a* of the identification device 10 to be described below, and is data used for identification processing in a virtualization environment. The sample screen model may be data acquired from another device via the communication unit 13.

As illustrated in FIGS. 8 and 9, the sample screen model includes "screen component model information" including "attributes of screen component models", "relative arrangement relationship (horizontal direction) of screen component models", and "relative arrangement relationship (vertical direction) of screen component models" in addition to the "sample screen data ID" and a "target identification case screen data ID set". In addition, the "attributes of screen component models" include a "display character string set", a "font type", a "font size", and the like for each of the screen components.

(1-2-7. Drawing Area Storage Unit 14*g*)

An example of data stored in the drawing area storage unit 14*g* will be described with reference to FIG. 10. FIG. 10 is a diagram illustrating an example of data stored in the drawing area storage unit according to the first embodiment. The drawing area storage unit 14*g* stores "character string drawing areas". Here, the character string drawing areas are data identified by a second identification unit 153*a* of the identification device 10 to be described below, and are data indicating drawing areas of character strings read using the OCR technology. The character string drawing areas may be data acquired from another device via the communication unit 13.

As illustrated in FIG. 10, the character string drawing areas include a "read character string", a "character string drawing area", a "fixed-value matching flag", and the like for each "character string drawing area ID". Furthermore, the character string drawing areas are data that is deleted or added as appropriate by processing such as the OCR technology or image template matching.

Note that, [xxx, yyy, zzz, www] is described as "character string drawing areas" that are a piece of the data in FIG. 10, however, even if the same characters are used, this does not mean that these portions have the same value as a character expression in mathematics, and each individual has an individual numerical value corresponding to each of the drawing areas as in the example of the screen data in FIG. 24.

(1-2-8. Arrangement Relationship Storage Unit 14*h*)

An example of data stored in the arrangement relationship storage unit 14*h* will be described with reference to FIG. 11. FIG. 11 is a diagram illustrating an example of data stored in the arrangement relationship storage unit according to the first embodiment. The arrangement relationship storage unit 14*h* stores "character string drawing area arrangement relationship". Here, the character string drawing area arrangement relationship is data determined by the second identification unit 153*a* of the identification device 10 to be described below, and is data indicating relative arrangement relationship between any two character string drawing areas. The character string drawing area arrangement relationship may be data acquired from another device via the communication unit 13.

As illustrated in FIG. 11, the character string drawing area arrangement relationship includes "relative arrangement relationship (horizontal direction) of character string drawing areas" and "relative arrangement relationship (vertical direction) of character string drawing areas". The character string drawing area arrangement relationship is data determined from character string drawing areas stored in the drawing area storage unit 14*g*.

(1-2-9. Second Identification Result Storage Unit 14*i*)

An example of data stored in the second identification result storage unit 14*i* will be described with reference to FIG. 12. FIG. 12 is a diagram illustrating an example of data stored in the second identification result storage unit according to the first embodiment. The second identification result storage unit 14*i* stores a "second identification result". Here, the second identification result is data output by the second identification unit 153*a* of the identification device 10 to be described below, and is data indicating association between character string drawing areas of processing target screen data and screen components of a sample screen model. The second identification result may be data acquired from another device via the communication unit 13.

As illustrated in FIG. 12, the second identification result includes an identification result including a "sample screen data ID" and an "association method". Here, the "association method" includes character string drawing area IDs of the processing target screen data and associated screen component IDs of the sample screen model. Note that the "results (2) of association of control target screen components/display character string acquisition" stored in the processing result storage unit 14*b* is created on the basis of the second identification result.

(1-3. Configuration of Control Unit 15 of Identification Device 10)

The control unit 15 controls the entire identification device 10. The control unit 15 includes the first identification unit 151*a* and a first acquisition unit 151*b* as a first screen data control unit 151, the derivation unit 152*a* as a screen model control unit 152, and a second identification unit 153*a* and a second acquisition unit 153*b* as a second screen data control unit 153. Here, the control unit 15 is, for example, an electronic circuit such as a central processing unit (CPU) or a micro processing unit (MPU), or an integrated circuit such as an application specific integrated circuit (ASIC) or a field programmable gate array (FPGA).

(1-3-1. First Screen Data Control Unit 151: First Identification Unit 151*a*)

The first identification unit 151*a* identifies first screen data 30 including an image of a screen of an application and information regarding screen component objects that are objects of components included in the screen, and outputs a first identification result associated with sample screen data that is screen data referred to. For example, the first identification unit 151*a* identifies the first screen data 30 including first character strings and drawing areas of screen component objects including the first character strings as the attributes by determining equivalence using the information regarding the screen component objects, and outputs first identification results in which screen component objects are associated for respective pieces of the sample screen data determined to have equivalence. Here, the first character strings are display character strings included in the first screen data 30, and include character strings in a non-display state in addition to character strings displayed as an image of the screen.

Describing details of processing, first, the first identification unit 151*a* acquires first screen data that is a processing target from the screen data storage unit 14*a*, and acquires identification information of sample screen data from the identification information storage unit 14*c*. Next, the first identification unit 151*a* determines equivalence between the first screen data and the sample screen data using information regarding screen component objects (attributes of screen component objects including object types, display character strings, and drawing areas of screen components, and a screen structure) included in identification information. Then, the first identification unit 151*a* outputs first identification results in which screen component IDs in the first screen data that is a processing target are associated with screen component IDs of the sample screen data for respective sample screen data IDs determined to have equivalence.

Furthermore, the first identification unit 151*a* stores the output first identification results in the first identification result storage unit 14*d*. Moreover, the first identification unit 151*a* stores the output first identification results in the identification case storage unit 14*e* as identification cases.

(1-3-2. First Screen Data Control Unit 151: First Acquisition Unit 151*b*)

The first acquisition unit 151*b* acquires first character strings included in the first screen data 30 on the basis of the first identification results. For example, the first acquisition unit 151*b* acquires the first character strings from processing target screen data associated with the screen component objects using the first identification results.

Describing details of the processing, first, the first acquisition unit 151*b* selects one result from among the first identification results stored in the first identification result storage unit 14*d* in accordance with a preset index such as a result determined to be equivalent and having the highest priority assigned in advance to the sample screen data or a result having the best evaluation value of the association method. Next, the first acquisition unit 151*b* acquires, from the identification information storage unit 14*c*, sample screen data determined to be equivalent to the processing target screen data in the selected first identification result, and identifies objects that are control targets and objects that are display character string acquisition targets that are a part of the objects that are control targets in the sample screen data.

Furthermore, the first acquisition unit 151*b* identifies objects that are control targets and objects of display character string acquisition targets in the screen data of the processing target using association results between objects in the sample screen data and objects in the processing target screen data included in the selected first identification result, and stores the identified objects in the processing result storage unit 14*b*. Furthermore, the first acquisition unit 151*b* acquires a display character string from information of the objects in the processing target screen data for each of the objects identified as display character string acquisition targets in the processing target screen data, and reflects the result in the processing result storage unit 14*b*. In a case where there is no identification result determined to be equivalent to the processing target screen data, the first acquisition unit 151*b* does not store anything in the processing result storage unit 14*b*.

(1-3-3. Screen Model Control Unit 152: Derivation Unit 152*a*)

The derivation unit 152*a* derives a sample screen model used for identification in a virtualization environment on the basis of the sample screen data and the first identification results. For example, the derivation unit 152*a* derives a sample screen model including relative arrangement relationship for each of the drawing areas of the first character strings using identification cases including a plurality of the first identification results.

Describing details of processing, first, the derivation unit 152*a* acquires the identification information of the sample screen data from the identification information storage unit 14*c*, and acquires identification cases from the identification case storage unit 14*e*. Next, the derivation unit 152*a*, for each piece of the sample screen data, determines relative arrangement relationship for each of drawing areas of screen component objects included in the identification cases, and outputs the same as a sample screen model. Furthermore, the derivation unit 152*a* stores the output sample screen model in the screen model storage unit 14*f*. Note that a flow of derivation processing of a sample screen model by the derivation unit 152*a* will be described below in [Flow of Each Type of Processing] (2. Flow of sample screen model derivation processing).

Furthermore, the derivation unit 152*a*, prior to identifying second screen data, identifies common objects commonly included in a plurality of pieces of the first screen data among the screen component objects of the sample screen data from the sample screen data and the first identification results, obtains relative arrangement relationship for each of drawing areas of the common objects, and derives a sample screen model including the relative arrangement relationship.

Furthermore, the derivation unit 152*a* identifies fixed-value objects that are commonly included in a plurality of pieces of the first screen data 30 and include the same character strings among the screen component objects of the sample screen data included in the identification cases, and derives the sample screen model. Here, the derivation unit 152*a* identifies, as the fixed-value objects, screen component objects that are always present and displayed on equivalent screens and always include the same display character strings among the screen component objects of the sample screen data, and outputs the fixed-value objects as a sample screen model.

Moreover, the derivation unit 152*a* derives a sample screen model further including at least one of the variation type, the number of characters, the character type, the font type, or the size of the first character strings using the sample screen model. At this time, the derivation unit 152*a* generates an examination image of the first character strings included in the sample screen model, and derives a sample screen model further including the font type and size of the first character strings by matching the examination image with the screen image included in the sample screen data. Note that details of font estimation processing by the derivation unit 152*a* will be described below in [Details of Each Type of Processing] (4-2. Font estimation processing in case where character string drawing area is known).

(1-3-4. Second Screen Data Control Unit 153: Second Identification Unit 153*a*)

The second identification unit 153*a* identifies second screen data 40 including an image of the screen and not including the information regarding the screen component objects, and outputs a second identification result associated with the sample screen model. For example, the second identification unit 153*a* identifies second character strings and drawing areas of the second character strings from an image of the screen using optical character recognition processing, determines relative arrangement relationship for each of drawing areas of the second character strings, identifies the second screen data 40 on the basis of the drawing areas of the second character strings and the relative arrangement relationship for each of the drawing areas of the second character strings, and outputs the second identification result associated with screen component objects for each sample screen model. Here, the second character strings are display character strings included in the second screen data 40. Furthermore, the second identification unit 153*a* estimates the font types or sizes of the second character strings using the font types or sizes of character strings derived by the derivation unit 152*a*, thereby identifying the second screen data 40 and outputting the second identification result.

At this time, the second identification unit 153*a* determines equivalence using constraint conditions based on the presence of the drawing areas of the second character strings, character strings drawn in the drawing areas of the second character strings, and relative arrangement relationship for each of the drawing areas of the second character strings and a predetermined evaluation function, thereby identifying the second screen data 40 and outputting the second identification result associated with screen component objects for each sample screen model.

Describing details of the processing, the second identification unit 153*a* sequentially applies the following character string drawing area identification processing, character string drawing area arrangement relationship determination processing, and second screen data association processing to each sample screen model (hereinafter, referred to as a "selected sample screen model") stored in the screen model storage unit 14*f*.

(1-3-4-1. Character String Drawing Area Identification Processing)

First, the second identification unit 153*a* acquires, from the selected sample screen model, display character strings of screen component models in which the same display character strings are always drawn in an equivalent screen image (hereinafter, referred to as "fixed-value screen component models"). Here, the fixed-value screen component models are screen component models in which the "appearance rate" is 1, the "number of times of empty characters" is 0, and the "type of variation in display character string" is a "fixed value" in screen component model information. Furthermore, display character strings and drawing areas of the display character strings are identified from the screen image that is a processing target using the optical character recognition processing. Then, the second identification unit 153*a* stores the drawing areas of the identified display character strings (second character strings) in the drawing area storage unit 14*g*. Note that details of character string drawing identification processing by the second identification unit 153*a* will be described below in [Details of Each Type of Processing] (3-1. Character string drawing area identification processing).

(1-3-4-2. Character String Drawing Area Arrangement Relationship Determination Processing)

Next, the second identification unit 153*a* determines relative arrangement relationship for each combination of the character string drawing areas stored in the drawing area storage unit 14*g*, and stores the relative arrangement relationship in the arrangement relationship storage unit 14*h*. Note that details of character string drawing area arrangement relationship determination processing by the second identification unit 153*a* will be described below in [Details of Each Type of Processing] (3-2. Character string drawing area arrangement relationship determination processing).

(1-3-4-3. Second Screen Data Association Processing)

Then, the second identification unit 153*a* obtains an association method between the screen component models of the sample screen model and the character string drawing areas of the processing target screen image and an evaluation value thereof from the character string drawing areas in which the display character strings of the fixed-value screen component models stored in the drawing area storage unit 14*g* are drawn and the relative arrangement relationship between the character string drawing areas stored in the arrangement relationship storage unit 14*h* in the selected sample screen model and the processing target screen image such that constraint conditions are satisfied. At this time, in a case where an association method that satisfies the constraint conditions has been obtained, and association methods have not been obtained for other sample screen models so far, or the association method is better than evaluation values of association methods obtained for other sample screen models so far, the second identification unit 153*a* updates the second identification result storage unit 14*i* by the newly obtained association method (second identification result). Note that details of the second screen data association processing using the constraint conditions and an evaluation function by the second identification unit 153*a* will be described below in [Details of Each Type of Processing] (3-3. Second screen data association processing).

(1-3-5. Second Screen Data Control Unit 153: Second Acquisition Unit 153*b*)

The second acquisition unit 153*b* acquires second character strings included in the second screen data on the basis of the second identification result. For example, the second acquisition unit 153*b* acquires the second character strings from the processing target screen data associated with the screen component objects using the second identification result.

Further, the second acquisition unit 153*b* acquires the second character strings included in the second screen data on the basis of the second identification result and at least one of the variation types, the numbers of characters, the character types, the font types, or the sizes of the first character strings included in a sample screen model.

Describing details of processing, first, in a case where the second identification result storage unit 14*i* stores an identification result, the second acquisition unit 153*b* acquires a sample screen model determined to be equivalent to the processing target screen data from the screen model storage unit 14*f*, and identifies screen component models that are control targets and screen component models that are display character string acquisition targets that are a part of the screen component models that are control targets in the sample screen model. Furthermore, the second acquisition unit 153*b* identifies character string drawing areas that are control targets and character string drawing areas that are display character string acquisition targets in the processing target screen image using association results between the screen component models in the sample screen model and the character string drawing areas in the processing target screen image that are included in the second identification result, and stores the results in the processing result storage unit 14*b*. Further, the second acquisition unit 153*b* acquires display character strings for each of the character string drawing areas that are display character string acquisition targets in the processing target screen image, and reflects the results in the processing result storage unit 14*b*. Note that details of second character string acquisition processing by the second acquisition unit 153*b* will be described below in [Details of Each Type of Processing] (3-4. Display character string acquisition processing).

(2. Configuration of Automatic Operation Agent Device 20)

The automatic operation agent device 20 includes a communication unit 21 that controls transmission and reception of various types of data with other devices and a control unit 22 that controls the entire automatic operation agent device 20.

(2-1. Communication Unit 21)

The communication unit 21 transmits first screen data 30 and second screen data 40 acquired by the control unit 22 to the identification device 10. The communication unit 21 receives, in addition to first character strings and second character strings, information necessary for identifying screen components that are control targets including screen component IDs at the time of execution and drawing areas from the identification device 10.

(2-2. Control Unit 22)

The control unit 22 acquires first screen data 30 including an image of a screen of an application and information regarding screen component objects that are objects of elements included in the screen. Similarly, the control unit 22 acquires second screen data 40 including an image of the screen and not including the information regarding the screen component objects. Furthermore, the control unit 22 performs control such as an operation on the screen components that are control targets designated at the time of an operation setting in advance using sample screen data, and processing using acquired display character strings, using screen data processing results stored in the processing result storage unit 14*b*.

[Details of Each Type of Processing]

Details of each type of processing according to the present embodiment will be described using FIGS. 13 to 16, mathematical expressions, and the like. Hereinafter, as processing common to a plurality of parts of processing, an outline of font estimation processing of a display character string of an image will be described, and then, sample screen model control processing, second screen data control processing, and the font estimation processing of a display character string of an image will be described in detail.

Note that, in the following description, as relative arrangement relationship, arrangement relationship in the horizontal direction (up and down) and the vertical direction (left and right) is handled for all combinations of screen components that always exist in an equivalent screen, and the constraint conditions and the evaluation function also are corresponded thereto. However, other relative arrangement relationship, constraint conditions, and evaluation functions may be used as long as they can be automatically derived from screen component object information of a sample screen and an identification case screen equivalent thereto, and for example, the relationship is reduced to combinations of adjacent screen components, and relative distances are taken into consideration in addition to up and down and left and right.

(1. Outline of Font Estimation Processing of Display Character String of Image)

Figure 13:
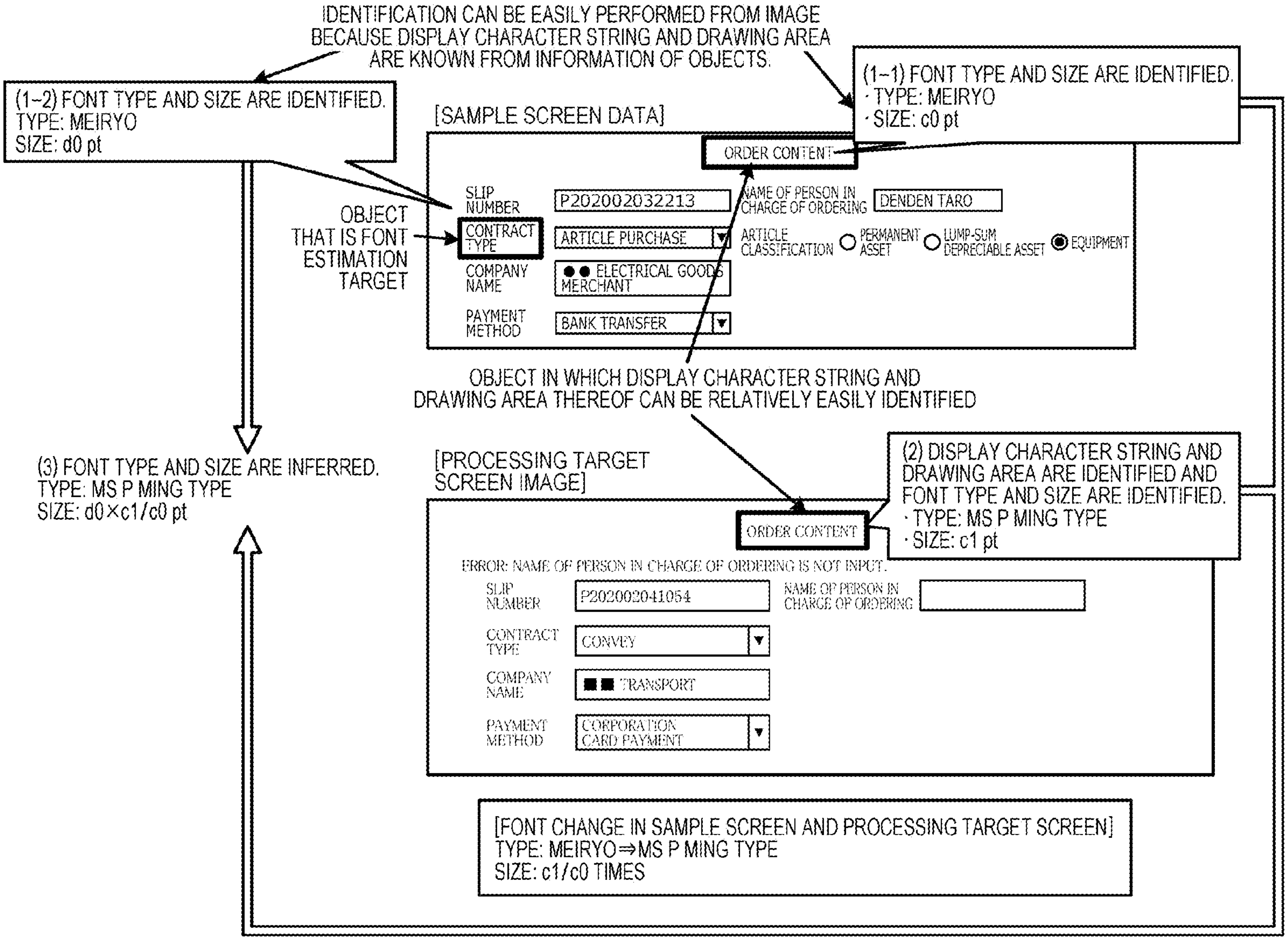
FIG. 13 is a diagram illustrating an example of processing of estimating a font type and size of a display character string according to the first embodiment.

An outline of the font estimation processing of a display character string of an image will be described with reference to FIG. 13. FIG. 13 is a diagram illustrating an example of processing of estimating a font type and size of a display character string according to the first embodiment. Hereinafter, the processing is described in which, in order to more reliably perform reading of drawn character strings and identification of areas in which known character strings such as display character strings of objects including display character strings that are always the same are drawn in a processing target screen image, the font type and size used when the display character strings are drawn in the processing target screen image are estimated. Note that details of the font estimation processing of a display character string of an image will be described below in (4. Font estimation processing of display character string of image).

Firstly, in sample screen data in which both a screen image and information of objects are acquired, the font type and size in the sample screen image are obtained for each of the objects using the fact that drawing areas of screen components and display character strings thereof are known from the information of the objects. That is, in FIG. 13, in the screen image of the sample screen data, the font type of a display character string of "order content" is identified as "Meiryo", and the font size is identified as "c0 pt", using the information of the objects (see FIG. 13 (1-1)). Similarly, the font type of a display character string of "contract type" is identified as "Meiryo", and the font size is identified as "d0 pt" (see FIG. 13 (1-2)).

Secondly, for an object in which the display character string and a drawing area thereof can be relatively easily identified, the display character string and the drawing area are obtained from the processing target screen image, the font type and size of are obtained, and a difference in the font type and size in the sample screen image is examined. That is, in FIG. 13, the font type of the display character string of "order content" that is an object that can be relatively easily identified is identified as "MS P Ming type", and the font size is identified as "c1 pt" (see FIG. 13 (2)).

Thirdly, the above two types of processing results are combined to infer the font type and size. That is, in FIG. 13, since the font type changes from "Meiryo" to "MS P Ming type" and the font size changes by "c1/c0 times" between the sample screen data and the processing target screen image, the font type of the display character string of "contract type" is inferred to be "MS P Ming type" and the font size is inferred to be "d0*c1/c0 pt" in the processing target screen image (see FIG. 13 (3)).

(2. Sample Screen Model Control Processing)

Details of the sample screen model control processing for, prior to identification processing, deriving a sample screen model as intermediate data will be described. Hereinafter, identification case acquisition processing, sample screen model initialization processing, sample screen model update processing, display character string regularity derivation processing, font derivation processing in a sample screen image, and calculation processing of collation success rates and collation evaluation values of fixed-value screen component models will be described in this order.

(2-1. Identification Case Acquisition Processing)

The identification device 10 acquires, from among identification case screen data and identification results stored in the identification case storage unit 14*e*, identification case screen data and an identification result determined to be equivalent to sample screen data for a selected sample screen data.

(2-2. Sample Screen Model Initialization Processing)

For the selected sample screen data, the identification device 10 initializes a sample screen model corresponding to the selected sample screen data (hereinafter, referred to as a "selected sample screen model") as follows on the basis of information of objects of the sample screen data itself.

(2-2-1. Initialization Processing of Sample Screen Model ID and Target Identification Case Screen Data ID Set)

As a sample screen model ID, the value of a "sample screen data ID" of the selected sample screen data is used as it is. A "target identification case screen data ID set" is emptied.

(2-2-2. Initialization Processing of Attributes of Screen Component Models)

First, one screen component model is prepared for each of the objects in the selected sample screen data. Further, the attributes of each screen component model are initialized as follows.

Firstly, for attributes "screen component ID at the time of execution", "type", "control target", and "display character string acquisition target" of a screen component model, the values of the object are taken over as they are.

Secondly, for an attribute of the "number of appearances", an object in which the display character string is likely to be drawn among objects that are modeling target is initialized to 1 in a case where the "display/non-display state" is "display", and to 0 otherwise. Note that the possibility that the display character string is drawn may be determined on the basis of conditions regarding the type of a screen component and the like prepared in advance according to a means for acquiring screen component object information and the like. For example, in a case where it is known that the display character string is not drawn in the screen even if the window holds the display character string as a window title, the object is not targeted.

Thirdly, for an attribute of the "number of times of empty character strings", an object that is a modeling target is initialized to 1 in a case where the "display/non-display state" is "display" and the character string of the "display character string" is an empty character string, and to 0 otherwise.

Fourthly, an attribute of the "display character string set" is initialized by the character string of the "display character string" of an object that is a modeling target.

On the other hand, attributes of the "appearance rate", "type of variation in display character string", "number of characters of display character string", "type of character of display character string", "font type", and "font size" of a screen component model are set in the subsequent processing, and thus are left unset at the time of initialization.

(2-2-3. Initialization Processing of Relative Arrangement Relationship Between Screen Component Models)

The identification device 10 checks relative arrangement relationship between any two screen component models $u_i$ and $u_j$ in the sample screen model each on which a display character string is likely to be drawn, using drawing areas of the objects in the sample screen data that are the objects that are modeling targets.

As a result, values of $r_h(i, j)$ and $r_h(j, i)$ representing arrangement relationship between $u_i$ and $u_j$ in the horizontal direction are determined as follows. Note that "0" means "indefinite".

In a case where $u_i$ is on the left of $u_j$, that is, in a case where the right end of $u_i$ is on the left of the left end of $u_j$, it is assumed that $r_h(i, j)=1$ and $r_h(j, i)=-1$.

In a case where $u_i$ is on the right of $u_j$, that is, in a case where the left end of $u_i$ is on the right of the right end of $u_j$, it is assumed that $r_h(i, j)=-1$ and $r_h(j, i)=1$.

In other cases, $r_h(i, j)=0$ and $r_h(j, i)=0$.

Similarly, values of $r_l(i, j)$ and $r_l(j, i)$ representing arrangement relationship between $u_i$ and $u_j$ in the vertical direction are determined.

In a case where $u_i$ is above $u_j$, that is, in a case where the lower end of $u_i$ is above the upper end of $u_j$, it is assumed that $r_h(i, j)=1$ and $r_h(j, i)=-1$.

In a case where $u_i$ is below $u_j$, that is, in a case where the upper end of $u_i$ is below the lower end of $u_j$, it is assumed that $r_h(i, j)=-1$ and $r_h(j, i)=1$.

In other cases, $r_h(i, j)=0$ and $r_h(j, i)=0$.

Note that, in a case where arrangement relationship between areas each in which a display character string can be drawn can be further reduced by conditions regarding the type of the screen component or the like prepared in advance according to a means for acquiring the screen component object information or the like for screen components in inclusion relationship in the screen component object information in which $r_h(i, j)=0$ and $r_l(i, j)=0$, a value reflecting the fact may be used as the value of $r_h(i, j)$ or $r_l(i, j)$.

(2-3. Update Processing of Sample Screen Model by Identification Case)

(2-3-1. Processing of Selecting Identification Case and Determining Necessity of Reflection of Model)

The identification device 10 sequentially selects acquired screen data identification cases with objects (hereinafter, described as "selected identification case screen data" and a "selected identification result"). If the "screen data ID" of the selected identification case screen data is not included in the "target identification case screen data ID set" of the selected sample screen model, the identification device 10 updates the sample screen model by the subsequent processing using the selected identification case screen data and identification result. In the identification result, objects of the selected identification case screen data associated with objects in the sample screen data that are modeling targets are referred to as "model reflection target objects".

(2-3-2. Updating Processing of Target Identification Case Screen Data ID Set)

The identification device 10 adds the value of the "screen data ID" of the selected identification case screen data to the "target identification case screen data ID set" of the selected sample screen model.

(2-3-3. Updating Processing of Attributes of Screen Component Model)

In a case where a model reflection target object exists, the identification device 10 updates the attributes of each screen component model as follows.

Firstly, for the attribute of the "number of appearances", 1 is added in a case where the "display/non-display state" of the model reflection target object is "display". However, in a case where there is a plurality of model reflection target objects in the same identification case screen data due to the presence of a repetitive structure such as a list, 1 is added not for each of the model reflection target objects but at most once for each piece of identification case screen data.

Secondly, for the attribute of the "display character string set", the character string of "display character string" of the model reflection target object is added if not included.

Thirdly, for the attribute of the "number of times of empty character strings", 1 is added in a case where the "display/non-display state" of the model reflection target object is "display" and the character string of "display character string" is an empty character string.

(2-3-4. Updating Processing of Relative Arrangement Relationship Between Screen Component Models)

In a case where any two screen component models $u_i$ and $u_j$ in the sample screen model are associated with model reflection target objects $u'_{f(i)}$ and $u'_{f(j)}$, respectively, by an association method f in the selected identification result, the identification device 10 checks drawing areas of the model reflection target objects, and checks their relative arrangement relationship.

As a result, values of $r'_h(i, j)$ and $r'_h(j, i)$ representing arrangement relationship between $u'_{f(i)}$ and $u'_{f(j)}$ in the horizontal direction are determined as follows.

In a case where $u'_{f(i)}$ is on the left of $u'_{f(j)}$, that is, in a case where the right end of $u'_{f(i)}$ is on the left of the left end of $u'_{f(j)}$, it is assumed that $r'_h(i, j)=1$ and $r'_h(j, i)=-1$.

In a case where $u'_{f(i)}$ is on the right of $u'_{f(j)}$, that is, in a case where the left end of $u'_{f(i)}$ is on the right of the right end of $u'_{f(j)}$, it is assumed that $r'_h(i, j)=-1$ and $r'_h(j, i)=1$.

In other cases, $r'_h(i, j)=0$ and $r'_h(j, i)=0$.

Similarly, values of $r'_l(i, j)$ and $r'_l(j, i)$ representing arrangement relationship between $u'_{f(i)}$ and $u'_{f(j)}$ in the vertical direction are determined.

In a case where $u'_{f(i)}$ is above $u'_{f(j)}$, that is, in a case where the lower end of $u'_{f(i)}$ is above the upper end of $u'_{f(j)}$, it is assumed that $r'_l(i, j)=1$ and $r'_l(j, i)=-1$.

In a case where $u'_{f(i)}$ is below $u'_{f(j)}$, that is, in a case where the upper end of $u'_{f(i)}$ is below the lower end of $u'_{f(j)}$, it is assumed that $r'_l(i, j)=-1$ and $r'_l(j, i)=1$.

In other cases, $r'_l(i, j)=0$ and $r'_l(j, i)=0$.

Note that, similarly to the initialization of relative arrangement relationship between the screen components in the sample screen model, in a case where arrangement relationship between areas each in which a display character string can be drawn can be further reduced by the type and the like of screen component objects being taken into consideration for screen components in inclusion relationship in the screen component object information in which $r'_h(i, j)=0$ and $r'_l(i, j)=0$, a value reflecting the fact may be used as the value of $r'_h(i, j)$ or $r'_l(i, j)$.

Then, the values of $r_h(i, j)$, $r_h(j, i)$, $r_l(i, j)$, and $r_l(j, i)$ representing relative arrangement relationship between any two screen component models $u_i$ and $u_j$ in the sample screen model are updated as follows. That is, in a case where relationship of left and right and up and down is always established, it is maintained, and otherwise, it is set to "indefinite".

(Update of Relative Arrangement Relationship in Horizontal Direction)

In a case of $r_h(i, j)\neq r'_h(i, j)$ (at this time, $r_h(j, i)\neq r'_h(j, i)$), it is assumed that $r_h(i, j)=0$ and $r_h(j, i)=0$. On the other hand, in a case other than the above, the update is not performed.

(Update of Relative Arrangement Relationship in Vertical Direction)

In a case of $r_l(i, j)\neq r'_l(i, j)$ (at this time, $r_l(j, i)\neq r'_l(j, i)$), it is assumed that $r_l(i, j)=0$ and $r_l(j, i)=0$. On the other hand, in a case other than the above, the update is not performed.

As described above, when relative arrangement relationship that is always established is obtained for any two screen component models in the sample screen model, "drawing areas of objects themselves" of the sample screen data and the identification case screen data equivalent thereto are compared with each other. On the other hand, when the relative arrangement relationship is obtained, the arrangement relationship may be checked for "drawing areas of display character strings" in the image.

Figure 14:
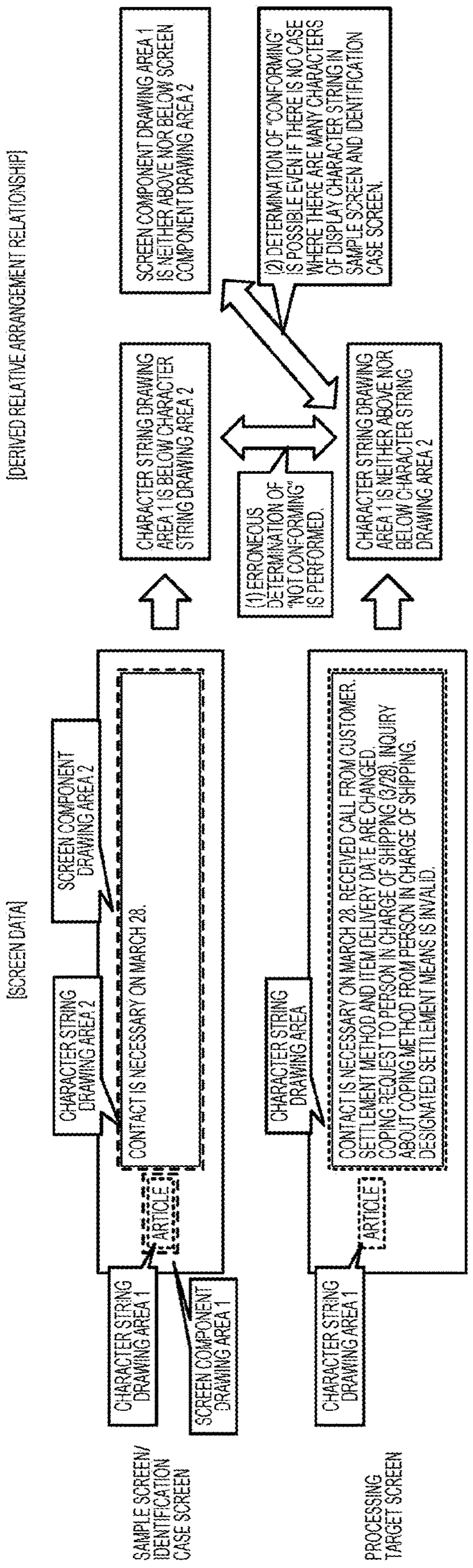
FIG. 14 is a diagram illustrating an example in which a difference in the number of characters of display character strings affects relative arrangement relationship between character string drawing areas.

With reference to FIG. 14, a case where arrangement relationship between drawing areas is changed depending on the number of characters in display character strings of screen components will be described. FIG. 14 is a diagram illustrating an example in which a difference in the number of characters of display character strings affects relative arrangement relationship between character string drawing areas. In a case where sufficient variations are not included as identification case screen data, arrangement relationship that should be originally "indefinite" is erroneously reflected in a sample screen model as "left and right" or "up and down" relationship (see FIG. 14 (1)). On the other hand, such an issue can be avoided by arrangement relationship between the drawing areas of the objects themselves being checked (see FIG. 14 (2)).

That is, in determination processing of character string drawing area arrangement relationship, as compared with a case where relative arrangement relationship between character string drawing areas in screen images of the sample screen data and the identification case screen data is used as a comparison target of relative arrangement relationship between character string drawing areas in a processing target screen image, relative arrangement relationship between areas in which display character strings can be drawn can be more accurately obtained even with a smaller amount of identification case screen data in a case of using relative relationship between screen components, and screen components can be more accurately identified.

(2-3-5. Calculation Processing of Appearance Rate of Screen Component Model)

When the above processing is completed for all the acquired screen data identification cases with objects, the identification device 10 divides the "number of appearances" of each screen component model by a value obtained by adding 1 to the number of elements of the "target identification case screen data ID set", and sets the value as the "appearance rate".

(2-4. Derivation Processing of Regularity of Display Character String)

The identification device 10 first determines the "type of variation in display character string" as follows for a screen component model in which one or more model reflection target objects exist among all identification case screen data equivalent to selected sample screen data (hereinafter, the screen component model is referred to as a "common screen component model") among screen component models in a sample screen model. Note that the common screen component model is a model in which the "appearance rate" is 1 in screen component model information.

In a case where the number of elements of the "display character string set" is 1, "fixed value" is set.

In a case where the number of elements of the "display character string set" is larger than 1 and equal to or smaller than a predetermined threshold, "category value" is set.

In a case where the number of elements of the "display character string set" is larger than the predetermined threshold, "any value" is set.

Furthermore, the identification device 10 performs the following operation on a common screen component model in which the "type of variation in display character string" is "any value".

(Number of Characters in Display Character String)

The lengths of character strings included in the "display character string set" are checked, and if the lengths of all the character strings are the same, the length is set.

(Type of Characters in Display Character String)

Whether alphabets (upper case, lower case), numbers, hiragana, katakana, Chinese characters, and the like are included as characters in the character strings included in the "display character string set" is checked, and the type of the included characters is set.

(2-5. Derivation Processing of Font in Sample Screen Image)

Derivation processing of the font type and size used to draw a sample screen image for a display character string of an object that is a modeling target in each of the common screen component models will be described.

Depending on the interface uniquely provided by an operation target application, information regarding the display magnification of the entire screen, the font type, and the font size when the display magnification of the entire screen is set to 100% can be obtained. In this case, by using this interface, the font type and size used to draw a sample screen image can be obtained. Note that the size of the font is obtained as a value obtained by multiplying the font size when the display magnification of the entire screen is set to 100% by the display magnification of the entire screen.

On the other hand, depending on the interface uniquely provided by an operation target application, the font type and size cannot be correctly acquired, and in that case, the font type and size are estimated as follows from a sample screen image. First, it is known that a display character string is drawn in a drawing area of the object, and no other character string is drawn. Therefore, by the OCR technology being applied to the drawing area of the object in the sample screen image, the drawing area of the display character string of the object can be identified. Thereafter, font estimation in a case where the character string drawing area is known, which will be described below, is performed on the character string drawing area to obtain the font type and size.

(2-6. Calculation Processing of Collation Success Rates and Collation Evaluation Values of Fixed-Value Screen Component Models)

Figure 15:
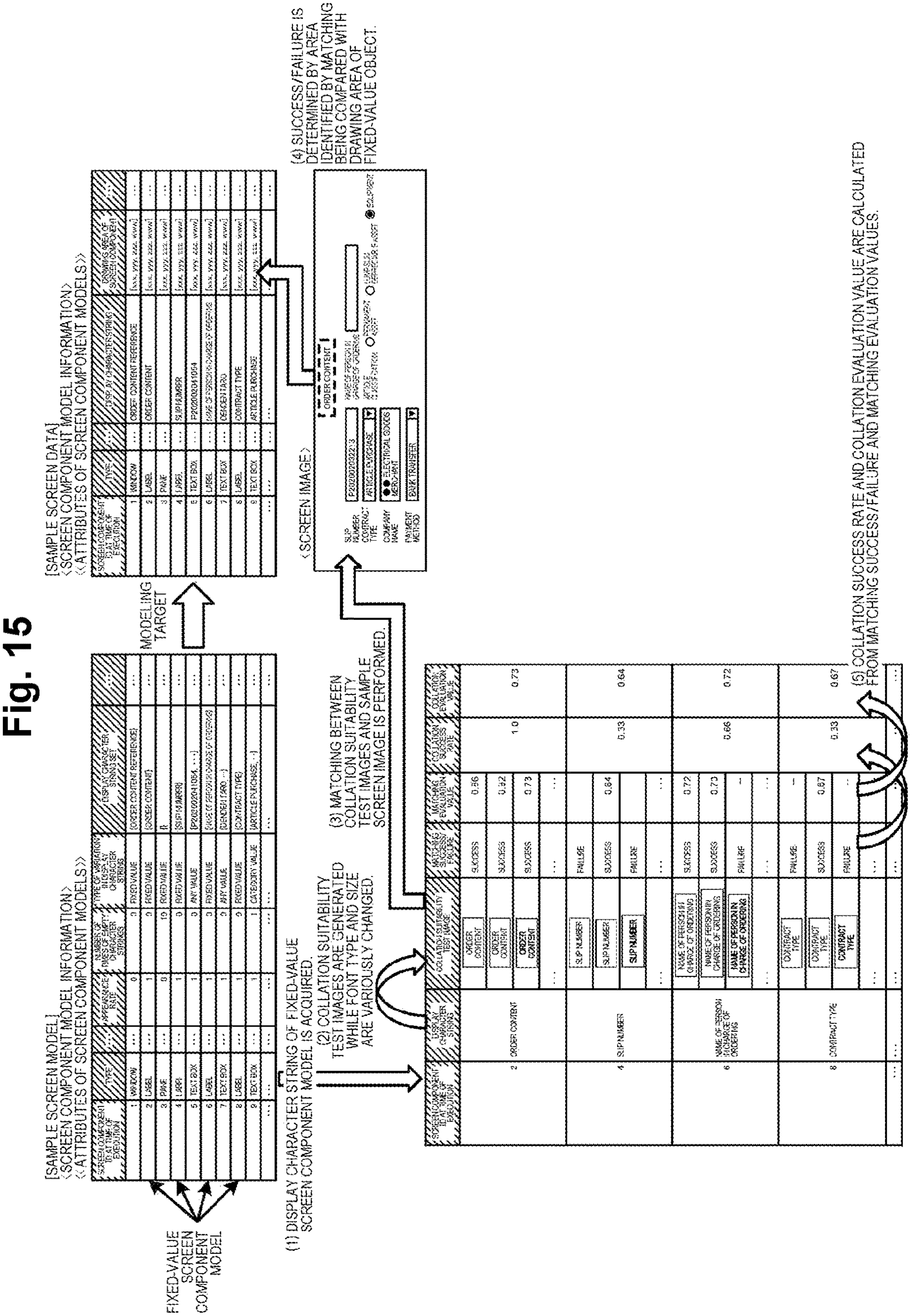
FIG. 15 is a diagram illustrating an example of matching processing when estimating a font type and size of a display character string according to the first embodiment.

Calculation processing of a collation success rate and a collation evaluation value for each fixed-value screen component model will be described with reference to FIG. 15. FIG. 15 is a diagram illustrating an example of matching processing when estimating a font type and size of a display character string according to the first embodiment.

First, the identification device 10 creates images each in which a display character string of a fixed-value screen component model (only element of the display character string set) is drawn while the font type and size are changed within possibilities designated prior to implementation of the present invention (hereinafter, the images are referred to as "collation suitability test images"). Each of these images can be created, for example, by displaying a screen of a program according to the present embodiment on a display using a function of the OS on which the program according to the present embodiment operates, drawing a display character string using a specific font type and size on the screen, and capturing an image of the drawn area (see FIGS. 15 (1) and (2)).

Next, the identification device 10 performs matching between the sample screen image and each of the collation suitability test images using an image processing technology such as image template matching using a feature amount such as a SIFT feature amount that is hardly affected by a difference in size of an object (in this case, a character) drawn on the image (see FIG. 15 (3)).

Furthermore, the identification device 10 determines, on the basis of the matching result, matching success/failure, that is, whether an area identified as a result of the matching is included in a drawing area of an object that is a modeling target of the fixed-value screen component model. Furthermore, in a case where the matching is successful, the identification device 10 checks similarity output by the image processing technology and uses the similarity as a matching evaluation value (see FIG. 15 (4)).

Then, the identification device 10 calculates the collation success rate and the collation evaluation value of the object from matching success/failure and matching evaluation values for all the collation suitability test images. Here, the collation success rate is a rate of collation suitability test images in which the matching success/failure is "success", and the collation evaluation value is a minimum value, an average value, a median value, or the like of the matching evaluation values of the collation suitability test images in which the matching success/failure is "success" among the collation suitability test images.

In the above description, each of the collation suitability test images is matched only with the sample screen image, however, identification case screen data determined to be equivalent to the sample screen data obtained in the preceding processing may be included in the matching target. In this case, the identification device 10 determines the matching success/failure on the basis of whether the area is included in a drawing area of a model reflection target object in identification case screen data corresponding to the fixed-value screen component model.

Note that, [xxx, yyy, zzz, www] is described as "drawing areas of screen components" as one of the "attributes of screen component models" of the sample screen data in FIG. 15, however, even if the same characters are used, this does not mean that these portions have the same value as a character expression in mathematics, and each individual has an individual numerical value corresponding to each of the drawing areas as in the example of the screen data in FIG. 24.

(3. Second Screen Data Control Processing)

Details of the second screen data control processing of comparing processing target screen data not including object information with screen component object information of a sample screen and an identification case screen equivalent thereto, and obtaining display character strings will be described. Hereinafter, character string drawing area identification processing, character string drawing area arrangement relationship determination processing, second screen data association processing, and display character string acquisition processing will be described in this order.

(3-1. Character String Drawing Area Identification Processing)

Figure 16:
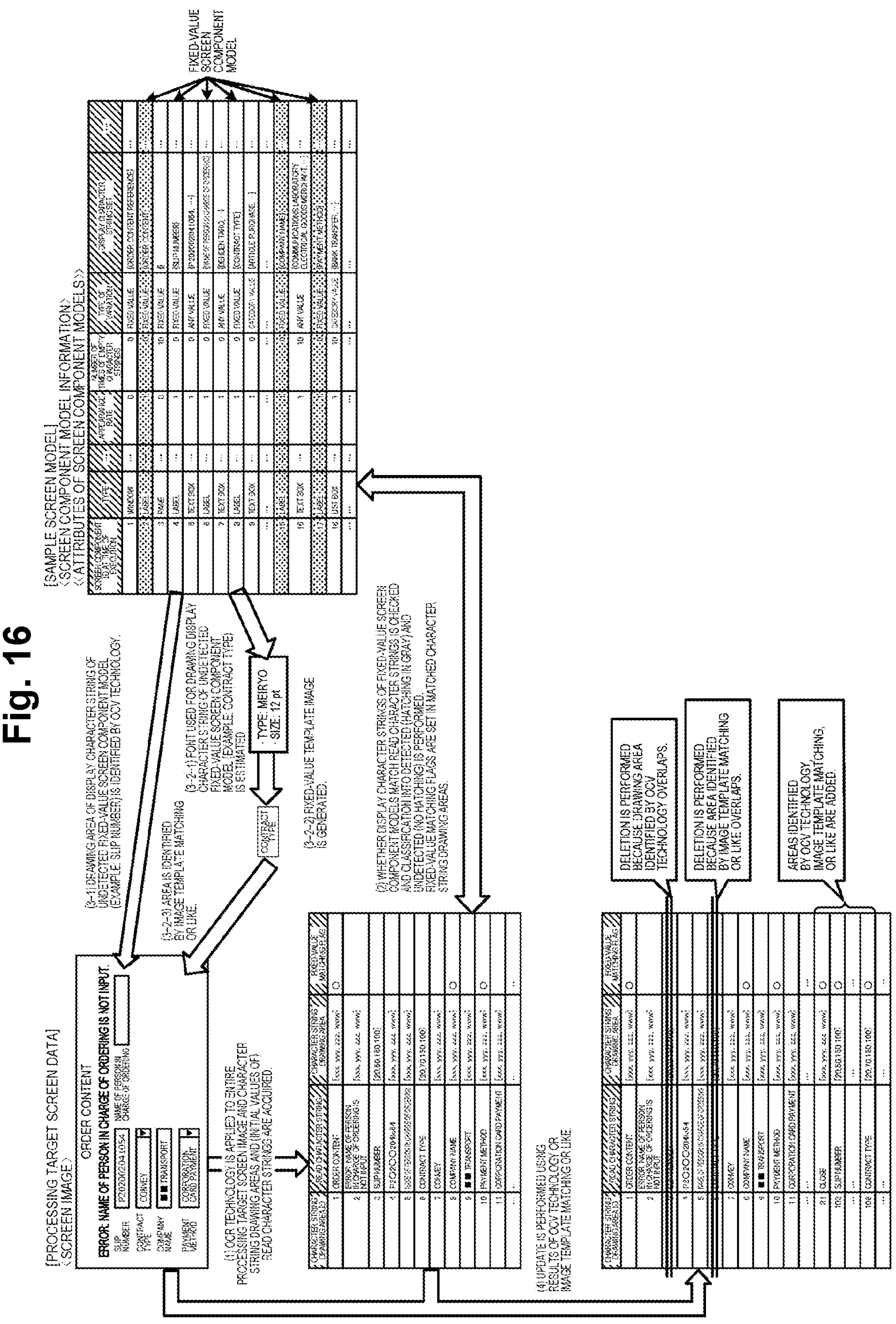
FIG. 16 is a diagram illustrating an example of processing of identifying character string drawing areas according to the first embodiment.

The processing of identifying character string drawing areas in second screen data control processing will be described with reference to FIG. 16. FIG. 16 is a diagram illustrating an example of processing of identifying character string drawing areas according to the first embodiment. The identification device 10 identifies areas each in which a character string is drawn in a processing target screen image and areas each in which a display character string of a fixed-value screen component model in a selected sample screen model is drawn as follows.

First, the identification device 10 acquires areas each in which a character string is determined to be drawn and character strings read from images in the areas (hereinafter, referred to as "read character strings") using the OCR technology on the entire processing target screen image, and stores the areas and the character strings in association with each other in the drawing area storage unit (see FIG. 16 (1)). Note that, for portions in which [xxx, yyy, zzz, www] is described as the acquired "character string drawing areas" in FIG. 16, even if the same characters are used, this does not mean that these portions have the same value as a character expression in mathematics, and each individual has an individual numerical value corresponding to each of the drawing areas as in the example of the screen data in FIG. 24.

Next, the identification device 10 checks whether the display character string is included in a multiple set of read character strings (hereinafter, expressed as a "detected fixed-value screen component model") and whether the display character string is not included in the multiple set of the read character strings (hereinafter, expressed as an "undetected fixed-value screen component model") for each fixed-value screen component model in the selected sample screen model, and performs classification. The identification device 10 sets fixed-value matching flags in character string drawing areas associated with read character strings matching the display character strings of the fixed-value screen component models (see FIG. 16 (2)).

Note that, in a case where there is a plurality of fixed-value screen component models having the same display character string in the sample screen model, the identification device 10 performs classification in consideration of whether the display character string is included in the multiple set of the read character strings by the number of the fixed-value screen component models. For example, in a case where all the number of the fixed-value screen component models having the same display character string are not included in the multiple set of the read character strings, the identification device 10 temporarily sets all the fixed-value screen component models having the same display character string as undetected fixed-value screen component models, and does not set fixed-value matching flags in the character string drawing areas.

Then, the identification device 10 performs one or both of the following processing on each of the undetected fixed-value screen component models, identifies the drawing areas of the display character strings, and corrects read character strings and character string drawing areas stored in a character string drawing area holding unit.

(3-1-1. Detection Processing of Drawing Area of Display Character String by Optical Character Verification Technology)

The identification device 10 identifies a drawing area of a display character string of an undetected fixed-value screen component model in the processing target screen image using an optical character verification (OCV) technology (see FIG. 16 (3-1)). At this time, a character string drawing area in which a fixed-value matching flag is set at this time is excluded from a scanning target by the OCV technology. At this time, the identification device 10 corrects a read character string and a character string drawing area by a method to be described below using a display character string and a drawing area for an undetected fixed-value screen component model for which the drawing area has been identified. Furthermore, the identification device 10 performs re-classification to a detected fixed-value screen component model.

(3-1-2. Detection Processing of Drawing Area of Display Character String by Comparison with Fixed-Value Template Image)

First, the identification device 10 sets a fixed-value screen component model in the selected sample screen model as a collation screen component model possibility and an undetected fixed-value screen component model as a screen component model that is a font estimation target, and performs font estimation in a case where the character string drawing area is unknown, which will be described below (see FIG. 16 (3-2-1)). At this time, a screen component model classified into a detected fixed-value screen component model at this time is handled as a screen component model in which the drawing area of the display character string is known.

Next, the identification device 10 generates an image in which the character string is drawn (hereinafter, referred to as a "fixed-value template image") using the estimation result in a case where the font type and size of the estimation result are not "unknown", and using the font type and size of the undetected fixed-value screen component model in the sample screen model in a case where the font type and size are "unknown" (see FIG. 16 (3-2-2)).

Then, the identification device 10 performs matching between the processing target screen image and the fixed-value template image using an image processing technology such as image template matching, thereby identifying the drawing area of the display character string of the undetected fixed-value screen component model (see FIG. 16 (3-2-3)). At this time, the identification device 10 excludes a character string drawing area in which a fixed-value matching flag is set at this time from a scanning target in the matching. At this time, the identification device 10 corrects a read character string and a character string drawing area by a method to be described below using a display character string and a drawing area for an undetected fixed-value screen component model for which the drawing area has been identified. Furthermore, the identification device 10 performs re-classification to a detected fixed-value screen component model.

(3-1-3. Correction Processing of Read Character String and Character String Drawing Area)

The identification device 10 identifies, from character string drawing areas stored in the drawing area storage unit 14*g*, an area overlapping with the drawing area of the display character string of the undetected fixed-value screen component model in which the drawing area has been successfully identified, and deletes the character string drawing area and the read character string. The identification device 10 additionally stores the display character string of the undetected fixed-value screen component model in which the drawing area has been successfully identified and the drawing area thereof in association with each other as a read character string and a character string drawing area in the character string drawing area holding unit, and sets a fixed-value matching flag for the character string drawing area (see FIG. 16 (4)).

In FIG. 16 (4), since a character string drawing area [20, 50, 150, 100] having a character string drawing area ID=3 overlaps with a drawing region identified by the OCV technology, information of the character string drawing area ID=3 is deleted. Furthermore, since a character string drawing area [20, 70, 150, 100] having a character string drawing area ID=6 overlaps with a drawing region identified by the image template matching or the like, information of the character string drawing area ID=6 is deleted. On the other hand, information of character string drawing area IDs=31, 103, 106, and the like is added as areas identified by the OCV technology, the image template matching, or the like.

(3-2. Character String Drawing Area Arrangement Relationship Determination Processing)

The identification device 10 examines relative arrangement relationship of a combination of any two character string drawing areas $v_i$ and $v_j$ stored in the character string drawing area holding unit.

As a result, the identification device 10 determines values of $s_h(i, j)$ and $s_h(j, i)$ representing arrangement relationship between $v_i$ and $v_j$ in the horizontal direction as follows.

In a case where $v_i$ is on the left of $v_j$, that is, in a case where the right end of $v_i$ is on the left of the left end of $v_j$, it is assumed that $s_h(i, j)=1$ and $s_h(j, i)=-1$.

In a case where $v_i$ is on the right of $v_j$, that is, in a case where the left end of $v_i$ is on the right of the right end of $v_j$, it is assumed that $s_h(i, j)=-1$ and $s_h(j, i)=1$.

In other cases, $s_h(i, j)=0$ and $s_h(j, i)=0$.

Similarly, values of $s_l(i, j)$ and $s_l(j, i)$ representing arrangement relationship between $v_i$ and $v_j$ in the vertical direction are determined.

In a case where $v_i$ is above $v_j$, that is, in a case where the lower end of $v_i$ is above the upper end of $v_j$, it is assumed that $s_l(i, j)=1$ and $s_l(j, i)=-1$.

In a case where $v_i$ is below $v_j$, that is, in a case where the upper end of $v_i$ is below the lower end of $v_j$, it is assumed that $s_l(i, j)=-1$ and $s_l(j, i)=1$.

In other cases, $s_l(i, j)=0$ and $s_l(j, i)=0$.

(3-3. Second Screen Data Association Processing)

As derivation processing of screen component model/character string drawing area association, a method in a case of resulting in a constraint satisfaction problem will be described as an implementation method of association between a screen component model in a sample screen model and a character string drawing area in a processing target screen image and processing of obtaining the evaluation value.

The identification device 10 dynamically creates a constraint satisfaction problem described below on the basis of a selected sample screen model and results of character string drawing area identification and character string drawing area arrangement relationship derivation for the processing target screen image, and obtains a solution and an evaluation value using a constraint satisfaction problem solving method. Furthermore, the identification device 10 stores the result in a screen data without object information identification result holding unit only in a case where the evaluation value is better than results obtained so far. As the constraint satisfaction problem solving method, a method of pruning a search space or a method of obtaining an approximate solution instead of a strict solution may be used.

(3-3-1. Definition of Symbols)

A set of common screen component models and the number of elements thereof in the sample screen model are denoted by U and |U|, and a set of character string drawing areas and the number of elements thereof in the processing target screen image are denoted by V and |V|.

Among the common screen component models in the sample screen model, a set of common screen component models in which the number of times of empty character strings is 0 (hereinafter, referred to as "character string drawing area required screen component models") is defined as $U_{disp}$. Furthermore, among them, a set of fixed-value screen component models is defined as $U_{fix}$.

A display character string of a fixed-value screen component model $u_i$ in the sample screen model is $p_i$, and a read character string of a character string drawing area $v_{i'}$ in the processing target screen image is $q_{i'}$.

Whether to associate the common screen component model $u_i \in U$ in the sample screen model with the character string drawing area $v_{i'} \in V$ in the processing target screen image is represented by an integer variable $x_{i,i'}$ that takes 1 in a case of performing association and 0 in a case of not performing the association.

Whether to associate the common screen component model $u_i \in U$ in the sample screen model with at least one or more character string drawing areas in the processing target screen image is represented by an integer variable $y_i$ that takes 1 in a case of performing association and 0 in a case of not performing the association.

(3-3-2. Formulation as Constraint Satisfaction Problem)

An association method of a common screen component model in the sample screen model with a character string drawing area in the processing target screen image can be expressed as a method of assigning a value of 0 or 1 to each of all variables $x_{1,1}, x_{1,2}, \ldots, x_{2,1}, x_{2,2}, \ldots, x_{|U|,|V|}$. However, in the association method of a common screen component model in the sample screen model with a character string drawing area in the processing target screen image, there are conditions to be satisfied so that the sample screen and the processing target screen, and the screen components are equivalent to each other, and these conditions are constraint conditions in the constraint satisfaction problem.

Furthermore, there is an index of which association method should be selected in a case where there is a plurality of methods of associating a common screen component model and a character string drawing area for the same sample screen model and the same processing target screen data with the constraint conditions satisfied, or in a case where there is a plurality of sample screen models each in which a common screen component model and a character string drawing area can be associated for the same processing target screen with the constraint conditions satisfied, and that is an evaluation function in the constraint satisfaction problem. Each of the constraint conditions and the evaluation function will be described below.

(3-3-2-1. Constraint Conditions)

In order for the sample screen model and the processing target screen data to be equivalent, at least all of the following conditions need to be satisfied.

(Constraint Condition 1)

Under the premise that there is no difference in the layout of screen components even if there is a difference in mounting content of the screen, look and feel, and display magnification, and character string drawing areas are within drawing areas of the screen components, relative arrangement relationship of a combination of any character string drawing areas needs to conform to relative arrangement relationship between common screen component models associated with each other. Note that "conform" means that, in a case where $v_{i'}$ and $v_{j'}$ are associated with $u_i$ and $u_j$, respectively, and there is left and right relationship in the horizontal direction or up and down relationship in the vertical direction between the two common screen component models $u_i$ and $u_j$ on the two-dimensional plane, the same relationship is established between the character string drawing areas $v_{i'}$ and $v_{j'}$.

That is, for any $u_i, u_j \in U$ and $v_{i'}, v_{j'} \in V$, a condition is that both following Formula (1) as arrangement relationship in the horizontal direction and following Formula (2) as arrangement relationship in the vertical direction are satisfied.

[Math. 1]

$$x_{i,i'} = 1 \wedge x_{j,j'} = 1 \wedge r_h(i, j) \neq 0 \Rightarrow r_h(i, j) = s_h(i', j') \tag{1}$$

[Math. 2]

$$x_{i,i'} = 1 \wedge x_{j,j'} = 1 \wedge r_l(i, j) \neq 0 \Rightarrow r_l(i, j) = s_l(i', j') \tag{2}$$

(Constraint Condition 2)

If the sample screen model and the processing target screen data are equivalent, for a common screen component model in which the character string is always displayed in the sample screen model, the character string drawing area should also exist in the processing target screen image. However, in detection of a character string drawing area by the OCR technology, display character string of one screen component model may be divided into a plurality of character string drawing areas. Therefore, at least one or more character string drawing areas in the processing target screen image needs to be associated with a character string drawing area required screen component model.

That is, a condition is that following Formula (3) is satisfied for any $u_i \in U_{disp}$.

[Math. 3]

$$\sum_{v_{i'} \in V} x_{i,i'} \geq 1 \tag{3}$$

(Constraint Condition 3)

Among the character string drawing area required screen component models, in particular, for fixed-value screen component models, areas where the display character strings are drawn are identified in advance in character string drawing area identification, and a case where a character string drawing area is divided when the character string drawing area is detected by the OCR technology does not need to be taken into consideration. Therefore, exactly one character string drawing area in the processing target screen image needs to be associated with a fixed-value screen component model.

That is, for any $u_i \in U_{fix}$, a condition is that following Formula (4) is satisfied instead of the constraint condition 2.

[Math. 4]

$$\sum_{v_{i'} \in V} x_{i,i'} = 1 \tag{4}$$

(Constraint Condition 4)

In a screen of an operation target application targeted by an automatic operation agent or the like, display character strings of different screen components are drawn apart from each other from the viewpoint of ensuring visibility for a person, and thus, display character strings of a plurality of screen component models are not detected as one character string drawing area. That is, one character string drawing area is not associated with two or more common screen component models. Furthermore, the processing target screen may include screen components other than the common screen component models, or may include screen components equivalent to the common screen component models but not including display character strings. Therefore, some character string drawing areas may not be associated with any common screen component model. Therefore, up to one common screen component model is associated with a character string drawing area in the processing target screen image.

That is, a condition is that following Formula (5) is satisfied for any $v_{i'} \in V$.

[Math. 5]

$$\sum_{u_i \in U} x_{i,i'} \leq 1 \tag{5}$$

(Constraint Condition 5)

For a fixed-value screen component model, in addition to the constraint condition 3, a read character string for a character string drawing area in the processing target screen image and a display character string associated with the fixed-value screen component model need to match.

That is, a condition is that following Formula (6) is satisfied for any $u_i \in U_{fix}$.

[Math. 6]

$$x_{i,i'} = 1 \Rightarrow p_i = q_{i'} \tag{6}$$

(Constraint Condition 6)

As is clear from the definition of the variable, the fact that at least one of $x_{i,1}, \ldots, x_{i,|v|}$ is 1 and the fact that $y_i$ is 1 are the same value.

That is, a condition is that following Formula (7) is satisfied for any $u_i \in U$.

[Math. 7]

$$\sum_{v_{i'} \in V} x_{i,i'} > 0 \Leftrightarrow y_i = 1 \tag{7}$$

(3-3-2-2. Evaluation Function)

In a case where all the constraint conditions are satisfied, it can be said that the higher the ratio of character string drawing areas in the processing target screen image associated with common screen component models in the sample screen model among character string drawing areas in the processing target screen image, the better the association method. Similarly, it can be said that the higher the ratio of common screen component models in the sample screen model associated with character string drawing areas in the processing target screen image among common screen component models in the sample screen model, the better the association method.

Therefore, for example, $\phi$ in following Formula (8) is set as an evaluation function. Here, $\alpha$ is a predetermined weighting parameter.

[Math. 8]

$$\Phi(x_{1,1}, x_{1,2}, \ldots, x_{2,1}, x_{2,2}, \ldots, x_{|U|,|V|}, y_1, \ldots, y_{|U|}) = (1-\alpha)\frac{\sum_{u_i \in U} y_i}{|U|} + \alpha\frac{\sum_{u_i \in U}\sum_{v_{i'} \in V} x_{i,i'}}{|V|} \tag{8}$$

(3-4. Display Character String Acquisition Processing)

As processing of screen data without object information control target identification/display character string acquisition, a method of acquiring a display character string for each of the character string drawing areas (hereinafter, referred to as a "selected character string drawing area") that are display character string acquisition targets in the processing target screen image will be described in detail.

In a case where the "type of variation in display character string" of a common screen component model associated with the selected character string drawing area (hereinafter, referred to as a "selected screen component model that is a character string acquisition target") is "fixed-value", the identification device 10 uses the display character string as an acquisition result.

In other cases, the identification device 10 sets a fixed-value screen component model in a sample screen model associated with the processing target screen data as a collation screen component model possibility and the selected screen component model that is the character string acquisition target as a screen component model that is a font estimation target, and performs font estimation in a case where the character string drawing area is unknown, which will be described below. At this time, all screen component models classified into fixed-value screen component models are handled as screen component models each in which the drawing area of the display character string is known.

Next, the identification device 10 reflects the following in addition to the font estimation result in the reading setting according to the "type of variation in display character string" of the selected screen component model that is a character string acquisition target.

In a case where the selected screen component model that is a character string acquisition target is "category value", character strings in a "display character string set" are reflected as character string possibilities in the reading setting.

In a case where the selected screen component model that is a character string acquisition target is "any value", a set one of either the "number of characters in display character string" or the "type of character in display character string" is reflected in the reading setting.

Then, the identification device 10 reads an image of the selected character string drawing area using the OCR technology on the basis of the reading setting reflected above, and uses the result as an acquisition result of the display character string.

(4. Font Estimation Processing of Display Character String of Image)

The font estimation processing of a display character string of an image performed by the identification device 10 will be described in detail. Hereinafter, the font estimation processing in a case where the character string drawing area is unknown and the font estimation processing in a case where the character string drawing area is known will be described in this order.

(4-1. Font Estimation Processing in Case where Character String Drawing Area is Unknown)

In a case where a drawing area of a display character string in the image of the screen is unknown, the identification device 10 preferentially sets a fixed-value screen component model having the same font type as that of a screen component model that is a font estimation target in a sample screen model in a case where there is such a fixed-value screen component model, and in a case where there is no such fixed-value screen component model, sets any fixed-value screen component model as a collation screen component model among fixed-value screen component models that satisfy either (1) the display character string and the drawing area are known or (2) the drawing area can be identified by the same known image processing technology such as image template matching that is used for calculating the collation success rate and the collation evaluation value of a fixed-value screen component model.

Next, the identification device 10 obtains a display character string of the collation screen component model and a drawing area thereof in the processing target screen image, and performs font estimation in a case where the character string drawing area is known, thereby obtaining the font type and size used for drawing the processing target screen image. Thereafter, the identification device 10 infers the font type and size used when a display character string of a screen component model that is a font estimation target is drawn in the processing target screen image from relationship of the font type and size in the sample screen model between the collation screen component model and the screen component model that is a font estimation target.

Note that a flow of processing of estimating the font type and size of a display character string in a processing target screen image for a screen component model that is a font estimation target, that is, a fixed-value screen component model that is a fixed-value template image generation target or a screen component model that is a display character string acquisition target will be described below in [Flow of Each Type of Processing] (5. Flow of font estimation processing in case where character string drawing area is unknown) (6. Flow of model possibilities reduction processing based on whether display character string drawing area can be identified).

(4-2. Font Estimation Processing in Case where Character String Drawing Area is Known)

In a case where a display character string and a drawing region in a screen image are known, the identification device 10 generates images each in which the display character string is drawn while the font type and size is changed within designated possibilities, performs matching with the drawing area in a screen image using an image processing technology such as image template matching, obtains a font type and size at the time of best matching, and uses the same as an estimation result.

[Flow of Each Type of Processing]

A flow of each type of processing according to the present embodiment will be described in detail with reference to FIGS. 17 to 22. Hereinafter, the flow of the entire identification processing, the flow of the sample screen model derivation processing, the flow of the second screen data identification processing, the flow of the second screen data acquisition processing, the flow of the font estimation processing in a case where the character string drawing area is unknown, and the flow of the model possibilities reduction processing based on whether the display character string drawing area can be identified will be described in this order.

(1. Flow of Entire Identification Processing)

Figure 17:
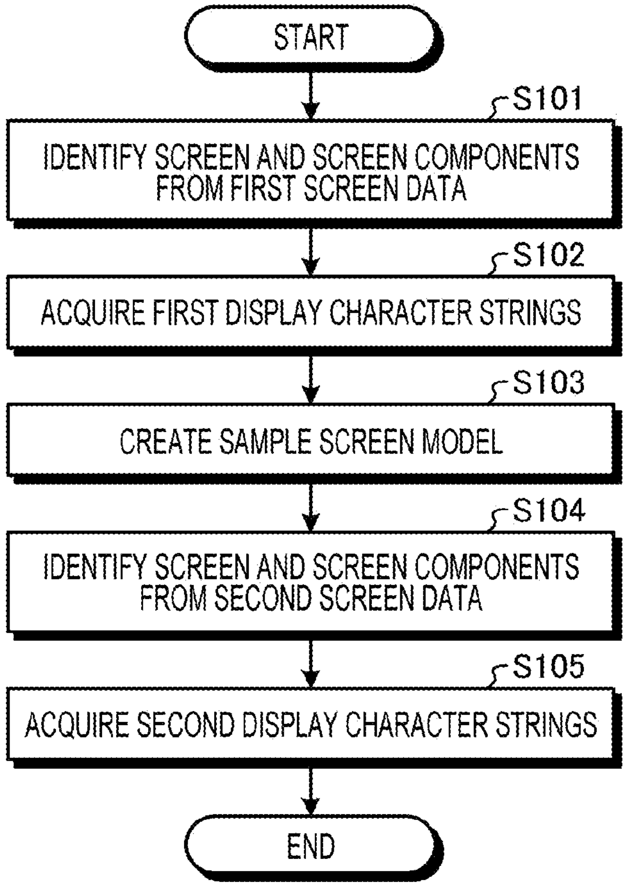
FIG. 17 is a flowchart illustrating an example of a flow of entire processing according to the first embodiment.

The flow of the entire identification processing according to the present embodiment will be described in detail with reference to FIG. 17. FIG. 17 is a flowchart illustrating an example of the flow of the entire processing according to the first embodiment. Hereinafter, the object information using mode performed by the first screen data control unit 151 of the identification device 10, the sample screen modeling mode performed by the screen model control unit 152, and the object information non-using mode performed by the first screen data control unit 151 will be described in this order. Note that following steps S101 to S105 can be performed in different orders. Furthermore, there may be omitted processing among following steps S101 to S105.

(1-1. Object Information Using Mode)

The object information using mode performs processing of accumulating identification result cases in preparation for subsequent use in the sample screen modeling mode while performing identification processing by the object access method in a non-virtualization environment, and includes processing of following steps S101 and S102.

First, the first identification unit 151*a* of the identification device 10 identifies a screen and screen components from the first screen data (step S101). Next, the first acquisition unit 151*b* of the identification device 10 acquires first display character strings (step S102).

(1-2. Sample Screen Modeling Mode)

The sample screen modeling mode creates a sample screen model required when used in the object information non-using mode in any environment, and includes processing of following step S103. The derivation unit 152*a* of the identification device 10 creates a sample screen model (step S103).

(1-3. Object Information Non-Using Mode)

The object information non-using mode performs processing of identification by using a sample screen model in any environment without using screen component object information, and includes following processing of steps S104 and S105.

First, the second identification unit 153*a* of the identification device 10 identifies a screen and screen components from the second screen data (step S104). Next, the second acquisition unit 153*b* of the identification device 10 acquires second display character strings (step S105).

Note that the object information using mode and the object information non-using mode may be explicitly designated by a user, or may be automatically switched according to the environment in which the operation is performed. Furthermore, the above-described sample screen modeling mode may be explicitly designated by a user, or may be temporarily switched or used in parallel at the time of use in other modes.

(2. Flow of Sample Screen Model Derivation Processing)

Figure 18:
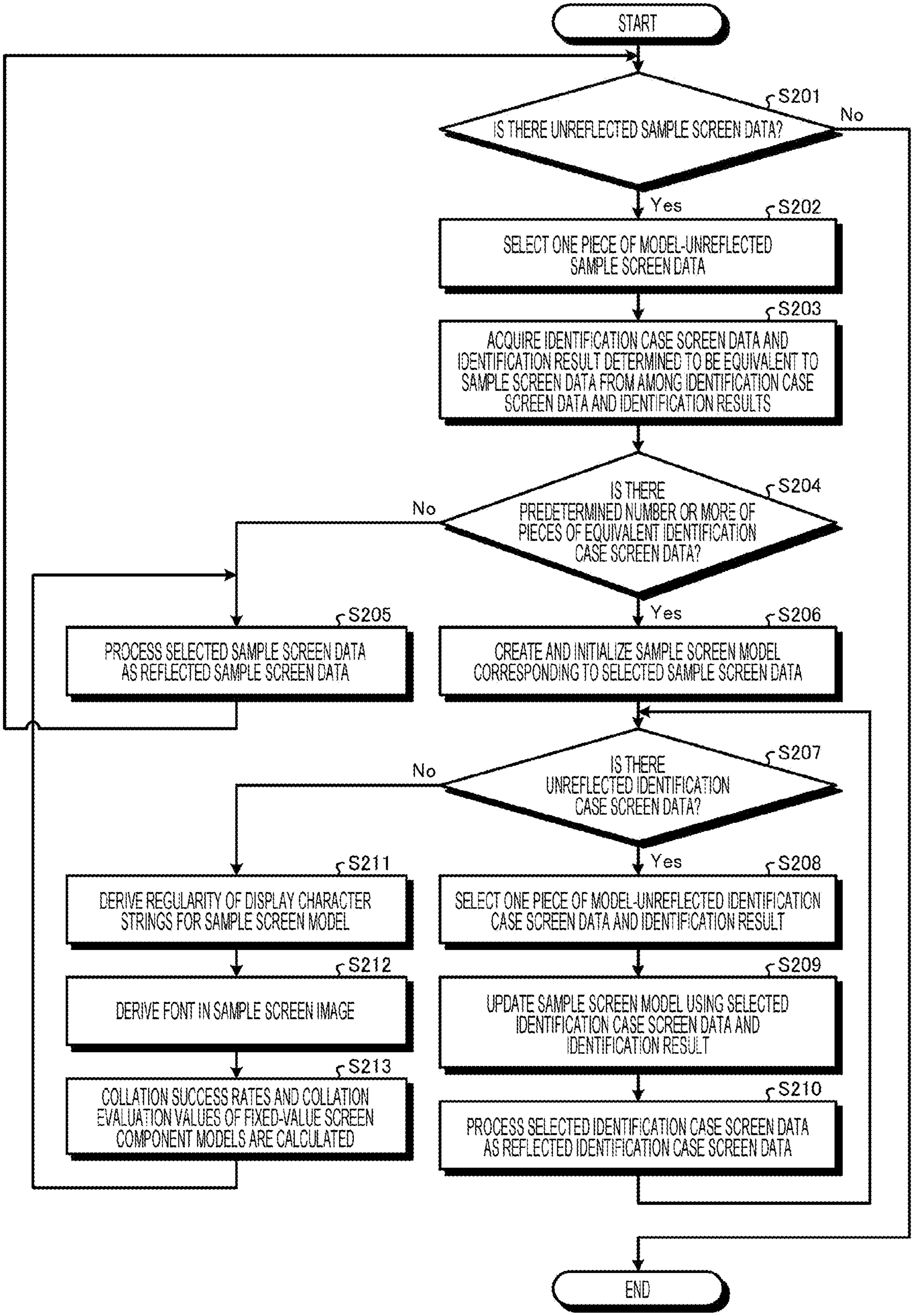
FIG. 18 is a flowchart illustrating an example of a flow of derivation processing of a sample screen model according to the first embodiment.

The flow of the derivation processing of a sample screen model according to the present embodiment will be described in detail with reference to FIG. 18. FIG. 18 is a flowchart illustrating an example of the flow of derivation processing of a sample screen model according to the first embodiment.

First, in a case where there is unreflected sample screen data (step S201: Yes), the derivation unit 152*a* of the identification device 10 selects one piece of model-unreflected sample screen data in the identification information storage unit 14*c* (step S202), and acquires identification case screen data and an identification result determined to be equivalent to the sample screen data from among the identification case screen data and the identification results in the identification case storage unit 14*e* (step S203). On the other hand, in a case where there is no unreflected sample screen data (step S201: No), the derivation unit 152*a* ends the processing.

Next, in a case where a predetermined number or more of pieces of equivalent identification case screen data are present (step S204: Yes), the derivation unit 152*a* creates and initializes a sample screen model corresponding to the selected sample screen data (step S206). On the other hand, in a case where the predetermined number or more of pieces of equivalent identification case screen data are not present (step S204: No), the derivation unit 152*a* processes the selected sample screen data as reflected sample screen data (step S205), and proceeds to processing of step S201.

Subsequently, in a case where there is unreflected identification case screen data (step S207: Yes), the derivation unit 152*a* selects one piece of the model-unreflected identification case screen data and an identification result (step S208), updates the sample screen model using the selected identification case screen data and identification result (step S209), processes the selected identification case screen data as reflected identification case screen data (step S210), and proceeds to processing of step S207.

On the other hand, in a case where there is no unreflected identification case screen data (step S207: No), the derivation unit 152*a* derives regularity of display character strings for the sample screen model (step S211), derives a font in the sample screen image (step S212), calculates the collation success rates and the collation evaluation values of fixed-value screen component models (step S213), processes the selected sample screen data as reflected sample screen data (step S205), and proceeds to processing of step S201.

Note that steps S201 to S213 described above can be performed in different orders and timing. Furthermore, there may be omitted processing among steps S201 to S213 described above.

Furthermore, for example, in a case where a user explicitly instructs start of execution, a case where identification is performed on the processing target screen data including information of objects and a certain number or more of identification results are newly added to the identification case storage unit 14*e*, a case where a sample screen model corresponding to certain sample screen data does not exist in the screen model storage unit 14*f* when equivalence with the sample screen data is attempted to be determined for the processing target screen data not including the information of the objects, a case where a certain number or more of identification results determined to be equivalent to the sample screen data are newly added to the identification case storage unit 14*e* after creation of a sample screen model corresponding to the sample screen data, and the like, the derivation unit 152*a* starts processing, but the case is not particularly limited thereto.

(3. Flow of Second Screen Data Identification Processing)

Figure 19:
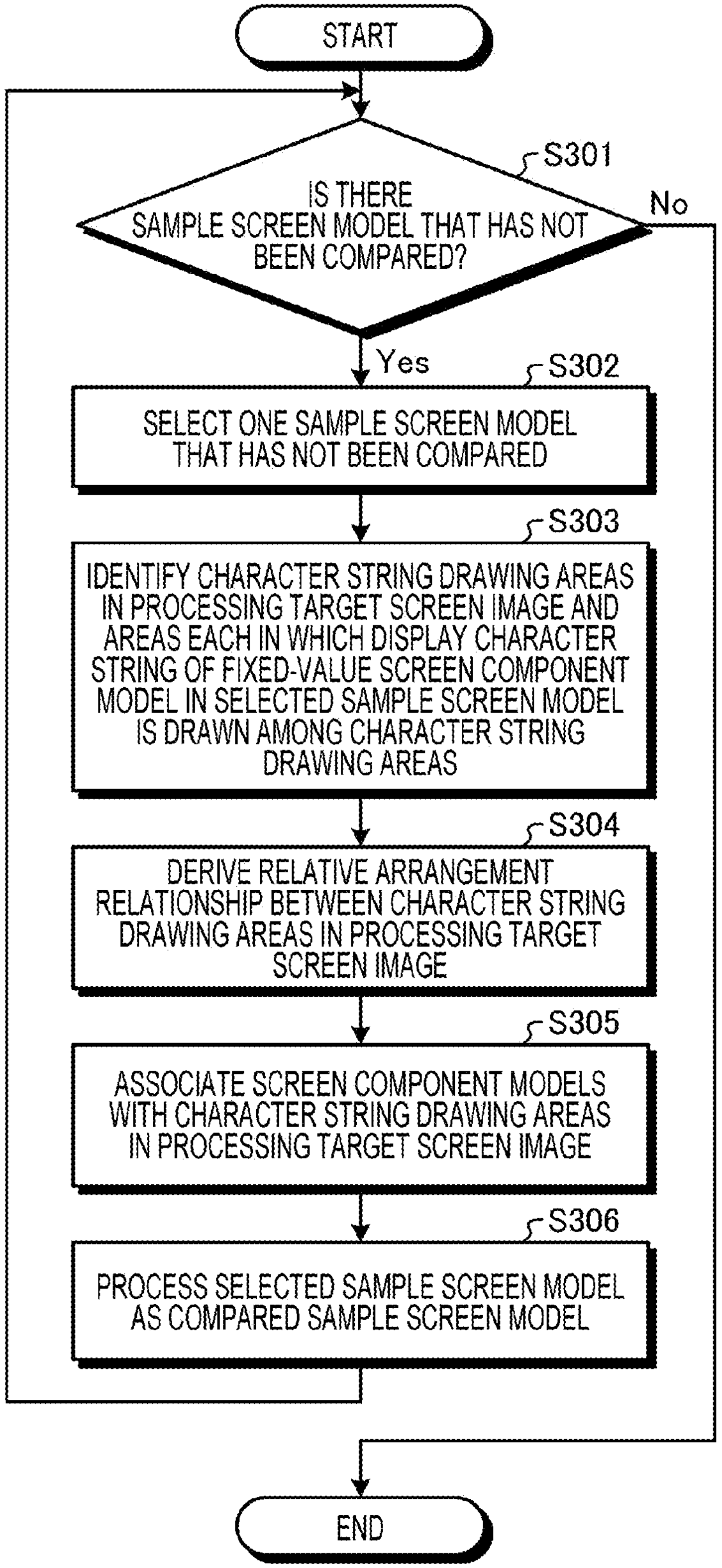
FIG. 19 is a flowchart illustrating an example of a flow of second screen data identification processing according to the first embodiment.

The flow of the second screen data identification processing according to the present embodiment will be described in detail with reference to FIG. 19. FIG. 19 is a flowchart illustrating an example of the flow of the second screen data identification processing according to the first embodiment.

First, in a case where there is a sample screen model that has not been compared (step S301: Yes), the second identification unit 153*a* of the identification device 10 selects one sample screen model that has not been compared in the screen model storage unit 14*f* (step S302). On the other hand, in a case where there is no sample screen model that has not been compared (step S301: No), the second identification unit 153*a* ends the processing.

Next, the second identification unit 153*a* identifies character string drawing areas in the processing target screen image and areas each in which a display character string of a fixed-value screen component model in a selected sample screen model is drawn among the character string drawing areas (step S303), derives relative arrangement relationship between the character string drawing areas in the processing target screen image (step S304), associates screen component models in the selected sample screen model with the character string drawing areas in the processing target screen image (step S305), processes the selected sample screen model as a compared sample screen model (step S306), and proceeds to processing of step S301.

Note that steps S301 to S306 described above can be performed in different orders and timing. Furthermore, there may be omitted processing among steps S301 to S306 described above.

(4. Flow of Second Screen Data Acquisition Processing)

Figure 20:
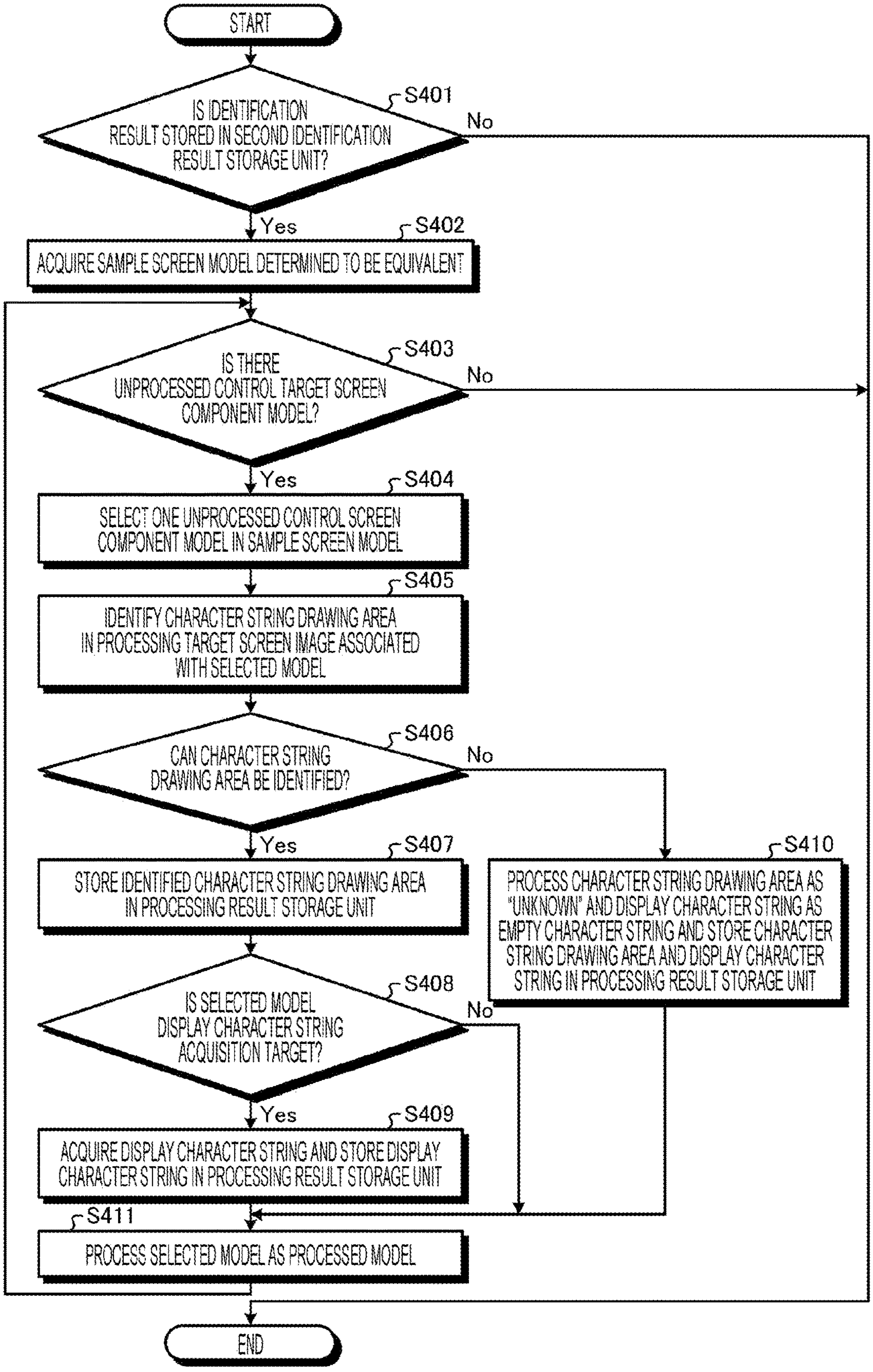
FIG. 20 is a flowchart illustrating an example of a flow of processing of acquiring second character strings according to the first embodiment.

The flow of the second screen data acquisition processing according to the present embodiment will be described in detail with reference to FIG. 20. FIG. 20 is a flowchart illustrating an example of the flow of processing of acquiring second character strings according to the first embodiment.

First, in a case where an identification result is stored in the second identification result storage unit 14*i* (step S401: Yes), the second acquisition unit 153*b* of the identification device 10 acquires a sample screen model determined to be equivalent from the screen model storage unit 14*f* (step S402). On the other hand, in a case where an identification result is not stored in the second identification result storage unit 14*i* (step S401: No), the second acquisition unit 153*b* ends the processing.

Next, in a case where there is an unprocessed control target screen component model in the sample screen model (step S403: Yes), the second acquisition unit 153*b* selects one unprocessed control screen component model in the sample screen model (step S404), and identifies a character string drawing area in the processing target screen image associated with the control target screen component model from the second identification result and the character string drawing areas in the drawing area storage unit 14*g* (step S405). On the other hand, in a case where there is no unprocessed control target screen component model in the sample screen model (step S403: No), the processing ends.

Subsequently, in a case where the character string drawing area can be identified (step S406: Yes), the second acquisition unit 153*b* stores the character string drawing area identified in the processing of step S405 in the processing result storage unit (step S407), and proceeds to processing of step S408. On the other hand, in a case where the character string drawing area cannot be identified (step S406: No), the second acquisition unit 153*b* determines that the character string drawing area is not identified because the screen component is not displayed or the display character string is an empty character string in the processing target screen, processes the character string drawing area as "unknown" and the display character string as an empty character string, stores the character string drawing area and the display character string in the processing result storage unit 14*b* (step S410), processes the selected model as a processed model (step S411), and proceeds to processing of step S403.

Then, in a case where the selected control target screen component model is a display character string acquisition target (step S408: Yes), the second acquisition unit 153*b* acquires a display character string from a character string drawing area in the processing target screen image associated with the selected control target screen component model, stores the display character string in the processing result storage unit 14*b* (step S409), processes the selected model as a processed model (step S411), and proceeds to processing of step S403.

Note that steps S401 to S411 described above can be performed in different orders and timing. Furthermore, there may be omitted processing among steps S401 to S411 described above.

(5. Flow of Font Estimation Processing in Case where Character String Drawing Area is Unknown)

Figure 21:
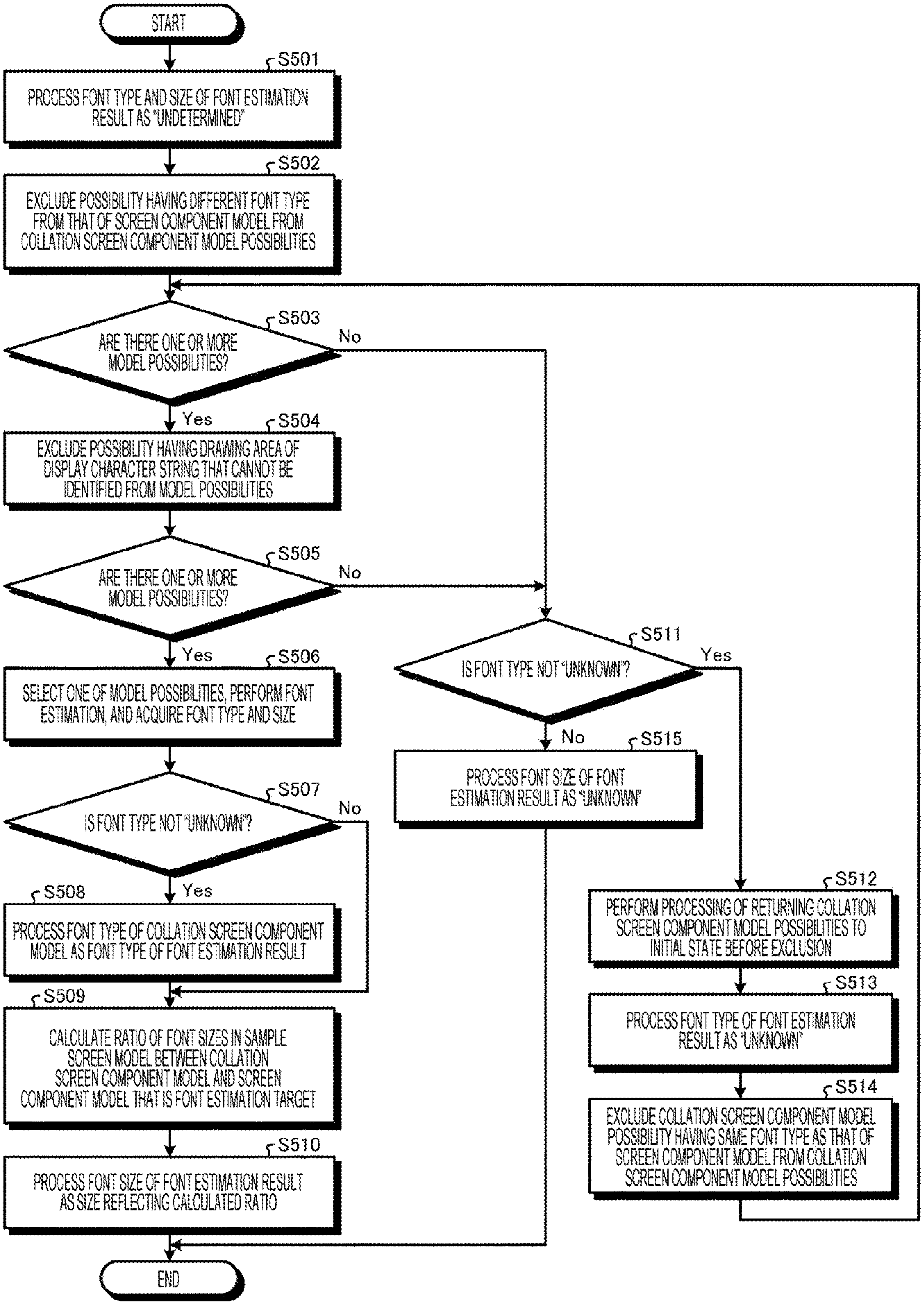
FIG. 21 is a flowchart illustrating an example of a flow of processing of estimating a font type and size of a display character string in a case where the character string drawing area is unknown according to the first embodiment.

The flow of the font estimation processing in a case where the character string drawing area is unknown according to the present embodiment will be described in detail with reference to FIG. 21. FIG. 21 is a flowchart illustrating an example of the flow of processing of estimating a font type and size of a display character string in a case where the character string drawing area is unknown according to the first embodiment.

First, the identification device 10 processes the font type and size of a font estimation result as "undetermined" (step S501), and excludes a possibility having a different font type from that of a screen component model that is a font estimation target from collation screen component model possibilities in the sample screen model (step S502).

Next, in a case where there are one or more collation screen component model possibilities (step S503: Yes), the identification device 10 identifies drawing areas of display character strings in the processing target screen image for the collation screen component model possibilities, and excludes a possibility having a drawing area that cannot be identified from the possibilities (step S504). The flow of the collation screen component model possibilities reduction processing will be described below with reference to FIG. 22. On the other hand, in a case where there are not one or more collation screen component model possibilities (step S503: No), the identification device 10 proceeds to processing of step S511.

Subsequently, after the processing of step S504, in a case where there are one or more collation screen component model possibilities (step S505: Yes), the identification device 10 selects one of the collation screen component model possibilities as a collation screen component model, performs font estimation in a case where the character string drawing area possibility is known, and acquires the font type and size of the collation screen component model (step S506). On the other hand, after the processing of step S504, in a case where there are not one or more collation screen component model possibilities (step S505: No), the identification device 10 proceeds to the processing of step S511.

Further, in a case where the font type is not "unknown" (step S507: Yes), the identification device 10 processes the font type of the collation screen component model as the font type of the font estimation result (step S508), calculates the ratio of the font sizes in the sample screen model between the collation screen component model and the screen component model that is a font estimation target (step S509), processes the font size of the font estimation result as a size reflecting the calculated ratio in the size of the collation screen component model in the processing target screen image (step S510), and ends the processing. On the other hand, in a case where the font type is "unknown" (step S507: No), the identification device 10 proceeds to processing of step S509.

After the processing of step S503 or S505, in a case where the font type is not "unknown" (step S511: Yes), the identification device 10 performs processing of returning the collation screen component model possibilities to the initial state before the exclusion (step S512), processes the font type of the font estimation result as "unknown" (step S513), excludes a collation screen component model possibility having the same font type as that of the screen component model from the collation screen component model possibilities (step S514), and proceeds to processing of step S503. On the other hand, after the processing of step S503 or S505, in a case where the font type is "unknown" (step S511: No), the identification device 10 processes the font size of the font estimation result as "unknown" (step S515), and ends the processing.

Note that steps S501 to S515 described above can be performed in different orders and timing. Furthermore, there may be omitted processing among steps S501 to S515 described above.

(6. Flow of Model Possibilities Reduction Processing Based on Whether Display Character String Drawing Area can be Identified)

Figure 22:
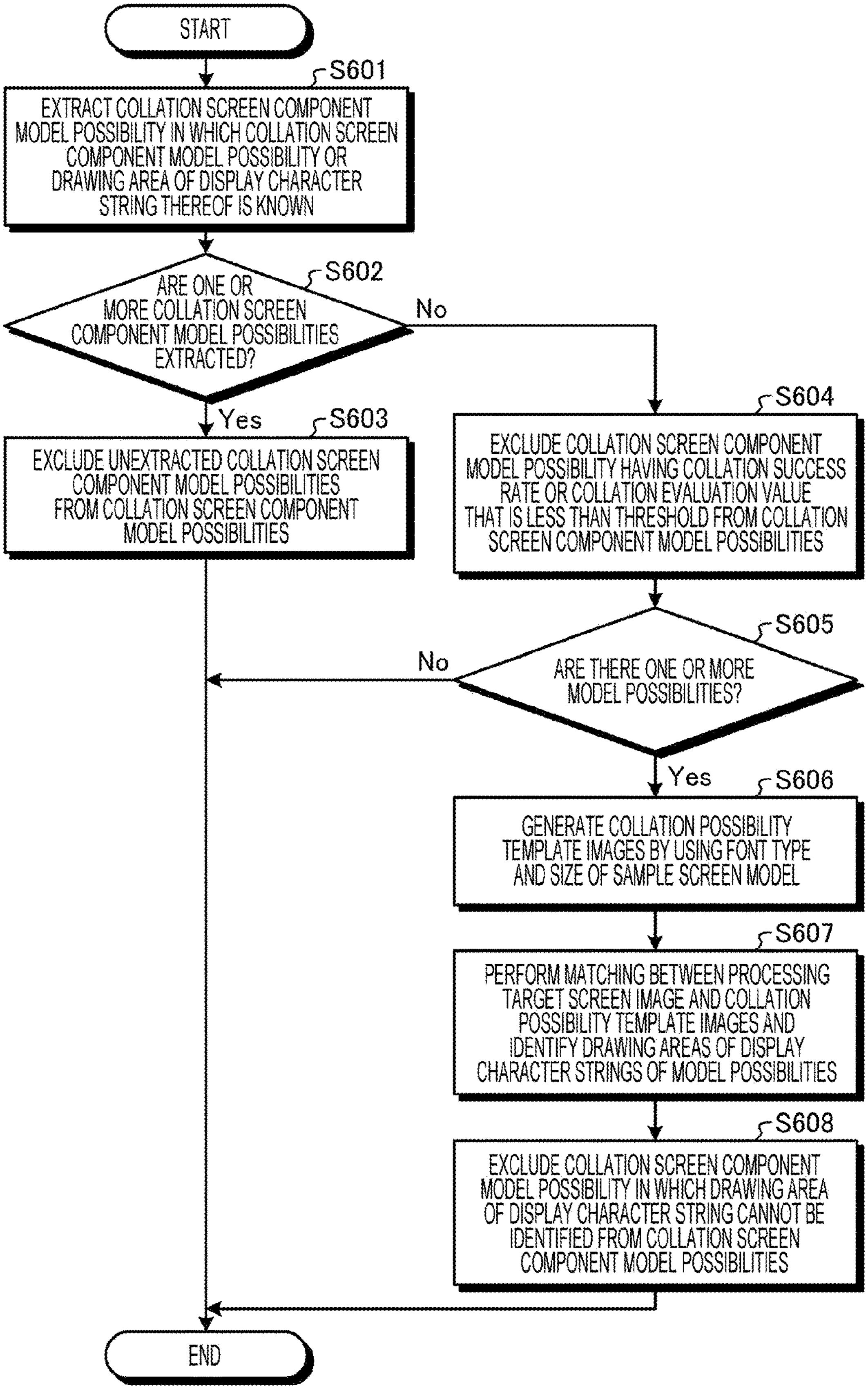
FIG. 22 is a flowchart illustrating an example of a flow of processing of reducing collation component model possibilities based on whether the character string drawing area can be identified according to the first embodiment.

The flow of the font estimation processing in a case where the character string drawing area is unknown according to the present embodiment will be described in detail with reference to FIG. 22. FIG. 22 is a flowchart illustrating an example of the flow of processing of reducing collation component model possibilities based on whether the character string drawing area can be identified according to the first embodiment.

First, the identification device 10 extracts a collation screen component model possibility in which the collation screen component model possibility or a drawing area of a display character string thereof is known in the processing target screen image (step S601), and in a case where one or more collation screen component model possibilities are extracted (step S602: Yes), the identification device 10 excludes unextracted collation screen component model possibilities from collation screen component model possibilities (step S603), and ends the processing.

On the other hand, in a case where one or more collation screen component model possibilities each in which the collation screen component model possibility or a drawing area of a display character string thereof is known are not extracted in the processing target screen image (step S602: No), the identification device 10 excludes a collation screen component model possibility having a collation success rate or a collation evaluation value that is less than a threshold from the collation screen component model possibilities (step S604).

Next, in a case where there are one or more collation screen component model possibilities (step S605: Yes), the identification device 10 generates images each in which a display character string of a collation screen component model possibility is drawn (hereinafter, referred to as "collation possibility template images") by using the font type and size of the sample screen model (step S606), performs matching between the processing target screen image and the collation possibility template images by using the same image processing technology such as image template matching as the technology used when the "collation success rates" and the "collation evaluation values" of the fixed-value screen component models are calculated in deriving the sample screen model, identifies drawing areas of display character strings of the collation screen component model possibilities (step S607), excludes a collation screen component model possibility in which the drawing area of the display character string cannot be identified from the collation screen component model possibilities (step S608), and ends the processing.

On the other hand, in a case where there are not one or more collation screen component model possibilities (step S605: No), the identification device 10 ends the processing.

Note that steps S601 to S608 described above can be performed in different orders and timing. Furthermore, there may be omitted processing among steps S601 to S608 described above.

In the above description, in order to facilitate understanding of the configuration and processing content of the device of the present invention in accordance with an actual use scene, a "sample screen model" and "sample screen component models" are created as intermediate data and used for comparison prior to identification of a processing target screen image. However, in essence, a processing target screen image is compared with screen component object information of a sample screen and an identification case screen equivalent thereto, and the present invention is not limited to whether to create intermediate data as a sample screen model or the presence of the derivation unit **152*a*** that performs the creation.

Effects of First Embodiment

Firstly, in the identification processing according to the present embodiment described above, first screen data 30 including an image of a screen of an application and information regarding a screen component object that is an object of an element included in the screen is identified, a first identification result associated with sample screen data that is screen data to be referred to is output, second screen data 40 including an image of the screen and not including information regarding the screen component object is identified, and a second identification result associated with the sample screen data is output. Therefore, in the present processing, identification of a screen and a screen component of an application and acquisition of a display character string can be performed accurately without time and effort being taken for an operation setting of identification and a reading setting of the display character string in a virtualization environment.

Secondly, in the identification processing according to the present embodiment described above, the derivation unit that, prior to identifying the second screen data, identifies a common object commonly included in a plurality of pieces of the first screen data among the screen component object of the sample screen data from the sample screen data and the first identification result, obtains relative arrangement relationship for each drawing area of a common object, and derives a sample screen model including relative arrangement relationship. Therefore, in the present processing, a screen and a screen component of an application can be further accurately identified in a virtualization environment, and can be used for an automatic operation agent and a work analysis tool.

Thirdly, in the identification processing according to the present embodiment described above, the first screen data 30 including a first character string and a drawing area of a screen component object having the first character string as an attribute is identified by equivalence being determined using information regarding the screen component object, and the first identification result in which the screen component object is associated with each piece of the sample screen data determined to have the equivalence is output, a sample screen model including relative arrangement relationship for each drawing area of the first character string is derived using an identification case including a plurality of the first identification results, a second character string and a drawing area of the second character string are identified from an image of the screen using optical character recognition processing on second screen data, relative arrangement relationship for each drawing area of the second character string is determined, the second screen data 40 is identified on the basis of a drawing area of the second character string and relative arrangement relationship for each drawing area of the second character string, and the second identification result associated with the screen component object for each of the sample screen model is output. Therefore, in the present processing, a screen and a screen component of an application can be further accurately identified in a non-virtualization environment and a virtualization environment, and can be used for an automatic operation agent and a work analysis tool.

Fourthly, in the identification processing according to the present embodiment described above, a fixed-value object that is commonly included in a plurality of pieces of the first screen data and includes a same character string is identified among the screen component object of the sample screen data included in the identification case, and the sample screen model is derived. Therefore, in the present processing, a screen and a screen component of an application can be further accurately and effectively identified in a non-virtualization environment and a virtualization environment, and can be used for an automatic operation agent and a work analysis tool.

Fifthly, in the identification processing according to the present embodiment described above, the sample screen model further including at least one of a variation type, a number of characters, a character type, a font type, or a size of the first character string is derived using the sample screen model, and the second character string and a drawing area of the second character string are identified from an image of the screen using optical character recognition processing on second screen data using at least one of a variation type, a character type, a font type, or a size of the character string. Therefore, in the present processing, a screen and a screen component of an application can be further accurately and efficiently identified in a non-virtualization environment and a virtualization environment, and can be used for an automatic operation agent and a work analysis tool.

Sixthly, in the identification processing according to the present embodiment described above, a second character string included in the second screen data is acquired on the basis of the second identification result and at least one of a variation type, a number of characters, a character type, a font type, or a size of the character string included in a sample screen model. Therefore, in the present processing, a screen and a screen component of an application can be further accurately and efficiently identified in a non-virtualization environment and a virtualization environment, and can be more effectively used for an automatic operation agent and a work analysis tool.

Seventhly, in the identification processing according to the present embodiment described above, the second screen data 40 is identified by equivalence being determined using a constraint condition regarding the second character string and a predetermined evaluation function, and the second identification result associated with the screen component object for each of the sample screen model is output. Therefore, in the present processing, a screen and a screen component of an application can be further accurately identified in a non-virtualization environment and a virtualization environment by effectively using a drawing area of a character string, and can be used for an automatic operation agent and a work analysis tool.

[System Configuration or the Like]

Each component of each device that has been illustrated according to the embodiment described above is functionally conceptual and does not necessarily have to be physically configured as illustrated. In other words, a specific form of distribution and integration of individual devices is not limited to the illustrated form, and all or part of the configuration can be functionally or physically distributed and integrated in any unit according to various loads, usage conditions, and the like. Further, all or some of the processing functions performed in each device can be implemented by a CPU and a program to be analyzed and executed by the CPU or can be implemented as hardware by wired logic.

Further, among the individual processing described in the embodiment described above, all or part of the processing described as being automatically performed can be manually performed, or all or part of the processing described as being manually performed can be automatically performed by a known method. In addition, the processing procedure, the control procedure, the specific names, and the information including various types of data and parameters illustrated in the document and the drawings can be freely changed unless otherwise specified.

[Program]

It is also possible to create a program in which the processing executed by the identification device 10 described in the foregoing embodiment is described in a language that can be executed by a computer. In this case, the computer executes the program, and thus the advantageous effects similar to those of the above-described embodiment can be obtained. Furthermore, the program may be recorded in a computer-readable recording medium, and the program recorded in the recording medium may be read and executed by the computer to implement processing similar to the embodiment described above.

Figure 23:
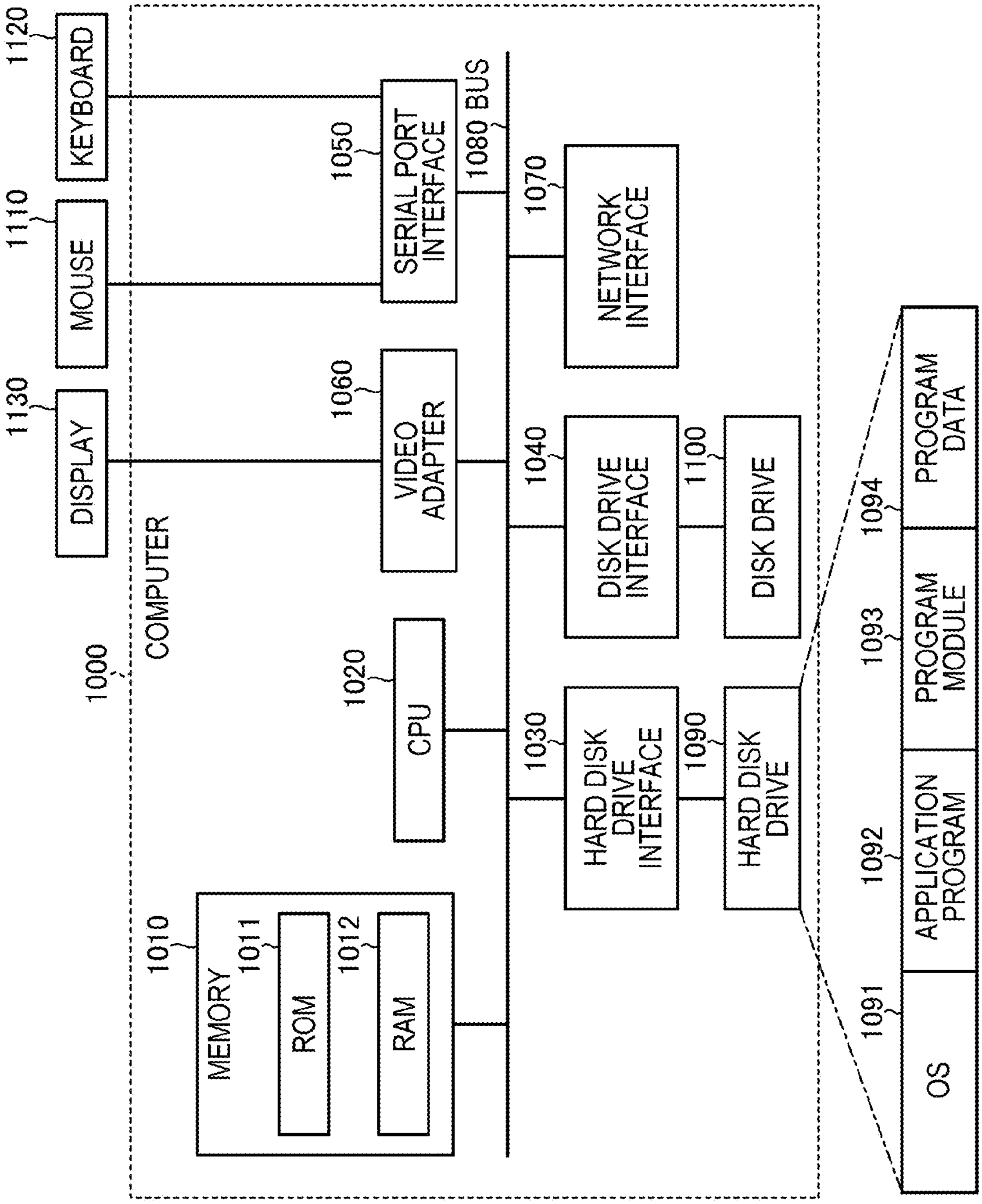
FIG. 23 is a diagram illustrating a computer that executes a program.
Figure 25:
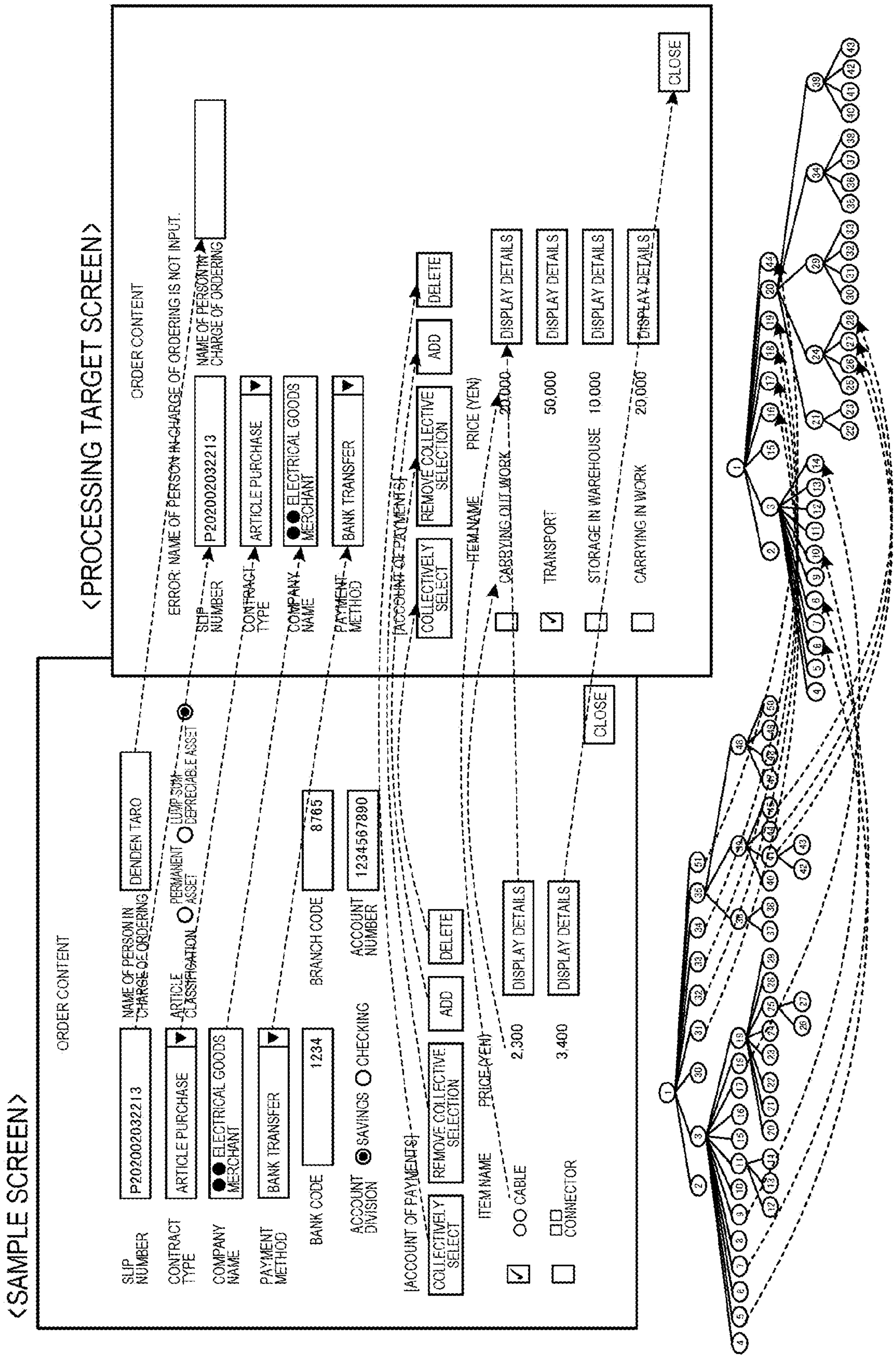
FIG. 25 is a diagram illustrating an example of identification processing of screen components.

FIG. 23 is a diagram illustrating the computer that executes the program. As exemplified in FIG. 23, a computer 1000 includes, for example, memory 1010, a CPU 1020, a hard disk drive interface 1030, a disk drive interface 1040, a serial port interface 1050, a video adapter 1060, and a network interface 1070, and these units are connected by a bus 1080.

As exemplified in FIG. 23, the memory 1010 includes a read only memory (ROM) 1011 and a RAM 1012. The ROM 1011 stores, for example, a boot program such as a basic input output system (BIOS). The hard disk drive interface 1030 is connected to a hard disk drive 1090 as illustrated in FIG. 23. The disk drive interface 1040 is connected to a disk drive 1100 as illustrated in FIG. 23. For example, a removable storage medium such as a magnetic disk or an optical disk is inserted into the disk drive 1100. As illustrated in FIG. 23, the serial port interface 1050 is connected to, for example, a mouse 1110 and a keyboard 1120. As exemplified in FIG. 23, the video adapter 1060 is connected to, for example, a display 1130.

Here, as exemplified in FIG. 23, the hard disk drive 1090 stores, for example, an OS 1091, an application program 1092, a program module 1093, and program data 1094. In other words, the above program is stored, for example, in the hard disk drive 1090 as a program module in which a command to be executed by the computer 1000 is described.

Further, various types of data described in the embodiment described above is stored as program data in, for example, the memory 1010 and the hard disk drive 1090. Then, the CPU 1020 reads out the program module 1093 and the program data 1094 stored in the memory 1010 and the hard disk drive 1090 to the RAM 1012 as necessary and executes various processing procedures.

Note that the program module 1093 and the program data 1094 related to the program are not limited to being stored in the hard disk drive 1090 and may be stored in, for example, a removable storage medium and may be read by the CPU 1020 via a disk drive, or the like. Alternatively, the program module 1093 and the program data 1094 related to the program may be stored in another computer connected via a network (such as a local area network (LAN) or a wide area network (WAN)) and may be read by the CPU 1020 via the network interface 1070.

The embodiment described above and modifications thereof are included in the inventions recited in the claims and the equivalent scope thereof, similarly to being included in the technique disclosed in the present application.

REFERENCE SIGNS LIST

10 Identification device
11 Input unit
12 Output unit
13, 21 Communication unit
14 Storage unit
14*a* Screen data storage unit
14*b* Processing result storage unit
14*c* Identification information storage unit
14*d* First identification result storage unit
14*e* Identification case storage unit
14*f* Screen model storage unit
14*g* Drawing area storage unit
14*h* Arrangement relationship storage unit
14*i* Second identification result storage unit
15, 22 Control unit
151 First screen data control unit
151*a* First identification unit
151*b* First acquisition unit
152 Screen model control unit
152*a* Derivation unit
153 Second screen data control unit
153*a* Second identification unit
153*b* Second acquisition unit
20 Automatic operation agent device
30 Screen data with object information (first screen data)
40 Screen data without object information (second screen data)
100 Identification system

The invention claimed is:

1. An identification device comprising a processor configured to execute operations comprising:
identifying first screen data including an image of a screen of an application and information regarding a screen component object that is an object of an element included in the screen, wherein the first screen data further includes a first character string and a drawing area of a screen component object having the first character string as an attribute by determining equivalence using information regarding the screen component object;
outputting a first identification result associated with sample screen data that is screen data to be referred to, wherein the screen component object is associated with each piece of the sample screen data determined to have the equivalence;
identifying, on a basis of the sample screen data and the first identification result, second screen data including an image of the screen and not including information regarding the screen component object by identifying a second character string and a drawing area of the second character string data using optical character recognition processing on the second screen data, wherein the identifying the second character string is based on a drawing area of the second character string and relative arrangement relationship for respective drawing areas of the second character string; and
outputting a second identification result associated with the sample screen data.

2. The identification device according to claim 1, the processor further configured to execute operations comprising
prior to identifying the second screen data:
identifying a common object commonly included in a plurality of pieces of the first screen data among the screen component object of the sample screen data from the sample screen data and the first identification result;
obtaining the relative arrangement relationship for each drawing area of a common object; and
generating a sample screen model including relative arrangement relationship.

3. The identification device according to claim 2,
wherein the identifying the common object further comprises:
identifying a fixed-value object that is commonly included in a plurality of pieces of the first screen data and includes a same character string among the screen component object of the sample screen data included in an identification case.

4. The identification device according to claim 2,
wherein the generating the sample screen model further comprises generating the sample screen model further including at least one of a variation type, a number of characters, a character type, a font type, or a size of the first character string using the sample screen model, and the identifying the second screen data further comprises identifying the second character string and a drawing area of the second character string from an image of the screen using optical character recognition processing on second screen data using at least one of a variation type, a character type, a font type, or a size of the first character string.

5. The identification device according to claim 4, the processor further configured to execute operations comprising:

acquiring a second character string included in the second screen data on a basis of the second identification result and at least one of a variation type, a number of characters, a character type, a font type, or a size of the first character string included in a sample screen model.

6. The identification device according to claim 2, wherein the identifying the second screen data further comprises identifying the second screen data by determining equivalence using a constraint condition regarding the second character string and a predetermined evaluation function.

7. An identification method, comprising:

identifying first screen data including an image of a screen of an application and information regarding a screen component object that is an object of an element included in the screen, wherein the first screen data further includes a first character string and a drawing area of a screen component object having the first character string as an attribute by determining equivalence using information regarding the screen component object;

outputting a first identification result associated with sample screen data that is screen data to be referred to, wherein the screen component object is associated with each piece of the sample screen data determined to have the equivalence;

identifying second screen data including an image of the screen and not including information regarding the screen component object by identifying a second character string and a drawing area of the second character string data using optical character recognition processing on the second screen data, wherein the identifying the second character string is based on a drawing area of the second character string and relative arrangement relationship for respective drawing areas of the second character string; and outputting a second identification result associated with the sample screen data.

8. A computer-readable non-transitory recording medium storing a computer-executable program instructions that when executed by a processor cause a computer system to execute operations comprising:

identifying first screen data including an image of a screen of an application and information regarding a screen component object that is an object of an element included in the screen, wherein the first screen data further includes a first character string and a drawing area of a screen component object having the first character string as an attribute by determining equivalence using information regarding the screen component object;

outputting a first identification result associated with sample screen data that is screen data to be referred to, wherein the screen component object is associated with each piece of the sample screen data determined to have the equivalence;

identifying second screen data including an image of the screen and not including information regarding the screen component object by identifying a second character string and a drawing area of the second character string data using optical character recognition processing on the second screen data, wherein the identifying the second character string is based on a drawing area of the second character string and relative arrangement relationship for respective drawing areas of the second character string; and outputting a second identification result associated with the sample screen data.

9. The identification method according to claim 7, further comprising:

prior to identifying the second screen data:

identifying a common object commonly included in a plurality of pieces of the first screen data among the screen component object of the sample screen data from the sample screen data and the first identification result;

obtaining the relative arrangement relationship for each drawing area of a common object; and generating a sample screen model including relative arrangement relationship.

10. The identification method according to claim 9, wherein the identifying the common object further comprises:

identifying a fixed-value object that is commonly included in a plurality of pieces of the first screen data and includes a same character string among the screen component object of the sample screen data included in an identification case.

11. The identification method according to claim 9, wherein the generating the sample screen model further comprises generating the sample screen model further including at least one of a variation type, a number of characters, a character type, a font type, or a size of the first character string using the sample screen model, and the identifying the second screen data further comprises identifying the second character string and a drawing area of the second character string from an image of the screen using optical character recognition processing on second screen data using at least one of a variation type, a character type, a font type, or a size of the first character string.

12. The identification method according to claim 11, further comprising:

acquiring a second character string included in the second screen data on a basis of the second identification result and at least one of a variation type, a number of characters, a character type, a font type, or a size of the first character string included in a sample screen model.

13. The identification method according to claim 9, wherein the identifying the second screen data further comprises identifying the second screen data by determining equivalence using a constraint condition regarding the second character string and a predetermined evaluation function.

14. The computer-readable non-transitory recording medium according to claim 8, the computer-executable program instructions when executed further causing the computer system to execute operations comprising:

prior to identifying the second screen data:

identifying a common object commonly included in a plurality of pieces of the first screen data among the screen component object of the sample screen data from the sample screen data and the first identification result;

obtaining the relative arrangement relationship for each drawing area of a common object; and generating a sample screen model including relative arrangement relationship.

15. The computer-readable non-transitory recording medium according to claim 14, wherein the identifying the common object further comprises:

identifying a fixed-value object that is commonly included in a plurality of pieces of the first screen data and includes a same character string among the screen component object of the sample screen data included in an identification case.

16. The computer-readable non-transitory recording medium according to claim 14, wherein the generating the sample screen model further comprises generating the sample screen model further including at least one of a variation type, a number of characters, a character type, a font type, or a size of the first character string using the sample screen model, and the identifying the second screen data further comprises identifying the second character string and a drawing area of the second character string from an image of the screen using optical character recognition processing on second screen data using at least one of a variation type, a character type, a font type, or a size of the first character string.

17. The computer-readable non-transitory recording medium according to claim 16, further comprising:

acquiring a second character string included in the second screen data on a basis of the second identification result and at least one of a variation type, a number of characters, a character type, a font type, or a size of the first character string included in a sample screen model.

* * * * *